United States Patent [19]

Marino et al.

[11] 4,133,477

[45] Jan. 9, 1979

[54] FAULT DETECTION AND SYSTEM FOR ELECTROSTATOGRAPHIC MACHINES

[75] Inventors: Joseph A. Marino; Gary A. Gray, both of Fairport; Edward Steiner, Macedon, all of N.Y.

[73] Assignee: Xerox Corporation, Stamford, Conn.

[21] Appl. No.: 677,472

[22] Filed: Apr. 15, 1976

[51] Int. Cl.² .............................................. G06F 11/00

[52] U.S. Cl. ................................ 235/304; 235/304.1; 355/14; 364/900

[58] Field of Search ..................... 235/304, 304.1, 301; 364/200, 900, 518; 355/14

[56] References Cited

U.S. PATENT DOCUMENTS

| | | | |
|---|---|---|---|
| 3,659,088 | 4/1972 | Boisvert, Jr. | 235/302.3 |
| 3,771,131 | 11/1973 | Ling | 235/304 |
| 3,928,830 | 12/1975 | Bellamy et al. | 235/304 |
| 3,939,453 | 2/1976 | Schroeder | 235/304 |
| 3,999,851 | 12/1976 | Sakamaki et al. | 355/14 |
| 4,017,175 | 4/1977 | Washio et al. | 355/14 |
| 4,062,061 | 12/1977 | Batchelor et al. | 364/900 |

OTHER PUBLICATIONS

Galli, Dynamic Monitoring System for Microprocessor Engines, IBM Technical Disclosure Bulletin, vol. 19, No. 7, Dec. 1976, pp. 2556–2557.

Nash et al., I/O Monitor, IBM Technical Disclosure Bulletin, vol. 12, No. 4, Sep. 1969, pp. 629–630.

Stringfellow et al., Maintenance, Scanner, IBM Technical Disclosure Bulletin, vol. 3, No. 12, Jan. 1961, pp. 19–20.

*Primary Examiner*—Charles E. Atkinson

[57] ABSTRACT

A xerographic type copying or reproduction machine incorporating a programmable controller to operate the various machine components in an integrated manner to produce copies is disclosed. The controller carries a master program bearing machine operating parameters from which an operating program for the specific copy run desired is formed and used to operate the machine components to produce the copies programmed. A fault flag array is routinely scanned, each flag comprising the array being associated with an operating component or area of such machine such that on a fault or malfunction thereof, the fault flag corresponding thereto is set. On detection of a fault flag, a machine fault is declared. Display means are provided to visually identify the fault location. A permanent record of certain faults and machine operations are stored in memory for future use.

8 Claims, 58 Drawing Figures

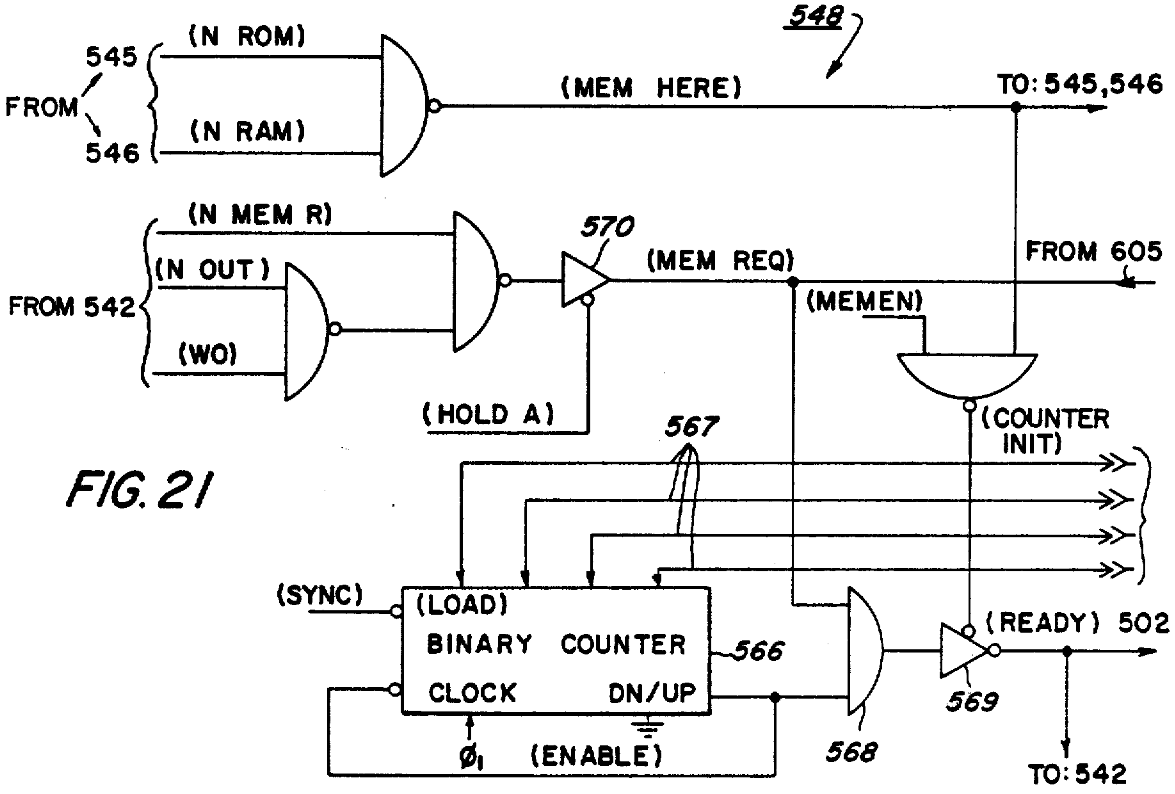
FIG. 21
MEMORY READY
FIG. 24
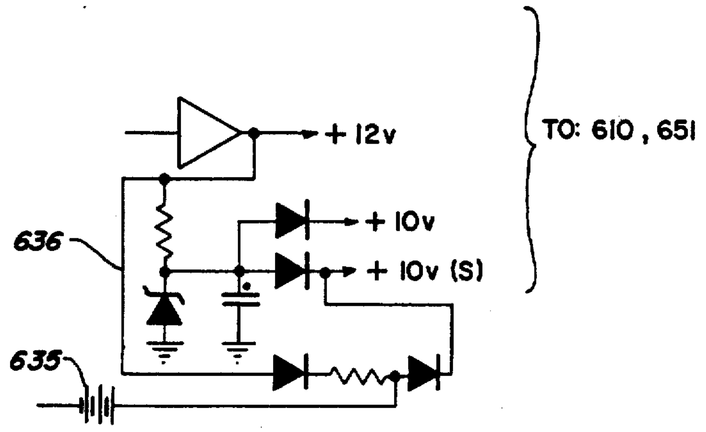

PITCH RESET CLOCK
640
OPT ISO
645
DIGITAL FILTER
646
(EN)
641
FROM: 202
MACH. CLOCK
648
PHASE LOOP LOCK
649
(LOCK)
(EN)
642
FROM: 206
DOC. HAND CLOCK
652
PHASE LOOP LOCK
653
(LOCK)
(LOAD)
FROM:601
FROM:570
REAL TIME CLOCK
643
REGISTER
621
508
658
RESET
FROM: FUNCTION DECODE SECTION 601
D2
D3
D4
D5
D6
D7
EDGE TRIGGER FLIP-FLOP & STORAGE
612
647
651
654
656
(INT)
PRIORITY CHIP
659
(INT) TO: PROCESSOR 542
508
D0-D7
RESTART
LATCH
660
(INTA) FROM: PROCESSOR 542
524
FROM HOST MACHINE 10

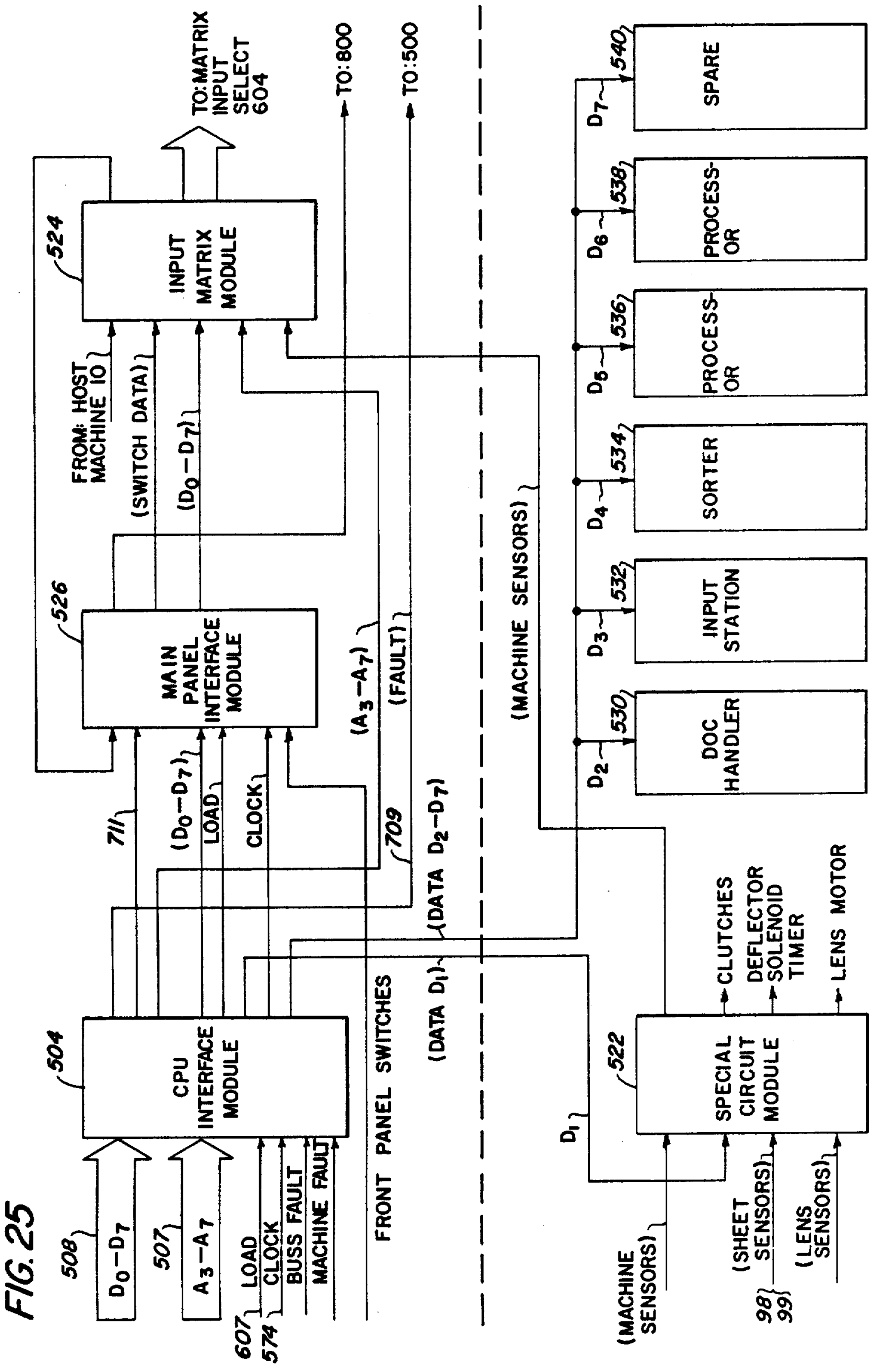
FIG. 25
CPU INTERFACE MODULE
504
MAIN PANEL INTERFACE MODULE
526
INPUT MATRIX MODULE
524
TO: MATRIX INPUT SELECT 604
TO: 800
TO: 500
FROM: HOST MACHINE IO
(SWITCH DATA)
(D0-D7)
(A3-A7)
(FAULT)
(MACHINE SENSORS)
711
LOAD
CLOCK
709
(DATA D2-D7)
(DATA D1)
FRONT PANEL SWITCHES
508
D0-D7
507
A3-A7
607
574
LOAD
CLOCK
BUSS FAULT
MACHINE FAULT
SPECIAL CIRCUIT MODULE
522
CLUTCHES
DEFLECTOR SOLENOID
TIMER
LENS MOTOR
D1
(MACHINE SENSORS)
98
99
(SHEET SENSORS)
(LENS SENSORS)
DOC HANDLER
530
D2
INPUT STATION
532
D3
SORTER
534
D4
PROCESS-OR
536
D5
PROCESS-OR
538
D6
SPARE
540
D7

(FRONT PANEL SWITCHES)
711
FROM: CPU INTERFACE MODULE 504
DATA
D0–D7
CLOCK
LOAD
574
607
526
723
BUFFERS
724
DIGITAL MULTI-PLEXER
(D0–D7)
TO: INPUT MATRIX MODULE 524
725
HEX TO 7 SEGMENT CONVER-TER
726
DRIVERS
TO: CONTROL CONSOLE 800
CONTROL CONSOLE INTER-CONNECT
728
COMMON ANODE LOGIC
727
DATA LATCH & LAMP DRIVERS
D0
729
LATCHES & LAMP DRIVERS
(SWITCH DATA)
TO: INPUT MATRIX MODULE 524
FROM: INPUT MATRIX MODULE 524

LEGEND:

FLT - FAULT
ADDR - ADDRESS
TBL - TABLE
CNT - COUNT
INR - INCREMENT
CDPL - CODE / PANEL LAMPS
DCR - DECREMENT PRESS-PRESS
FCD - FAULT CODE
TOT - TOTAL

LEGEND:

FLT - FAULT
DCTL-DISPLAY CODE TABLE
NUM- NUMBER
DISP-DISPLAY
TBL- TABLE
FC -FAULT CODE

LEGEND

JSW—JAM SWITCH
ADDR—ADDRESS
FLG—FLAG
DCR—DECREMENT
INX—INCREMENT

LEGEND:

FLT - FAULT
SPNL - STATUS PANEL LAMPS
C STATUS - CHECK STATUS
FUS - FUSER
2SD - TWO SIDED (i.e. DUPLEX)
AX - AUXILIARY TRANSPORT
INVT - INVERTER
BX - B TRANSPORT
RET X - RETURN TRANSPORT
REG - REGISTRATION
CX - C TRANSPORT
SOS - SHEET ON SELENIUM (SHEET ON BELT 20)

FAULT DETECTION AND SYSTEM FOR ELECTROSTATOGRAPHIC MACHINES

This invention relates to xerographic type reproduction machine, and more particularly, to an improved fault detection system for such machines.

The advent of higher speed and more complex copiers and reproduction machines has brought with it a corresponding increase in the complexity in the machine control wiring and logic. While this complexity manifests itself in many ways, perhaps the most onerous involves the inflexibility of the typical control logic/wiring systems. For as can be appreciated, simple unsophisticated machines with relatively simple control logic and wiring can be altered and modified easily to incorporate changes, retrofits, and the like. Servicing and repair of the control logic is also fairly simple. On the other hand, some modern high speed machines, which often include sorter, a document handler, choice of copy size, multiple paper trays, jam protection and the like have extremely complex logic systems making even the most minor changes and improvements in the control logic difficult, expensive and time consuming. And servicing or repairing the machine control logic paper handling systems, electromechanical components, etc. may similarly entail substantial difficulty, time and expense.

To mitigate problems of the type alluded to, a programmable controller may be used, to operate the machine. However, the complexity and operational speed of such machines makes the identificatiion and handling of machine faults and malfunctions difficult. For example, in the event of a paper jam, the jam must be located from among a maze of paper transports, Otherwise, the entire paper path must be accessed and every transport device checked, through inspection or actual operation a time consuming job, and particularly annoying in a high speed, high volume reproduction machine.

It is therefore an object of the present invention to provide a new and improved control system for xerographic type reproduction machines.

It is an object of the present invention to provide an arrangement for permanently recording the occurence of faults and malfunction of an electrostatic copier.

It is an object of the present invention to provide a memory bank in which certain selected operating events in the life of a reproduction machine are recorded.

The invention relates to a reproduction system having a plurality of copy processing components cooperable to produce copies and a controller for operating said components in accordance with a program to produce copies, the program incorporating an array of fault flags associated with individual ones of the components and means for setting individual fault flags in the array in response to a fault in the machine component associated therewith, means to scan the array of fault flags, and display means to identify the associated with any fault flag in the array that has been set.set.

Other objects and advantages will be apparent from the ensuing description and drawings in which:

FIG. 1*a* is a schematic representation of an exemplary reproduction apparatus incorporating the control system of the present invention; FIG. 1*b* is an isometric view showing a portion of the reproduction apparatus housing;

Figure 18A:
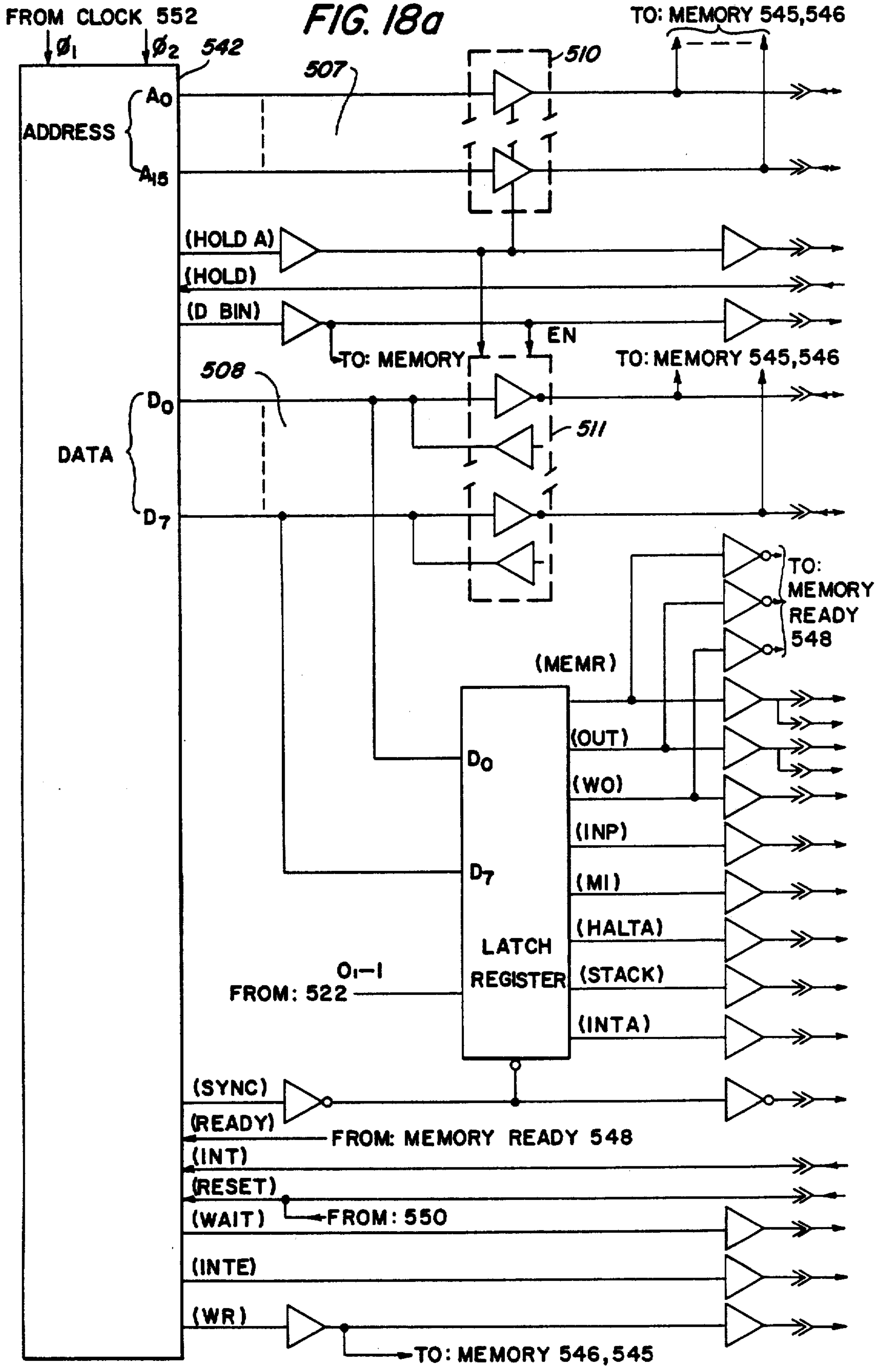
Figure 18B:
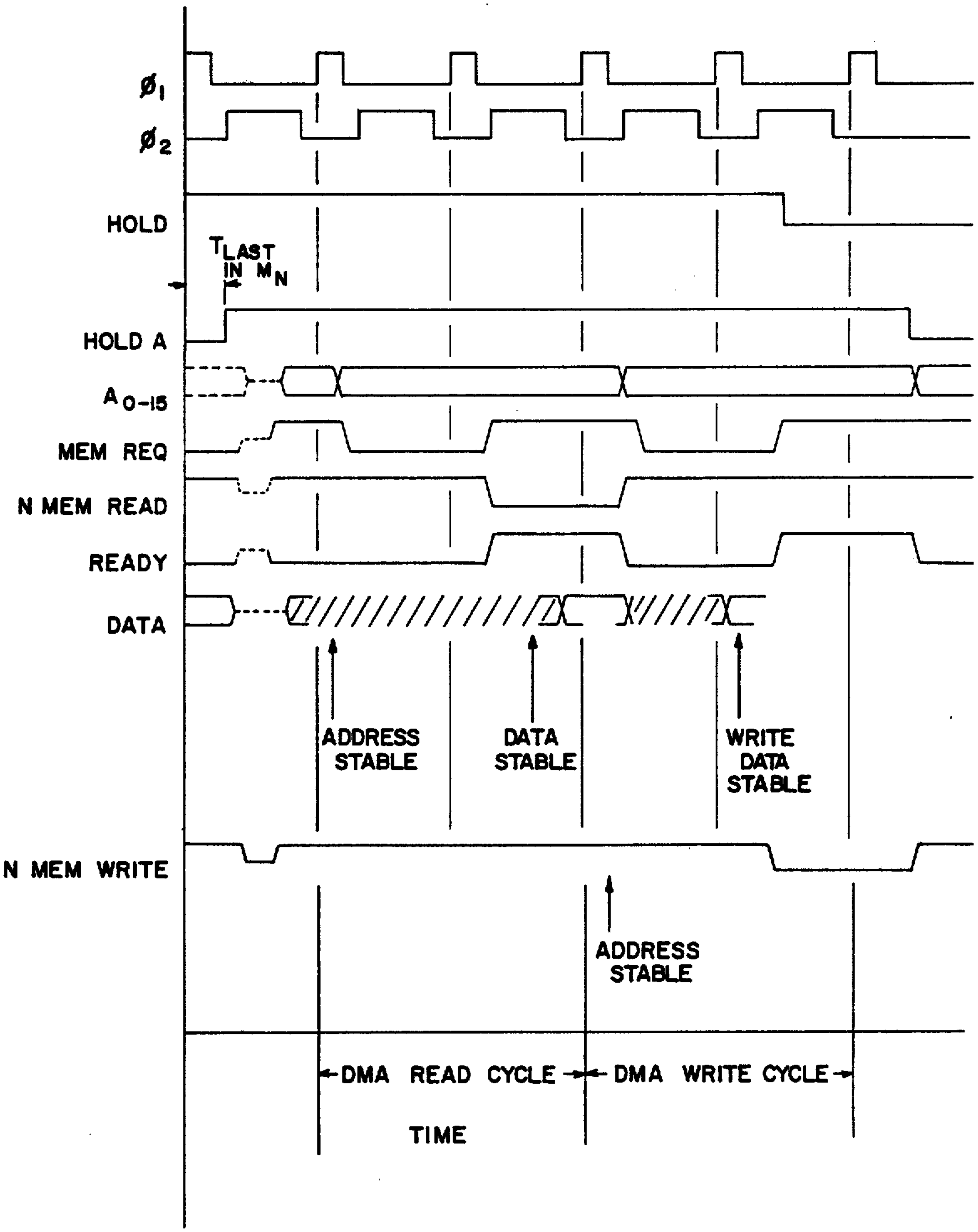
Figure 19A:
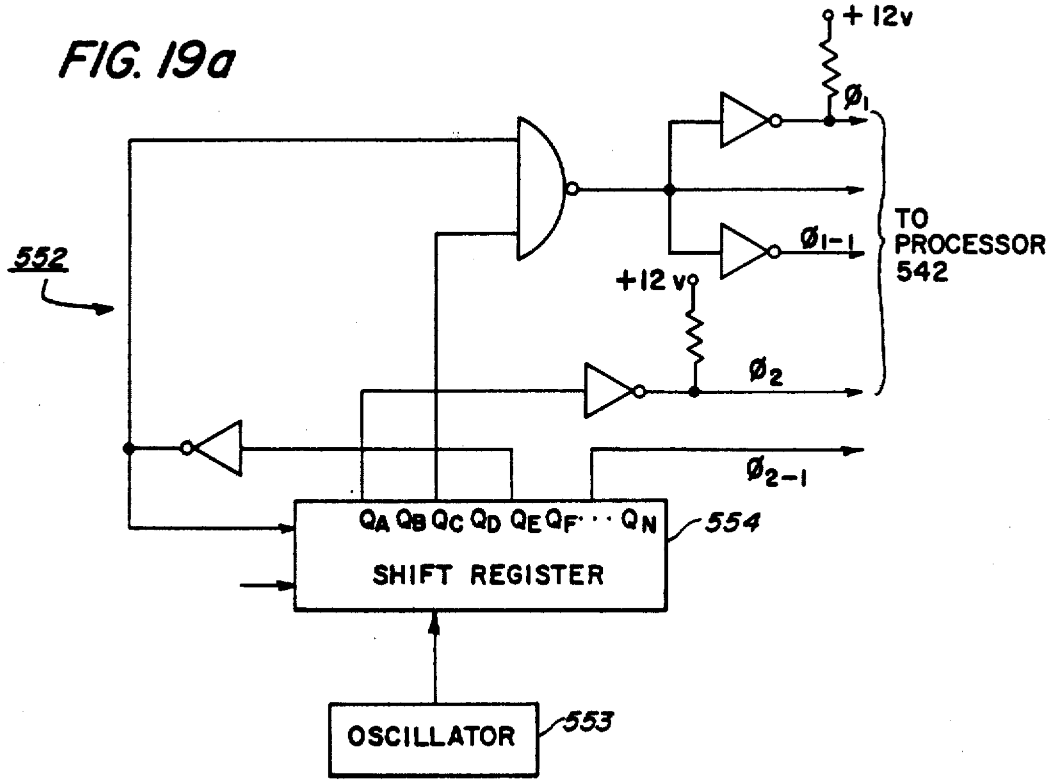
Figure 19B:
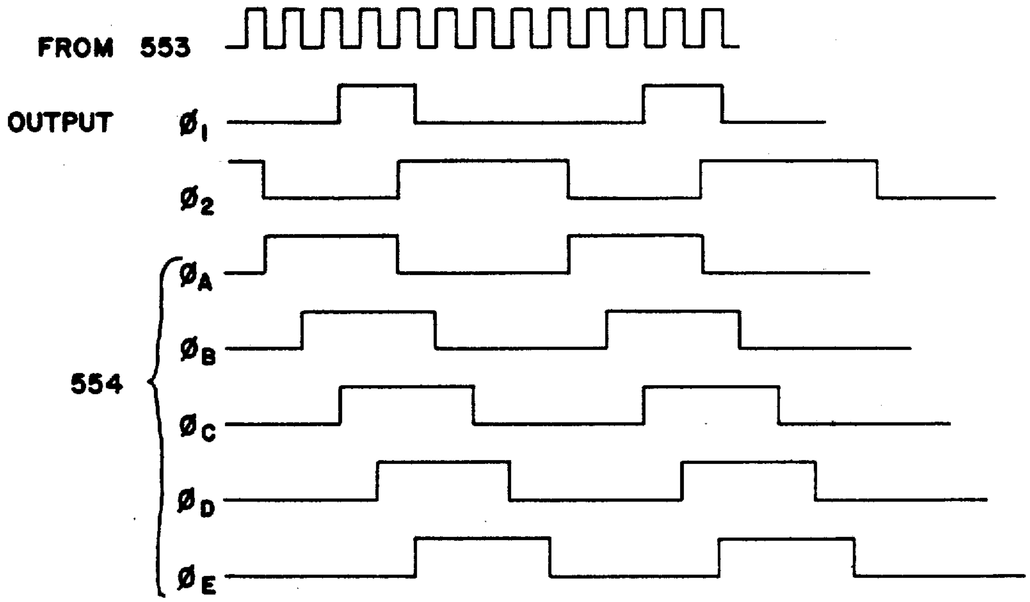

FIG. 18*a* is a block diagram showing the CPU microprocessor input/output connections;

FIG. 18*b* is a timing chart of Direct Memory Access (DMA) Read and Write cycles;

FIG. 19*a* is a logic schematic of the CPU clock;

FIG. 19*b* is a chart illustrating the output wave form of the clock shown in FIG. 19*a;*

Figure 20:
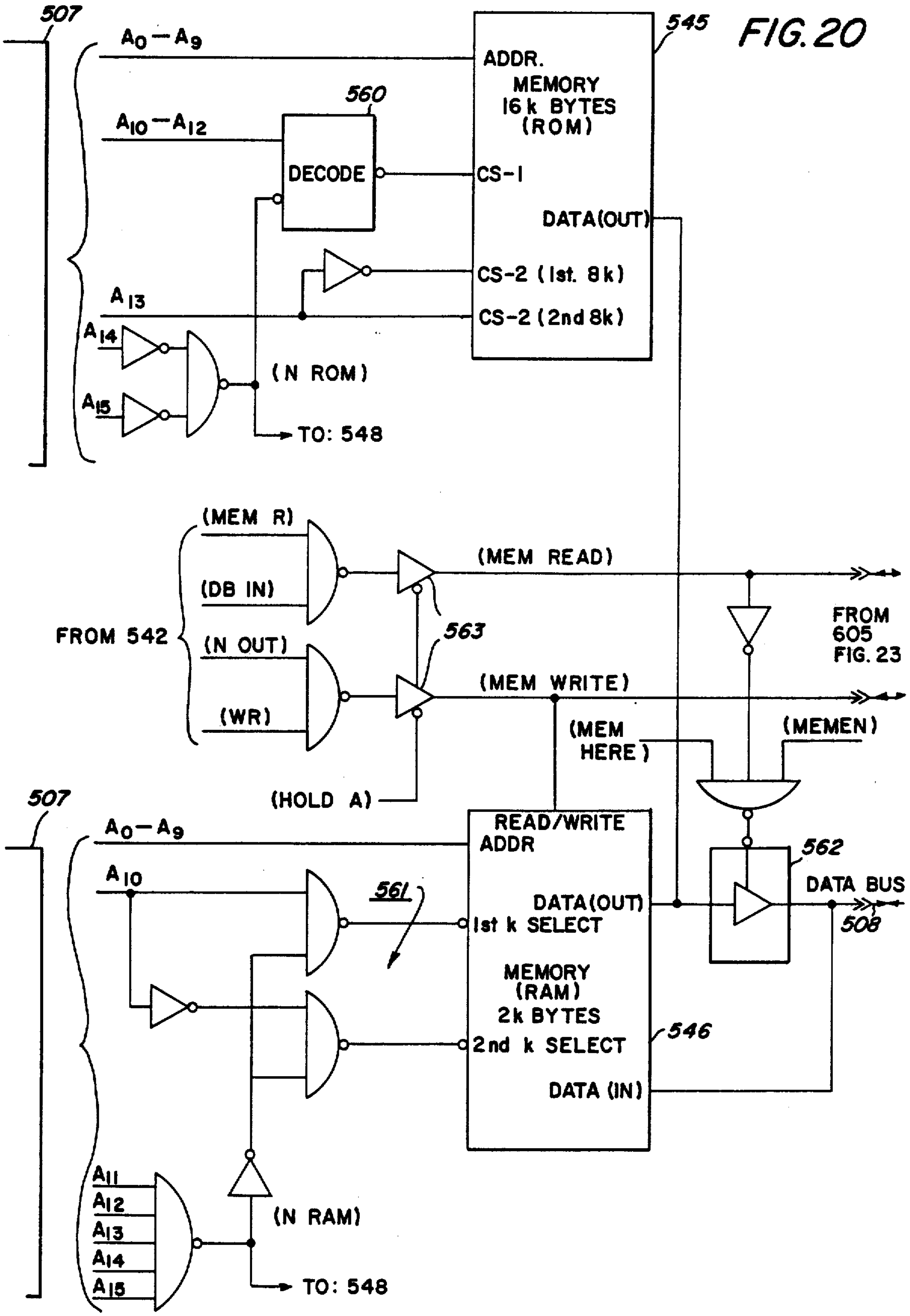
Figure 22A:
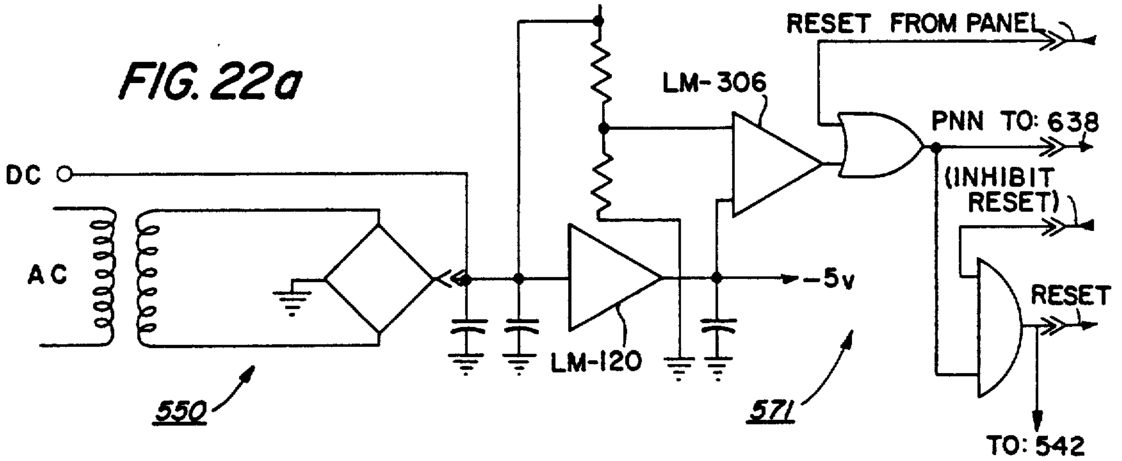
Figure 22B:
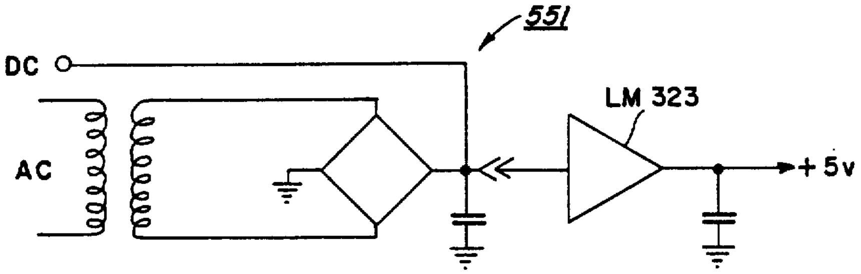
Figure 22C:
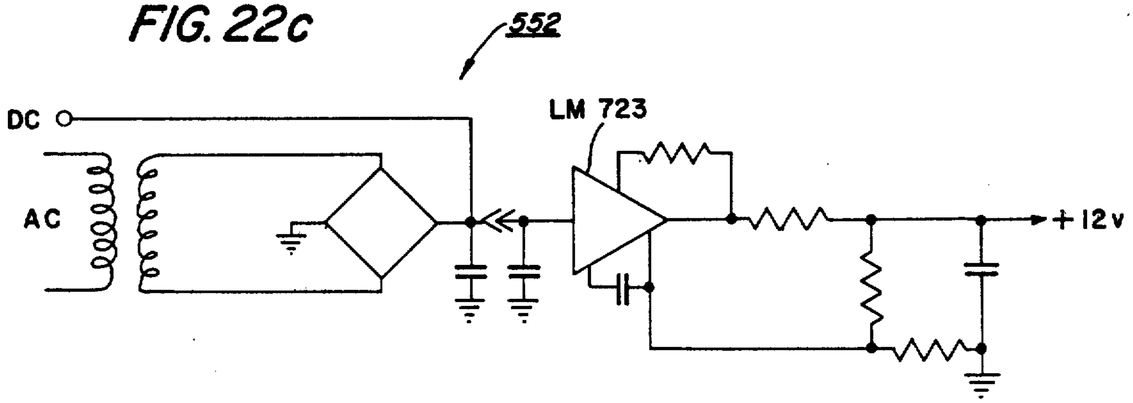
Figure 23A:
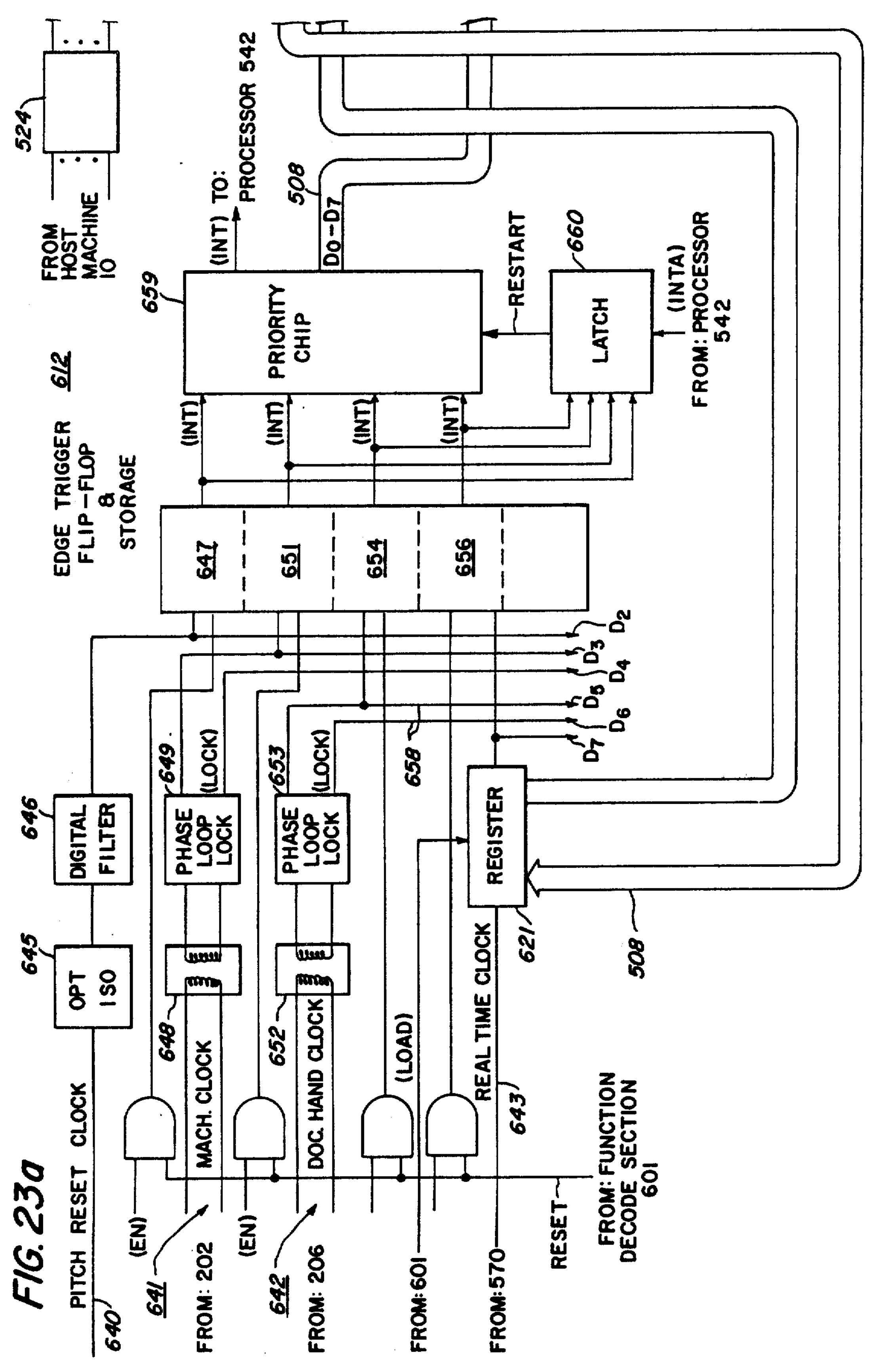
Figure 23B:
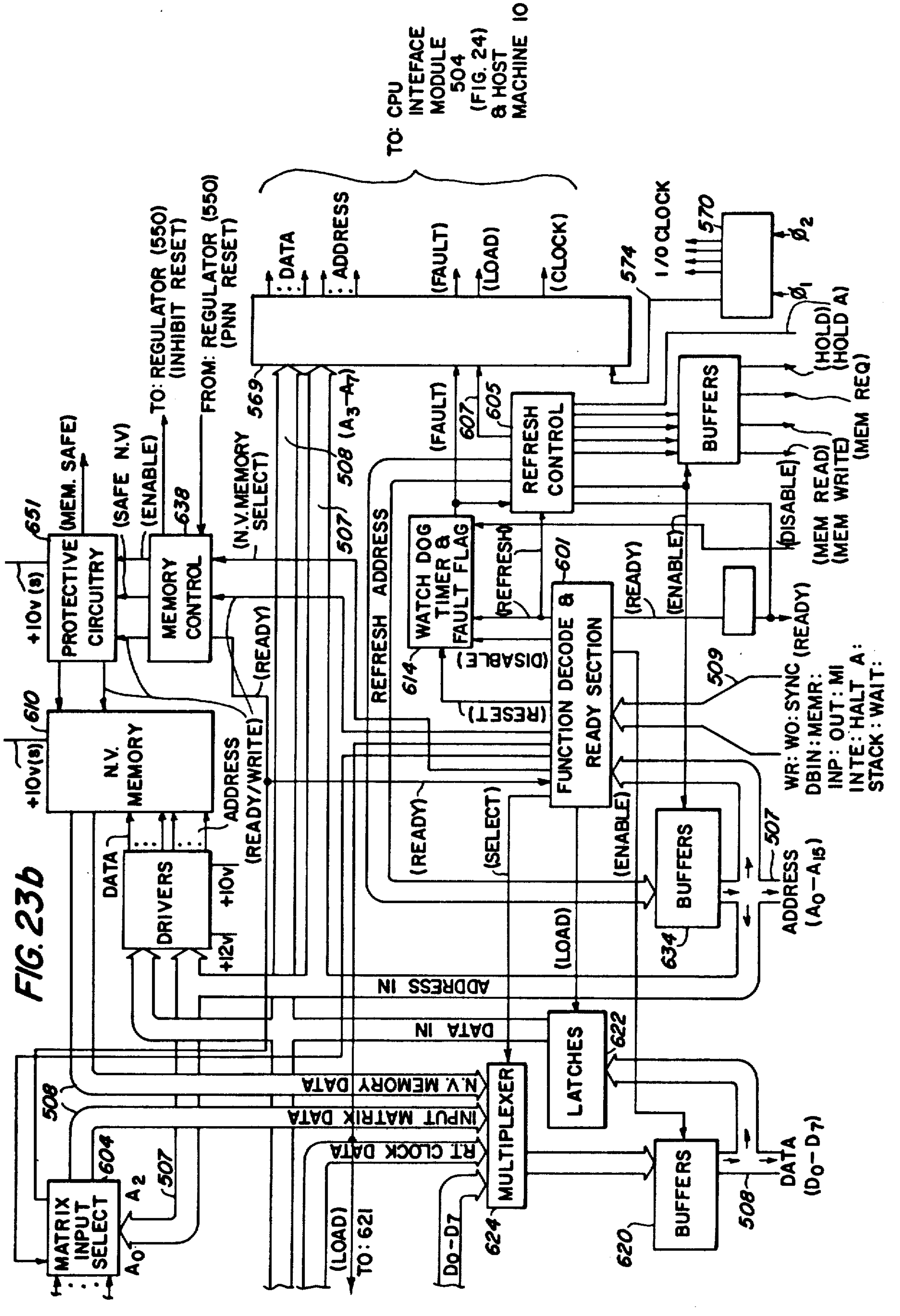
Figure 26:
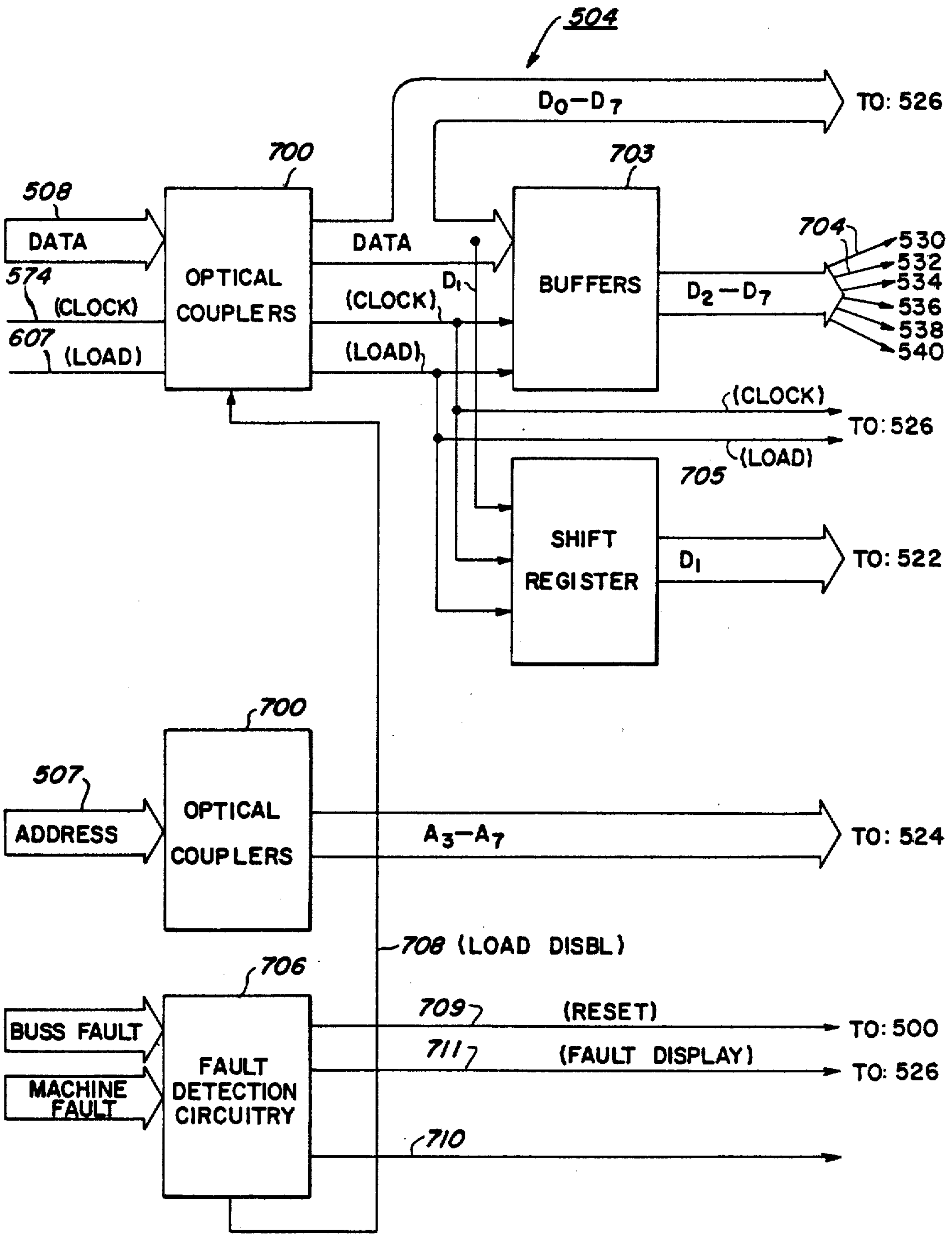
Figure 27:
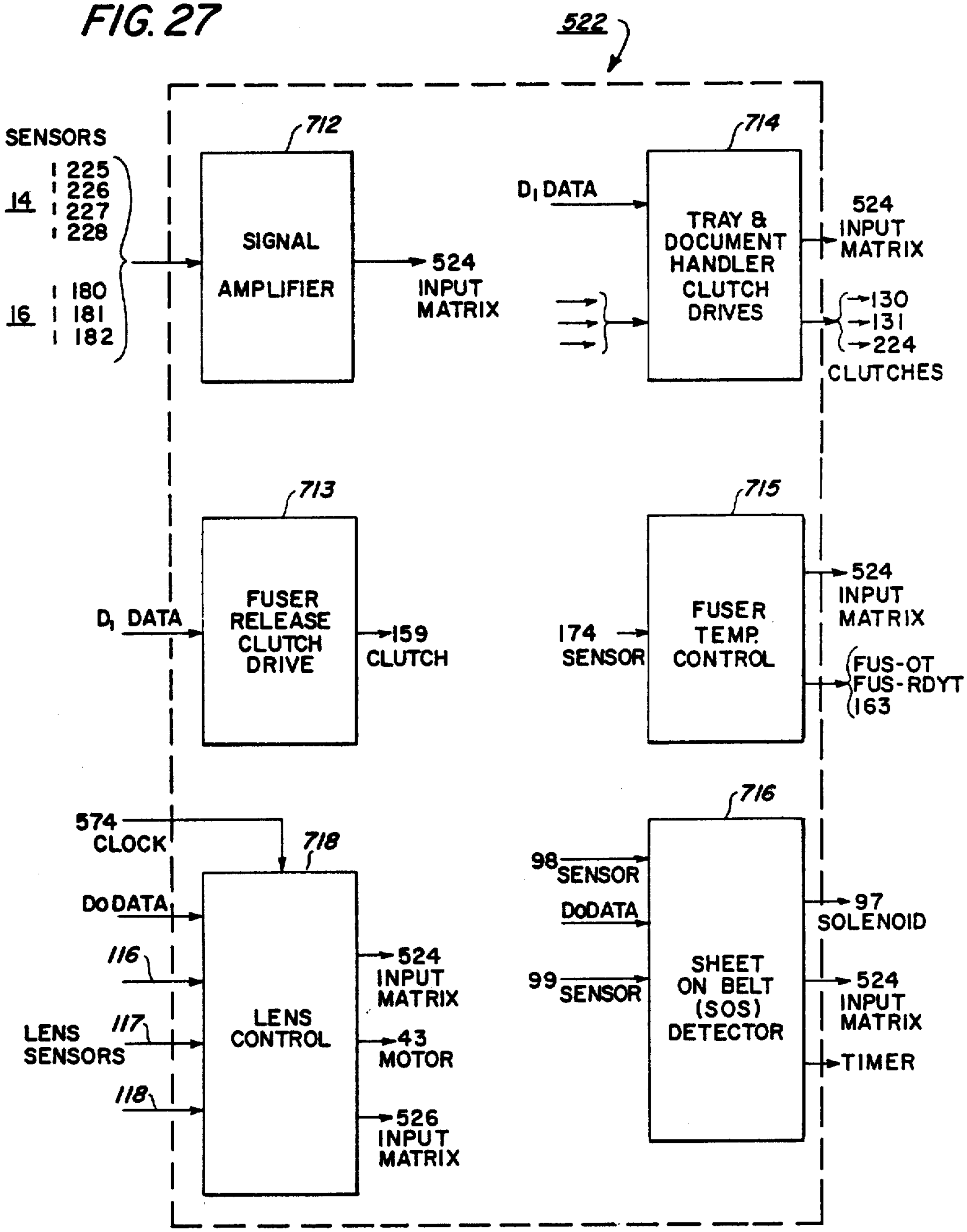
Figure 28:
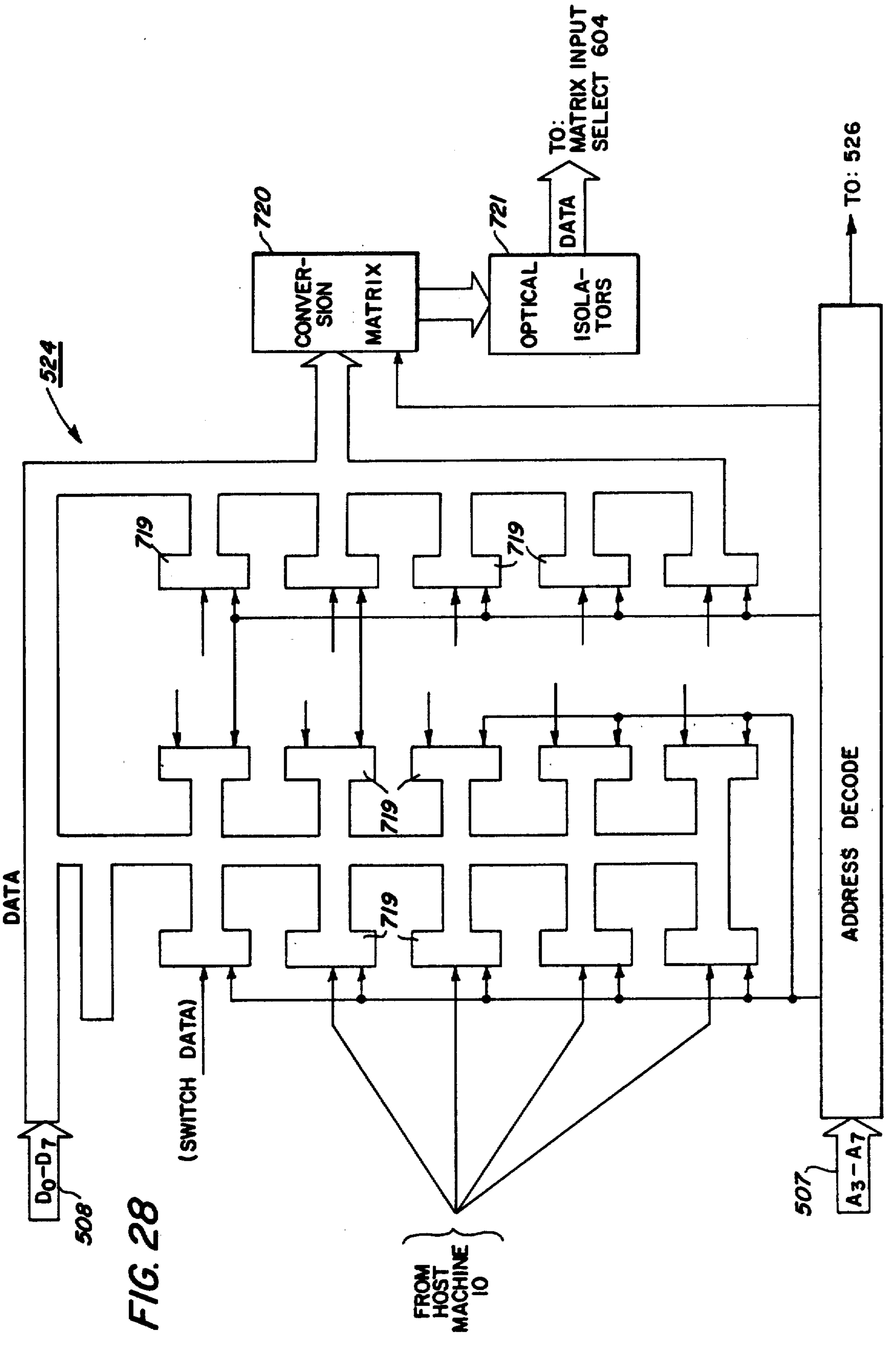
Figure 29:
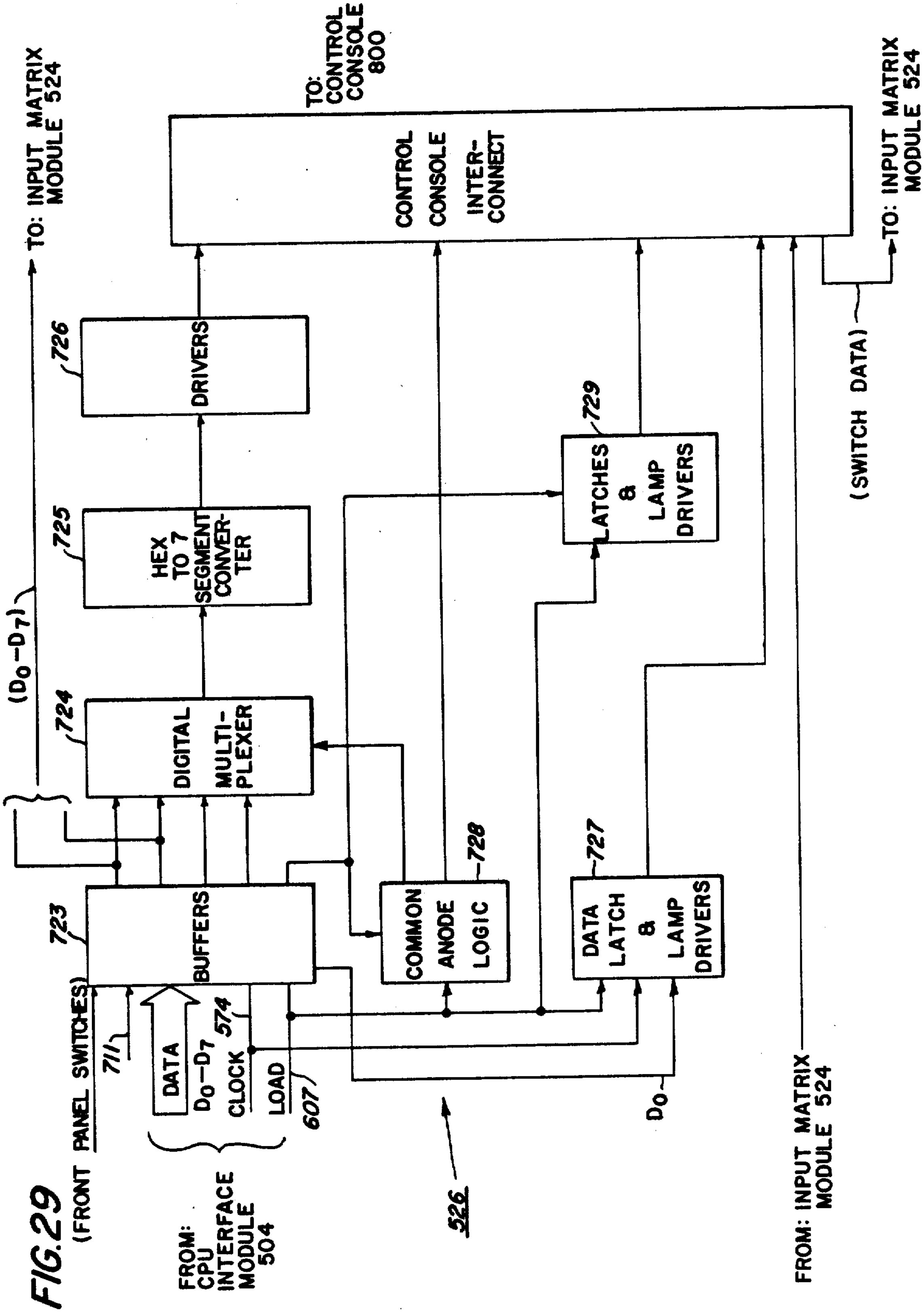
Figure 30:
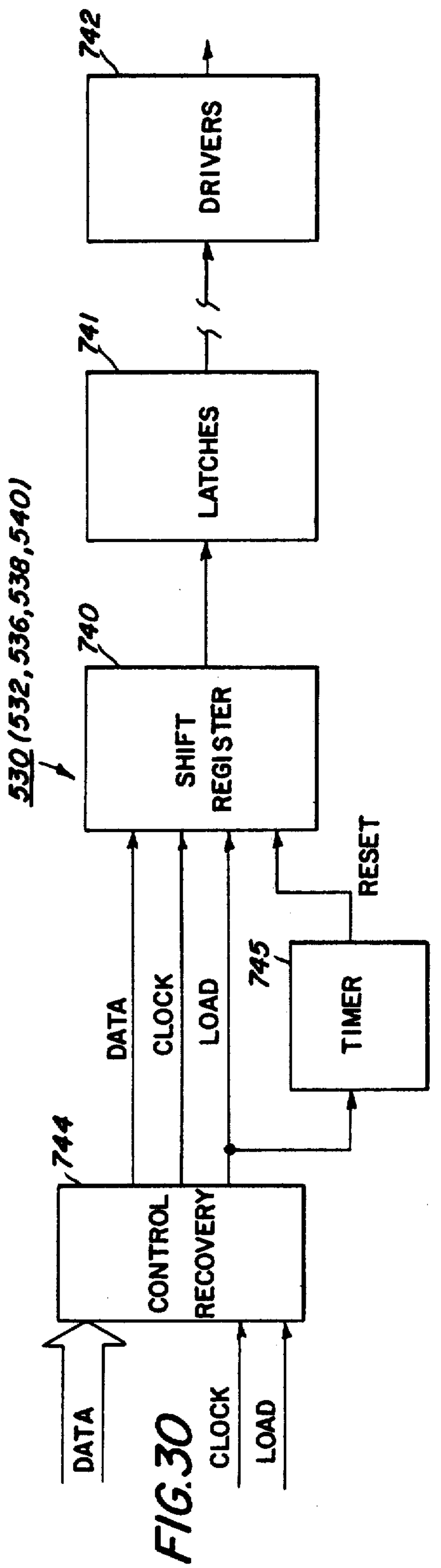
Figure 31:
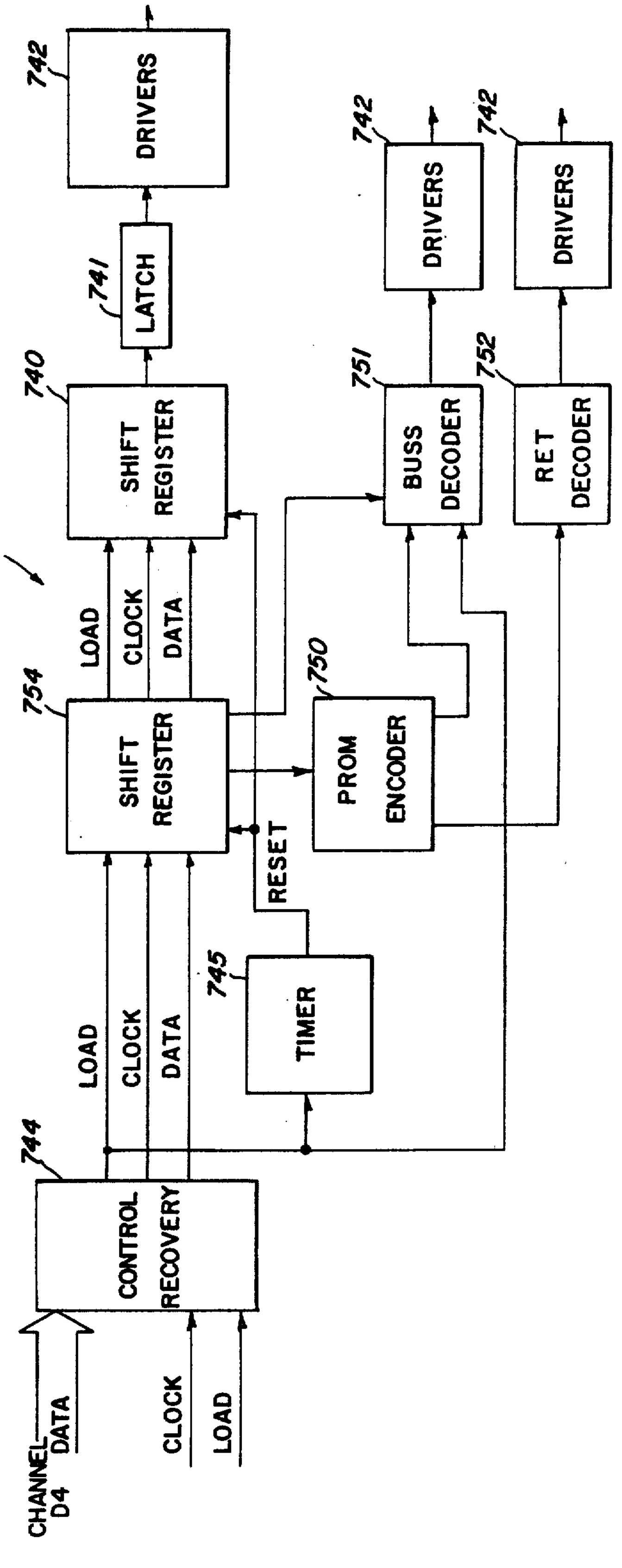
Figure 32:
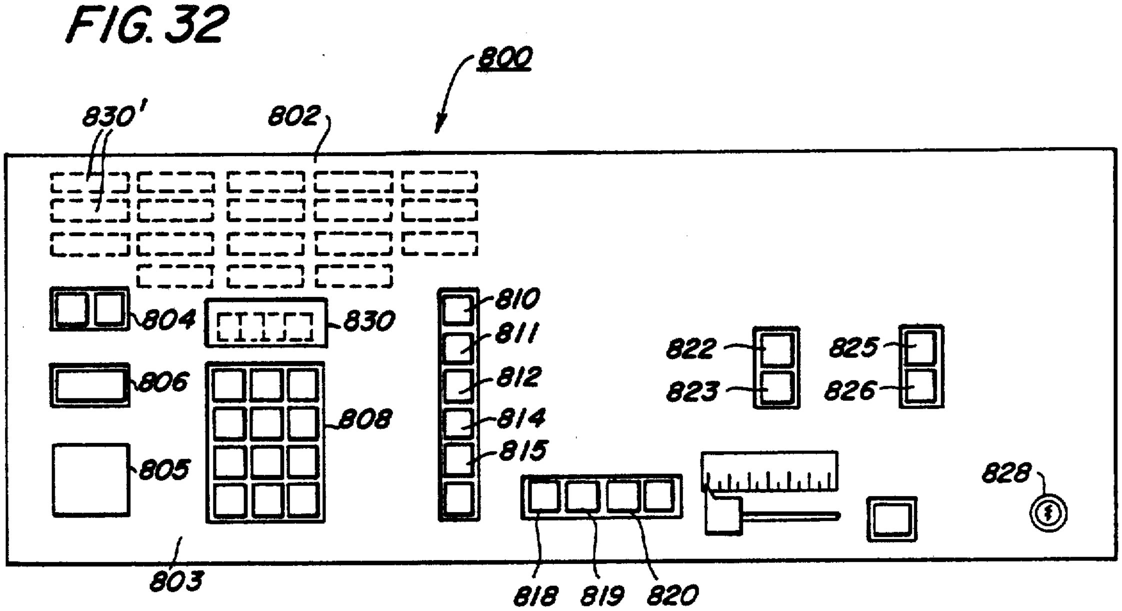
Figure 33:
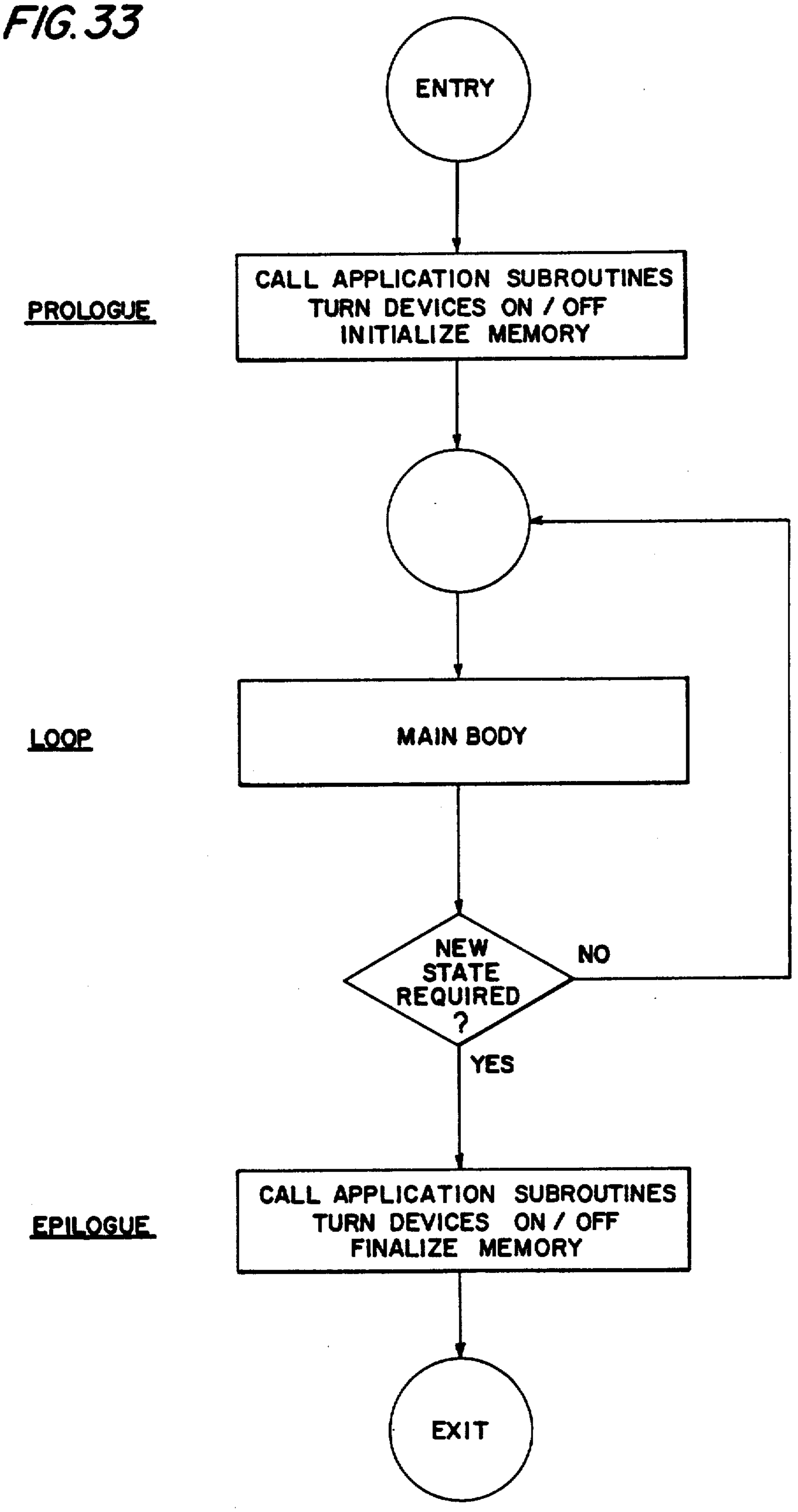
Figure 34A:
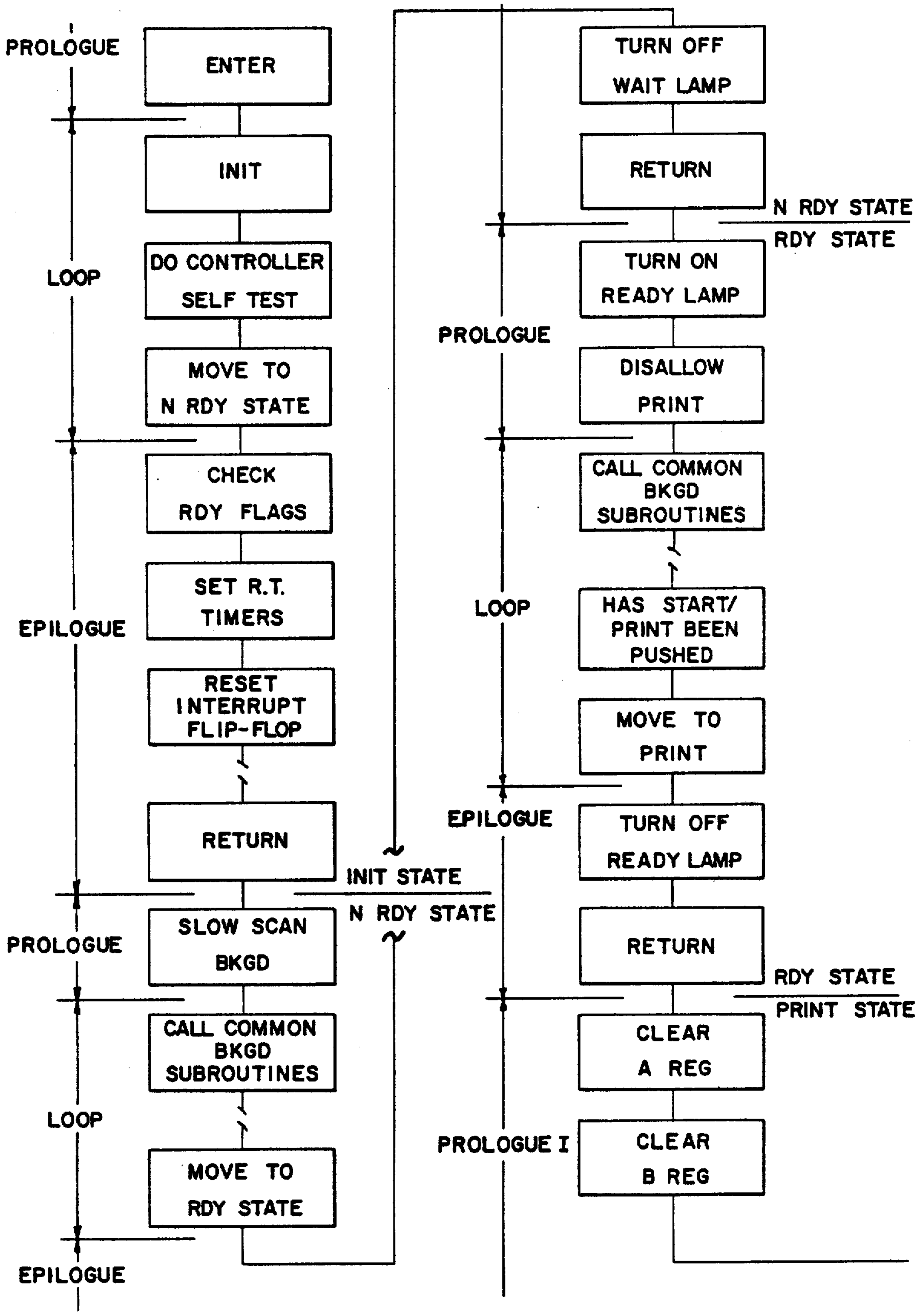
Figure 35:
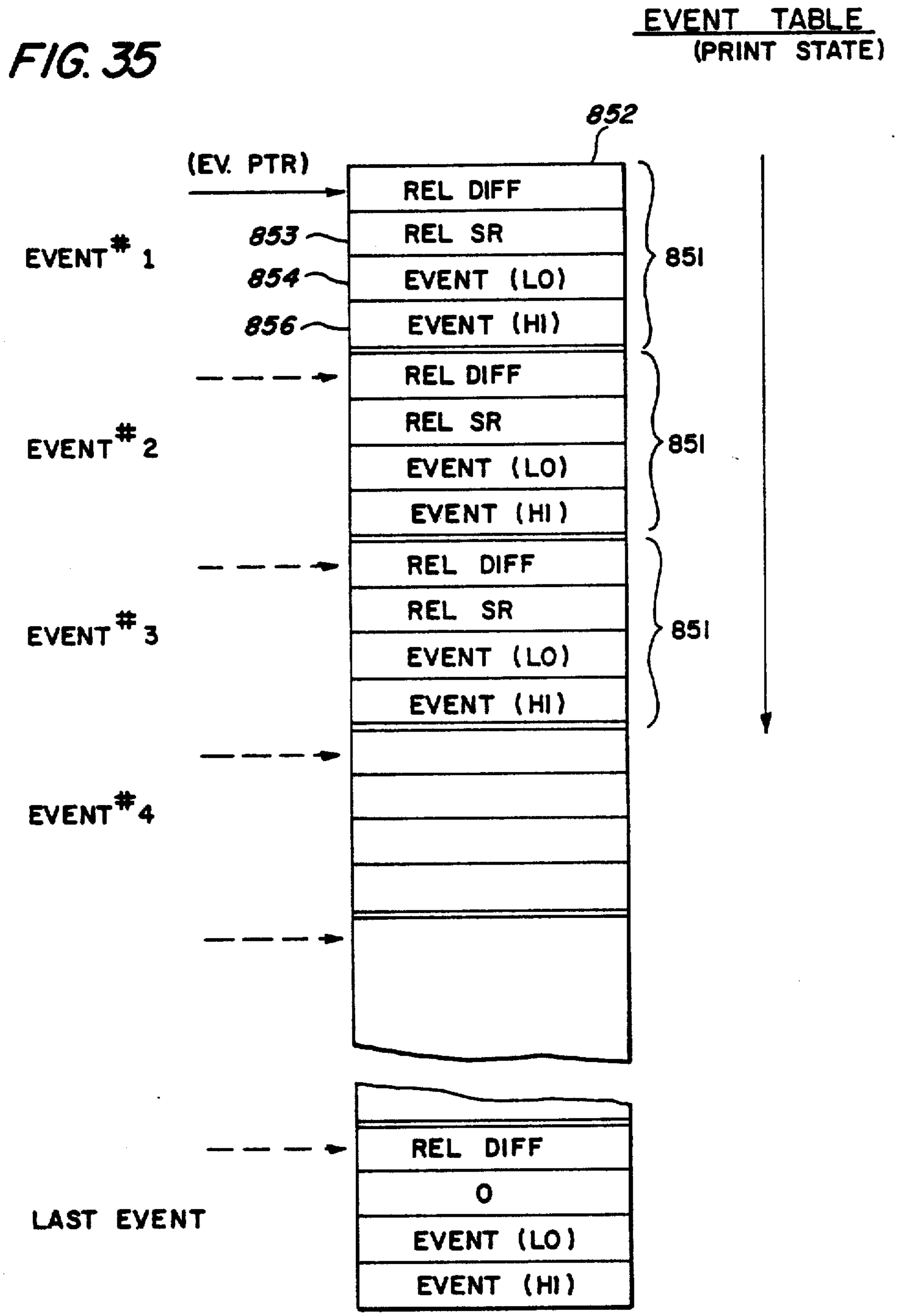
Figure 36:
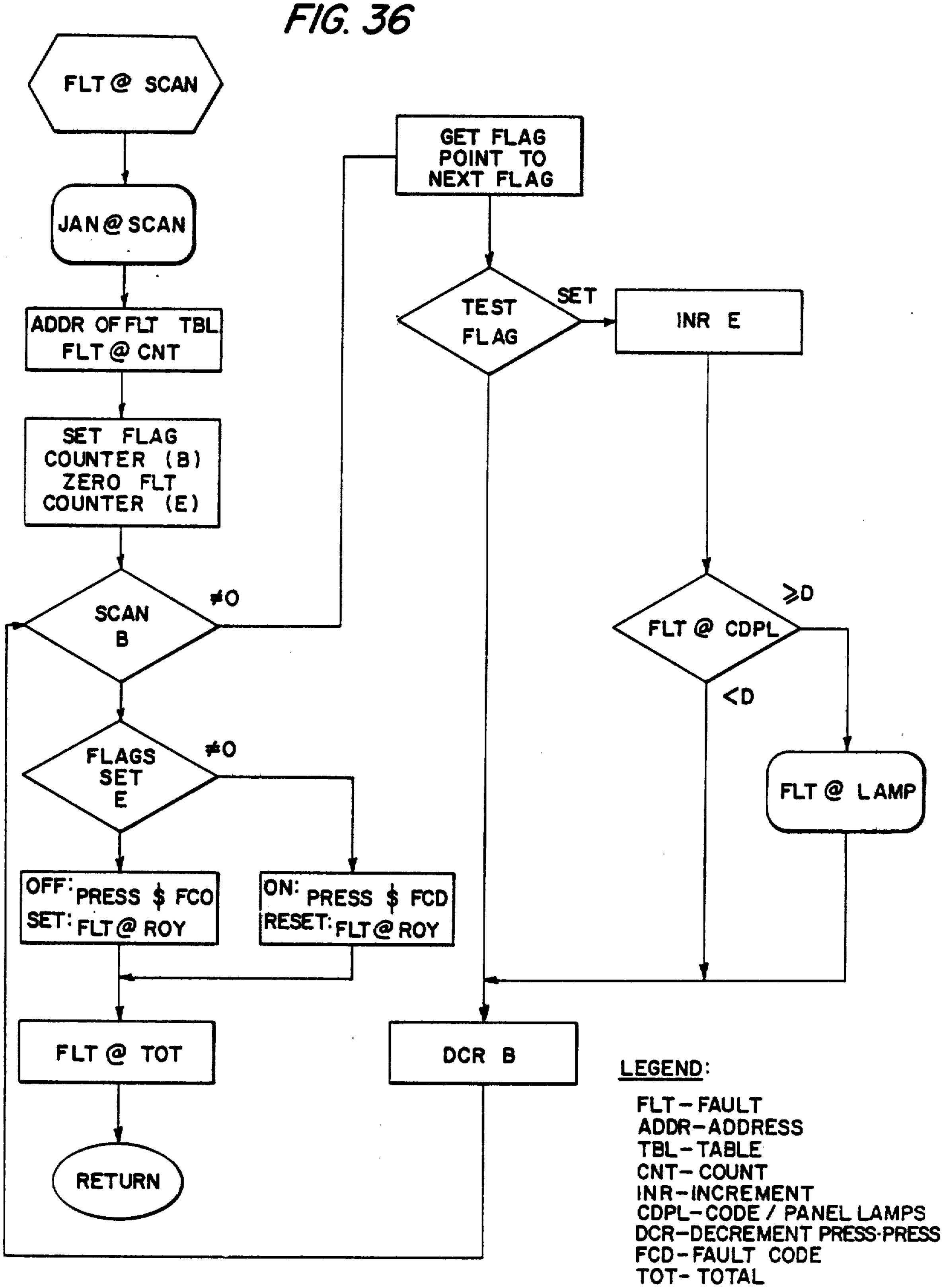
Figure 37:
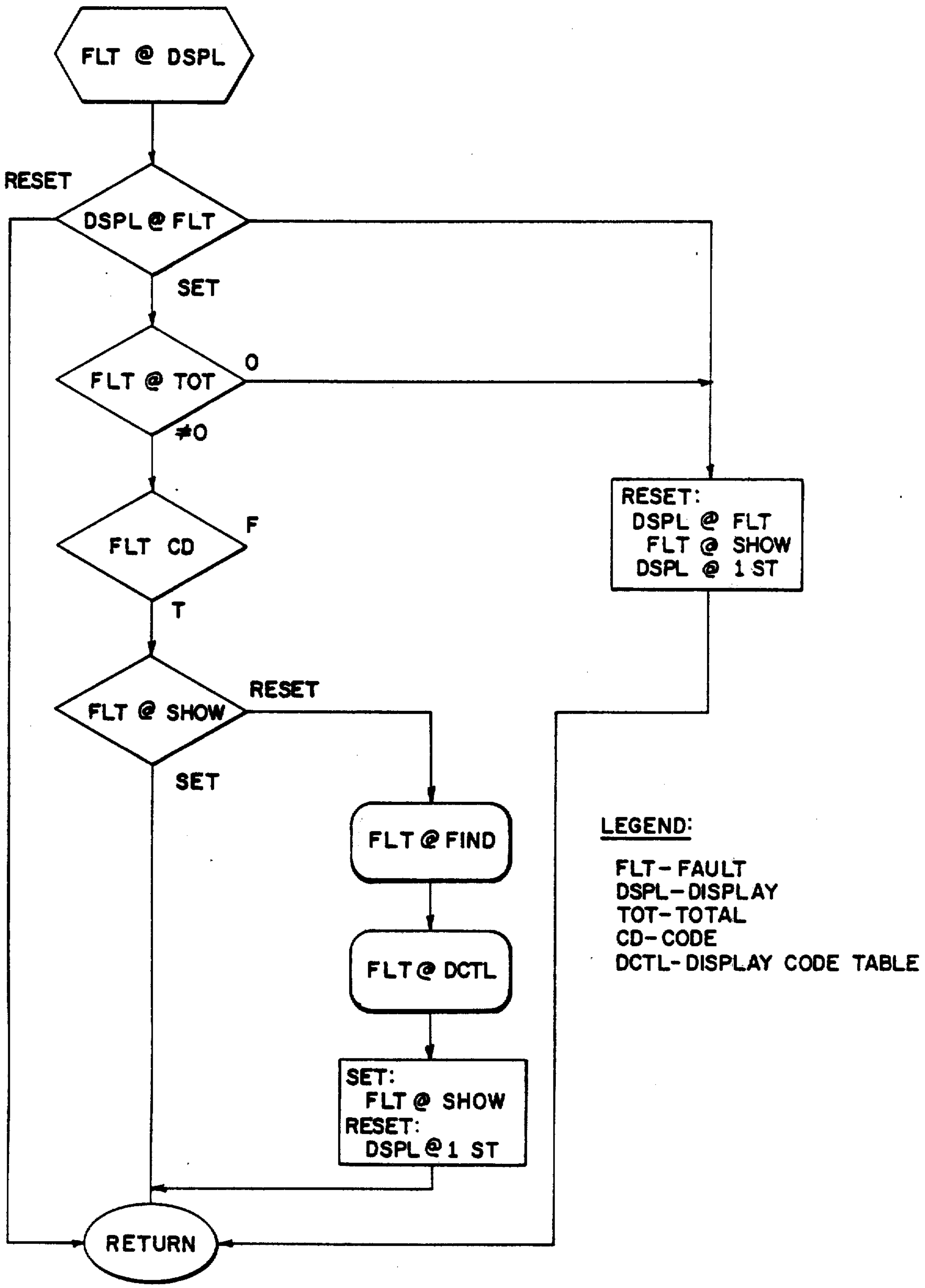
Figure 38:
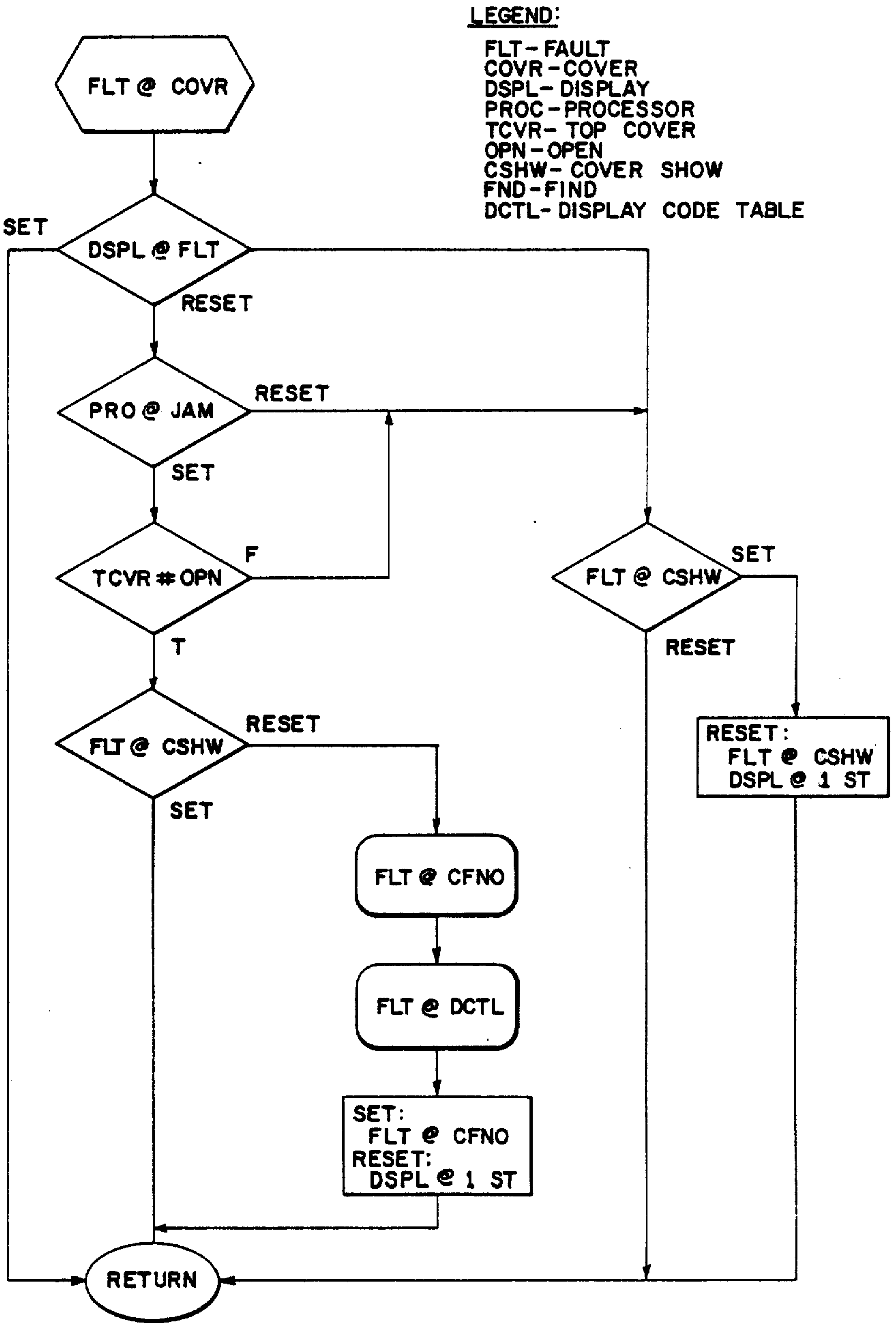
Figure 39A:
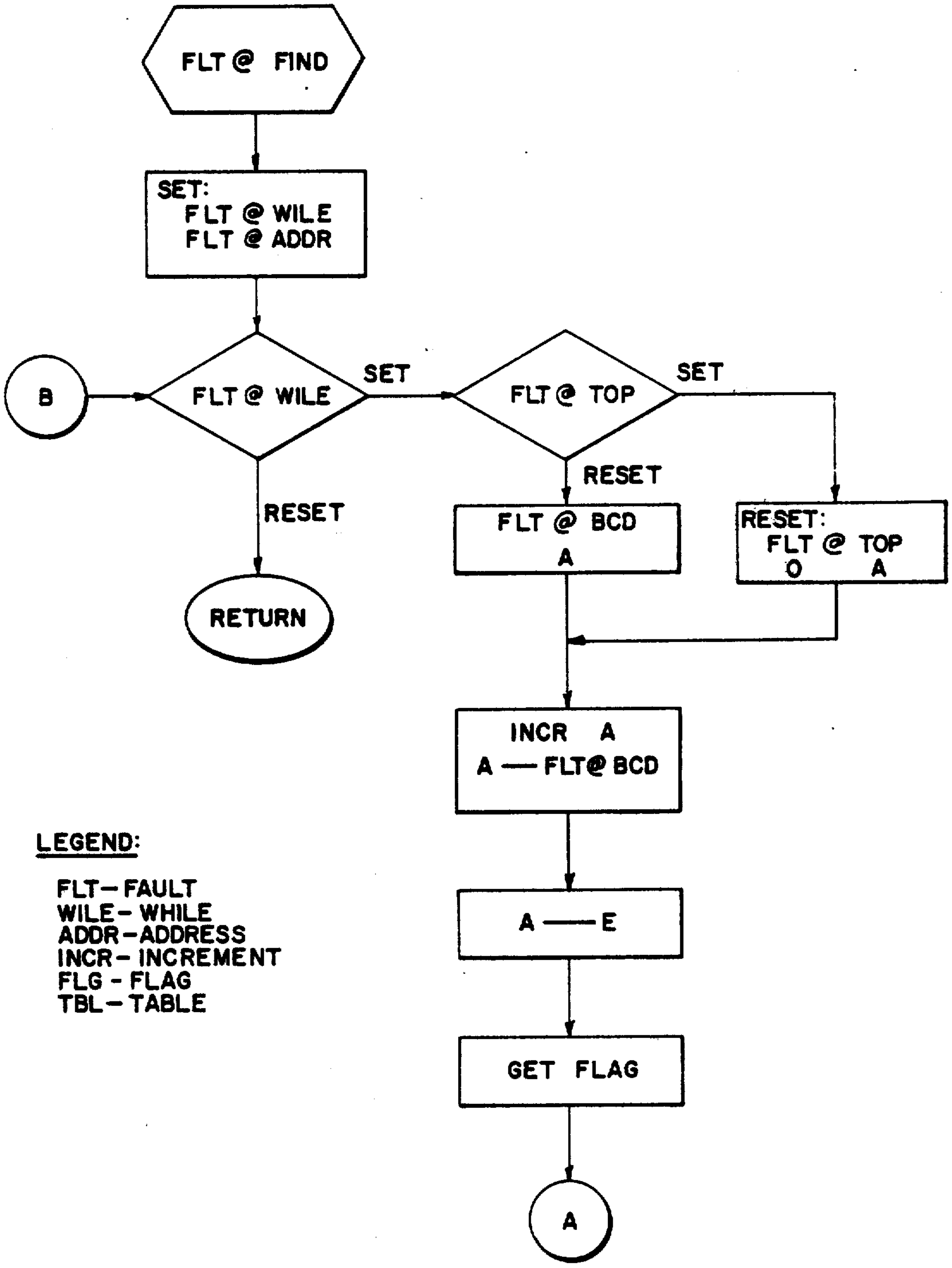
Figure 40:
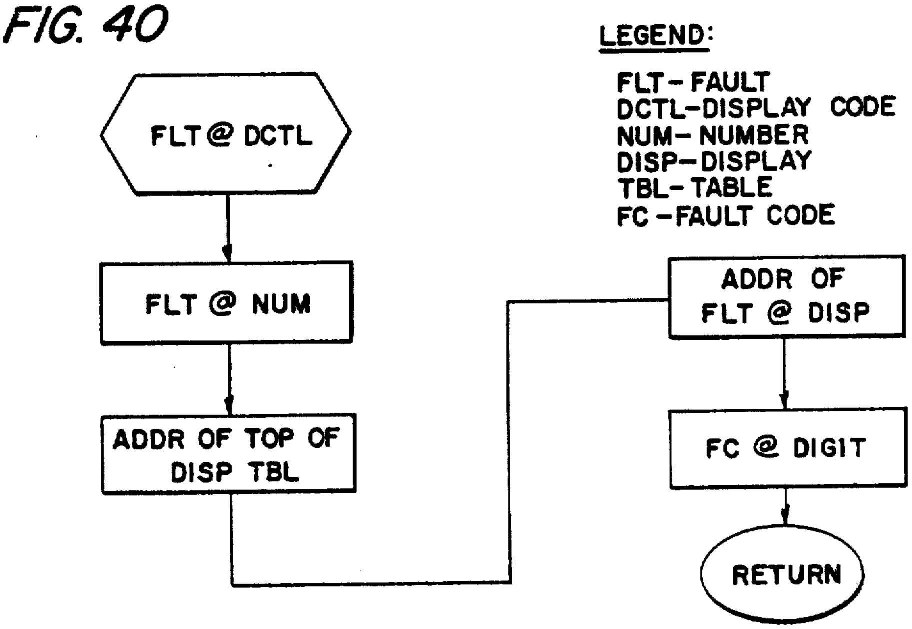
Figure 41:
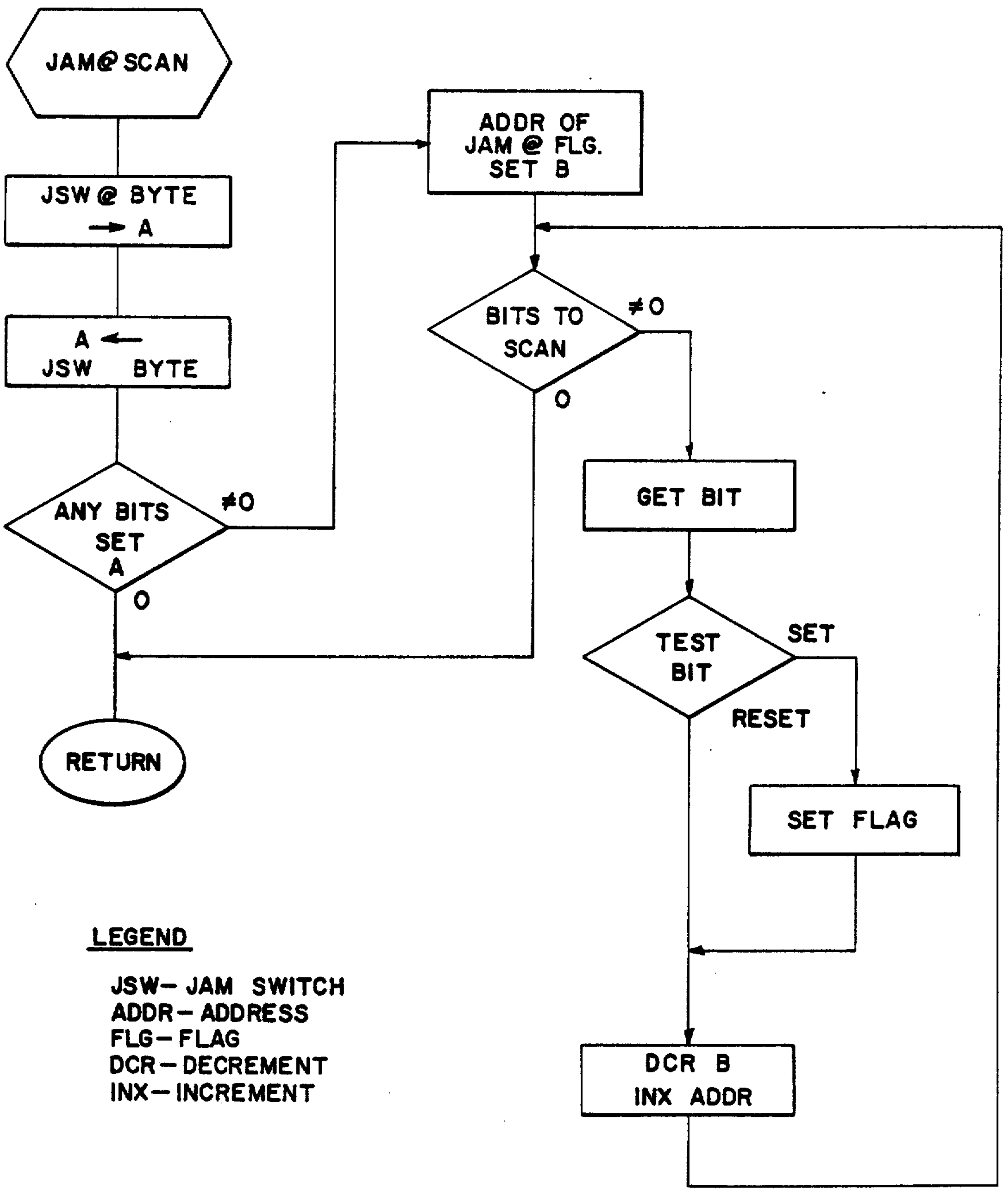
Figure 42:
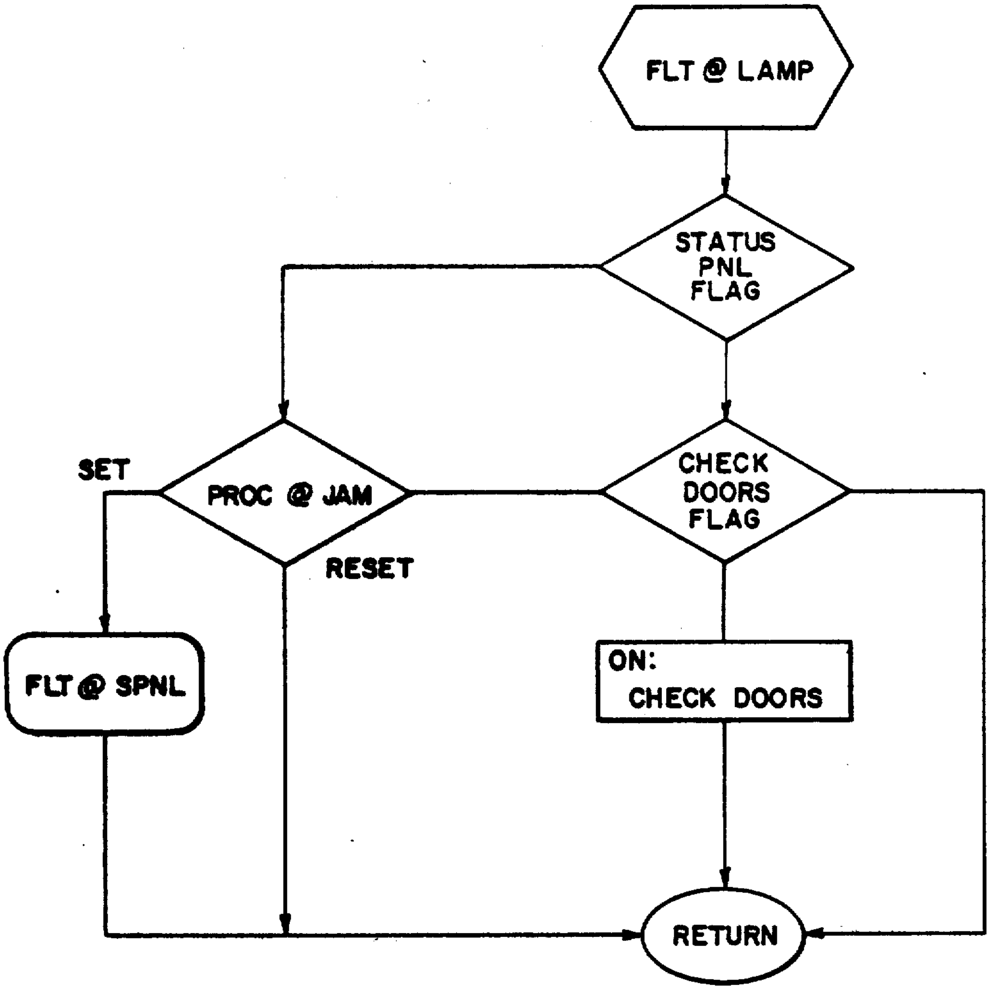
Figure 43:
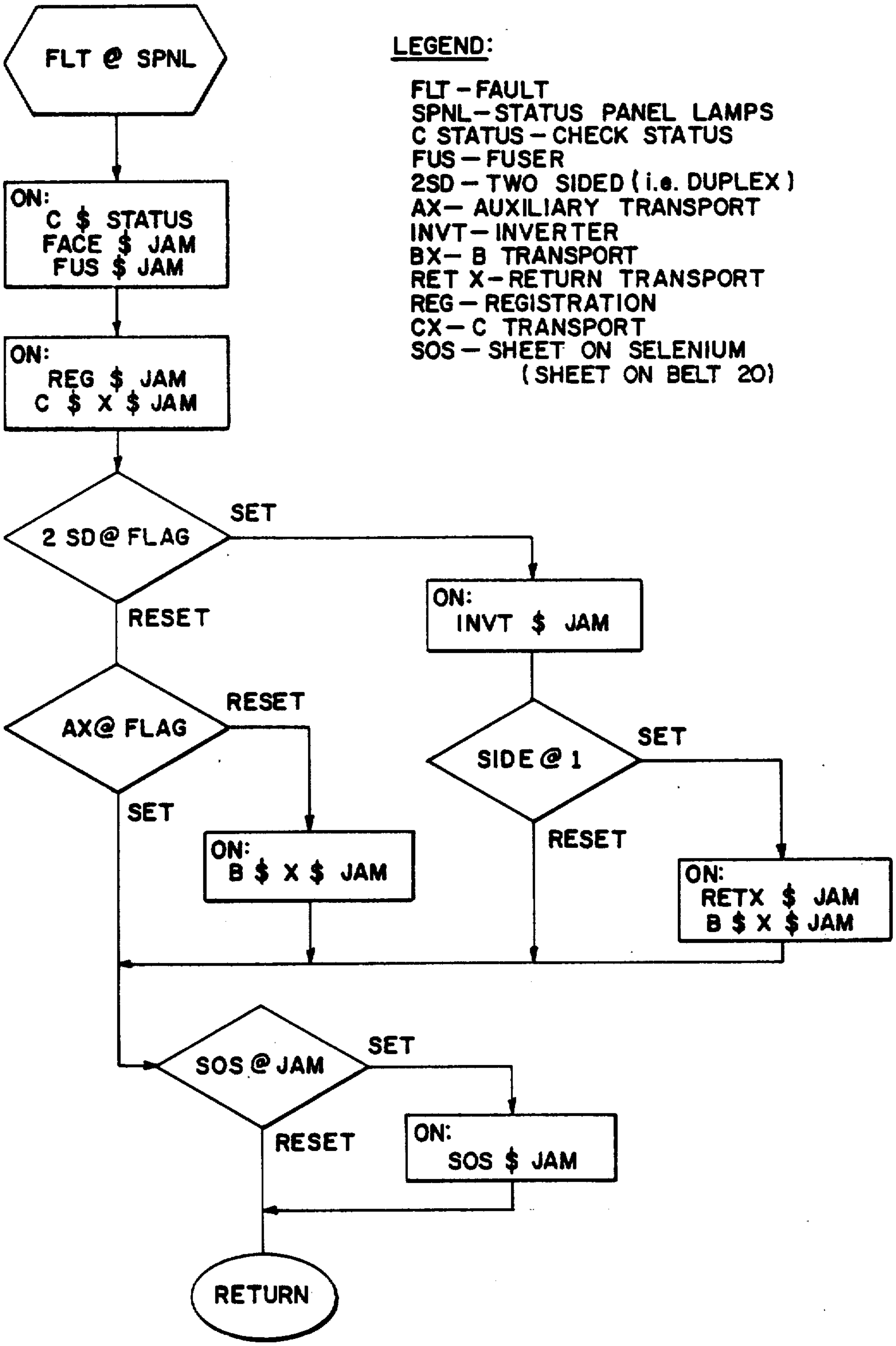
Figure 44A:
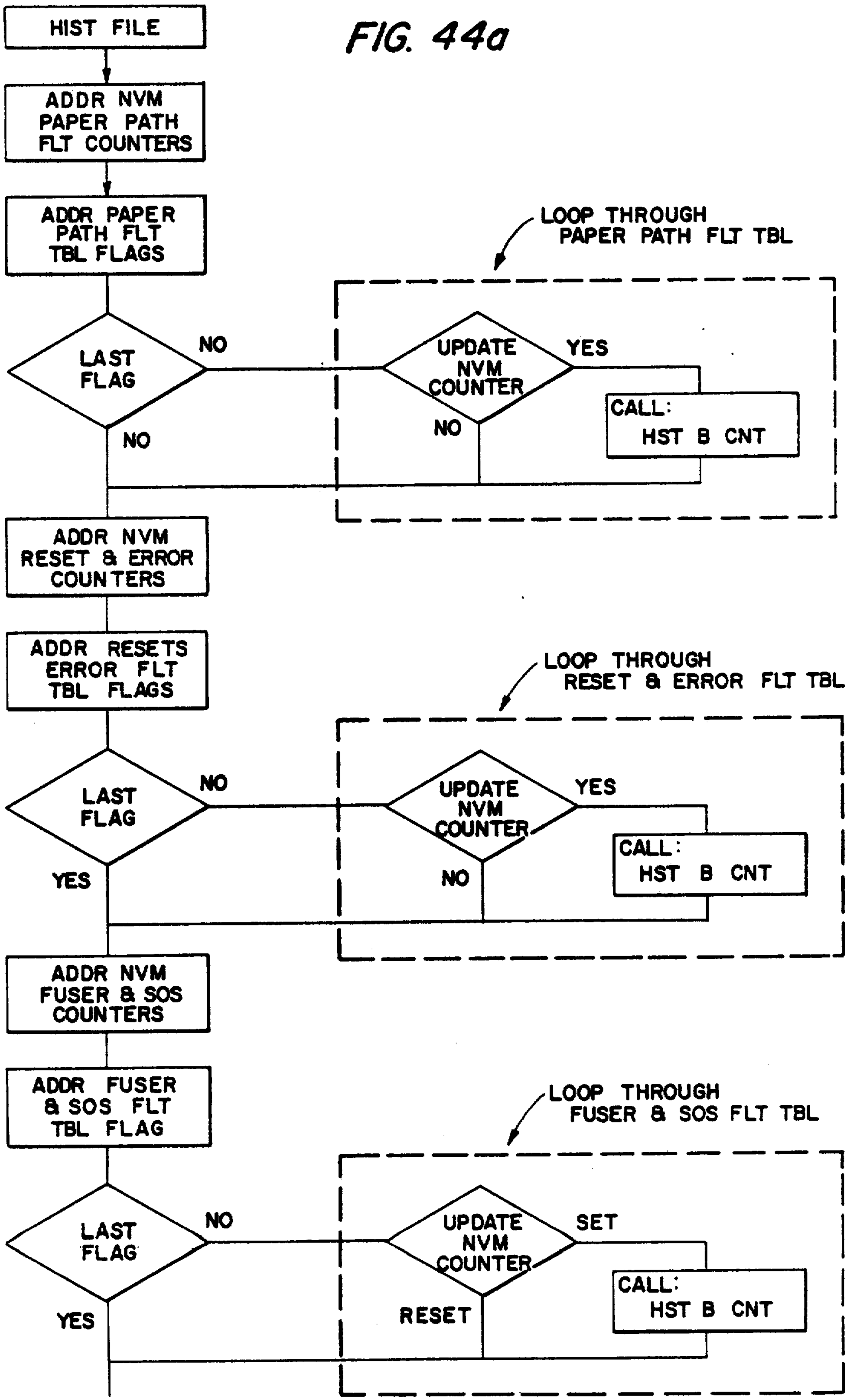
Figure 45:
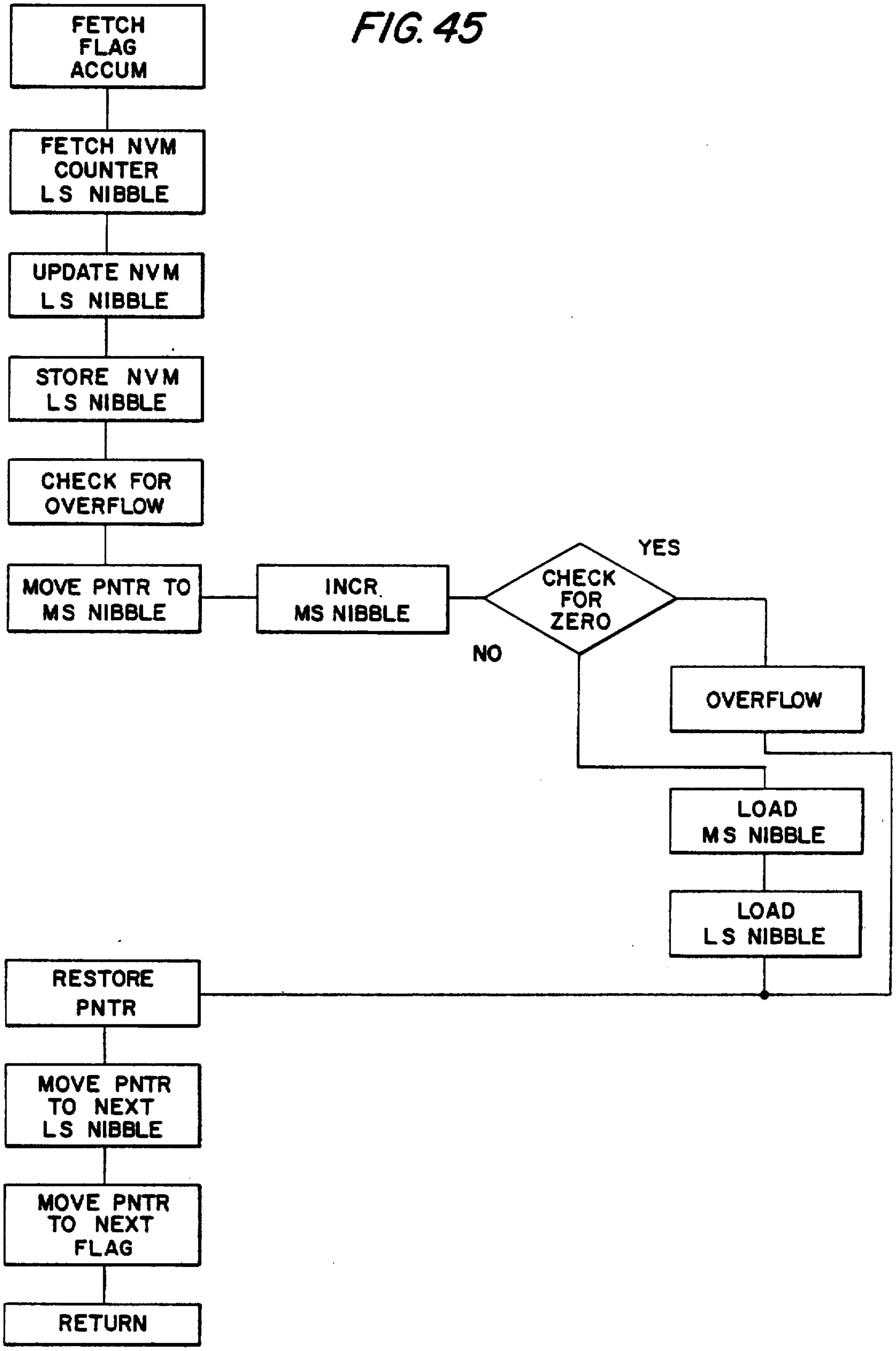

FIG. 20 is a logic schematic of the CPU memory;

FIG. 21 is a logic schematic of the CPU memory ready;

FIGS. 22*a*, 22*b*, 22*c* are logic schematics of the CPU power supply stages;

FIGS. 23*a* and 23*b* comprise a block diagram of the controller I/O module;

FIG. 24 is a logic schematic of the nonvolatile memory power supply;

FIG. 25 is a block diagram of the apparatus interface and remote output connections;

FIG. 26 is a block diagram of the CPU interface module;

FIG. 27 is a block diagram of the apparatus special circuits module;

FIG. 28 is a block diagram of the main panel interface module;

FIG. 29 is a block diagram of the input matrix module;

FIG. 30 is a block diagram of a typical remote;

FIG. 31 is a block diagram of the sorter remote;

FIG. 32 is a view of the control console for inputting copy run instructions to the apparatus shown in FIG. 1;

FIG. 33 is a flow chart illustrating a typical machine state;

FIG. 34*a* and *b* is a flow chart of the machine state routine;

FIG. 35 is a view showing the event table layout;

FIG. 36 is a flow chart of the fault scanning routine;

FIG. 37 is a flow chart of the fault display routine;

FIG. 38 is a flow chart of the cover actuated fault display routine;

FIG. 39*a* and *b* is a flow chart of the fault find routine;

FIG. 40 is a flow chart of the fault code digit fetch routine;

FIG. 41 is a flow chart of the jam scan routine;

FIG. 42 is a flow chart of the fault lamp control routine;

FIG. 43 is a flow chart of the fault status panel lamp routine;

FIG. 44*a, b* and *c* is a flow chart of the non-volatile memory update routine;

FIG. 45 is a flow chart of the byte counter update routine; and

Figure 46A:
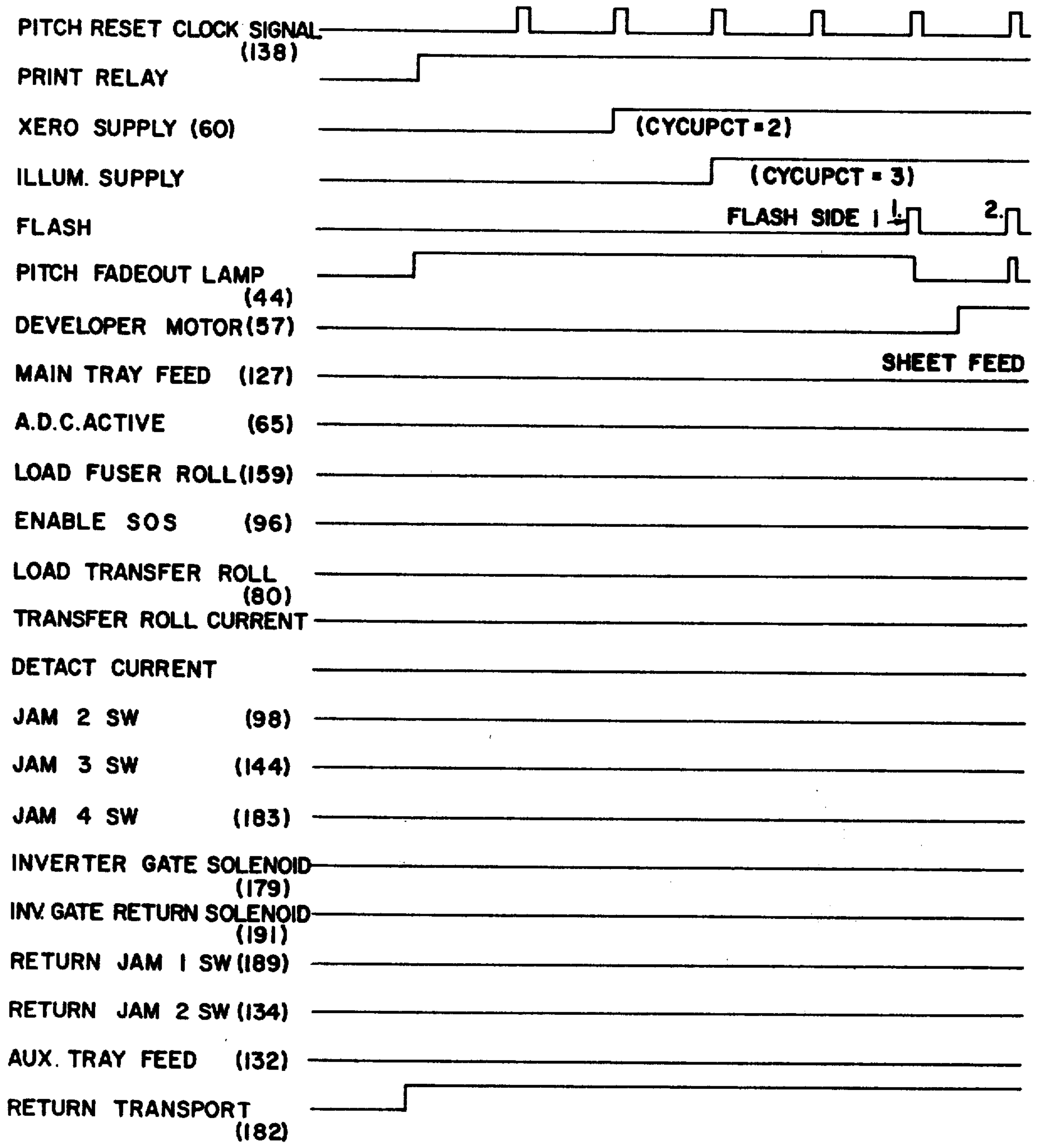

FIG. 46*a, b* and *c* is a timing chart illustrating an exemplary copy run.

Figure 1A:
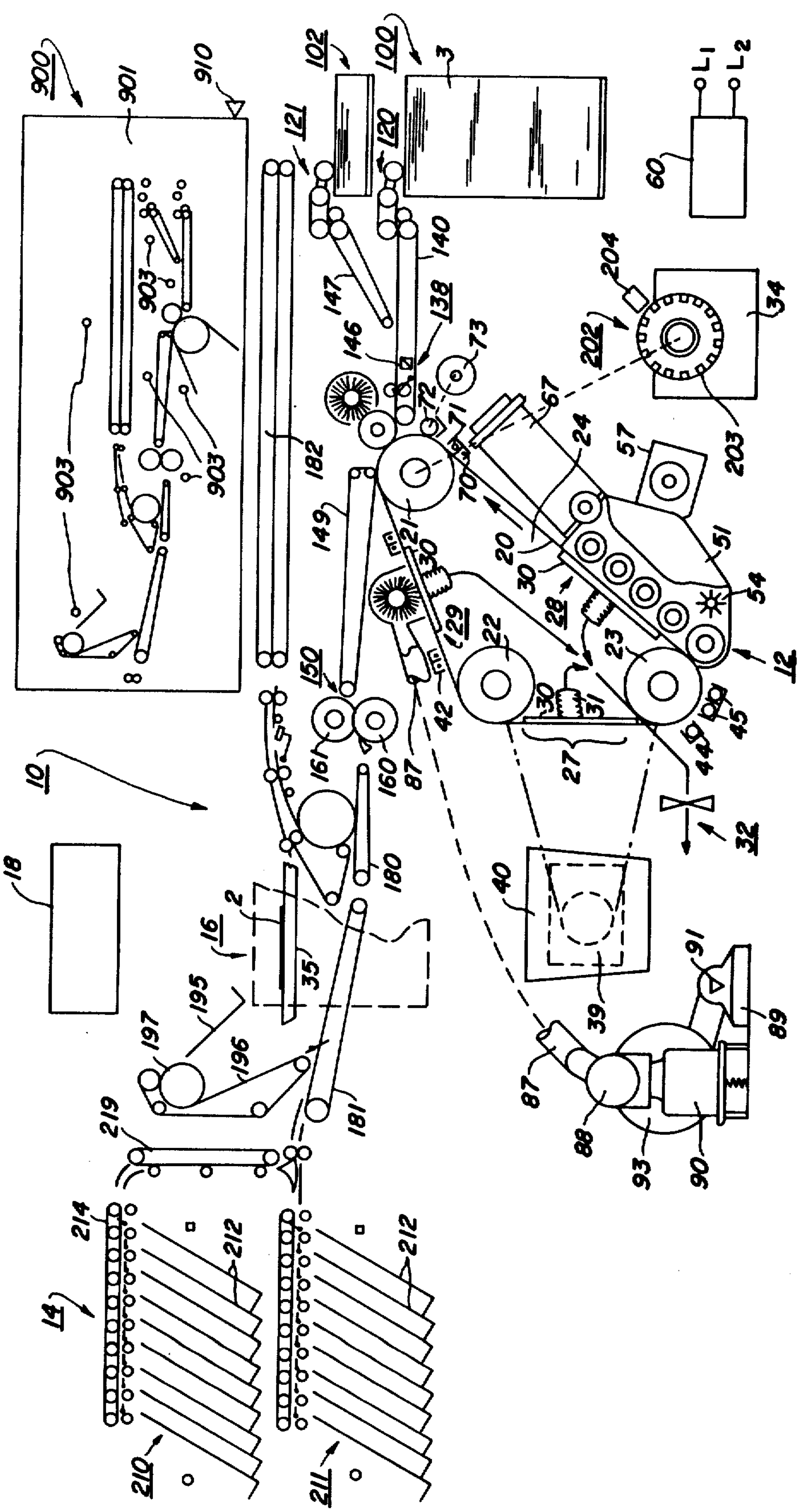
Figure 1B:
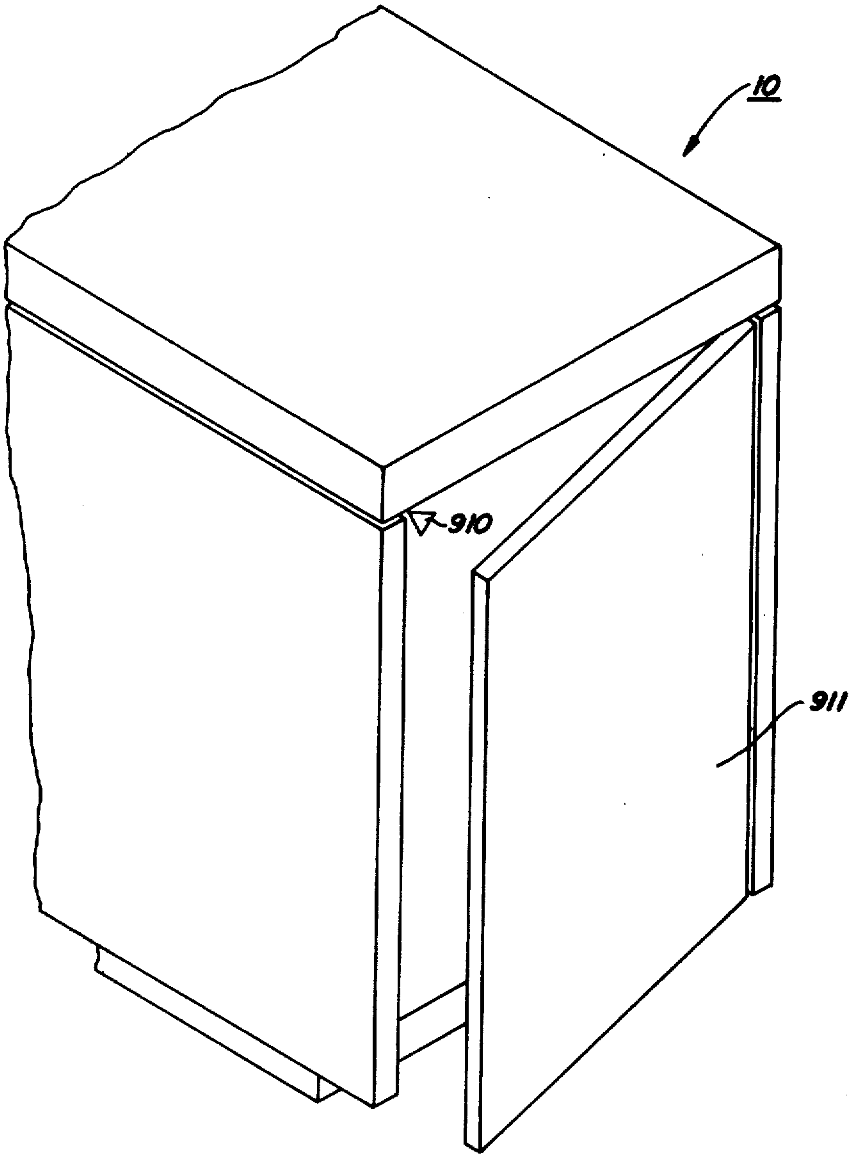

Referring particularly to FIGS. 1*a,* 2 and 3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead be envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
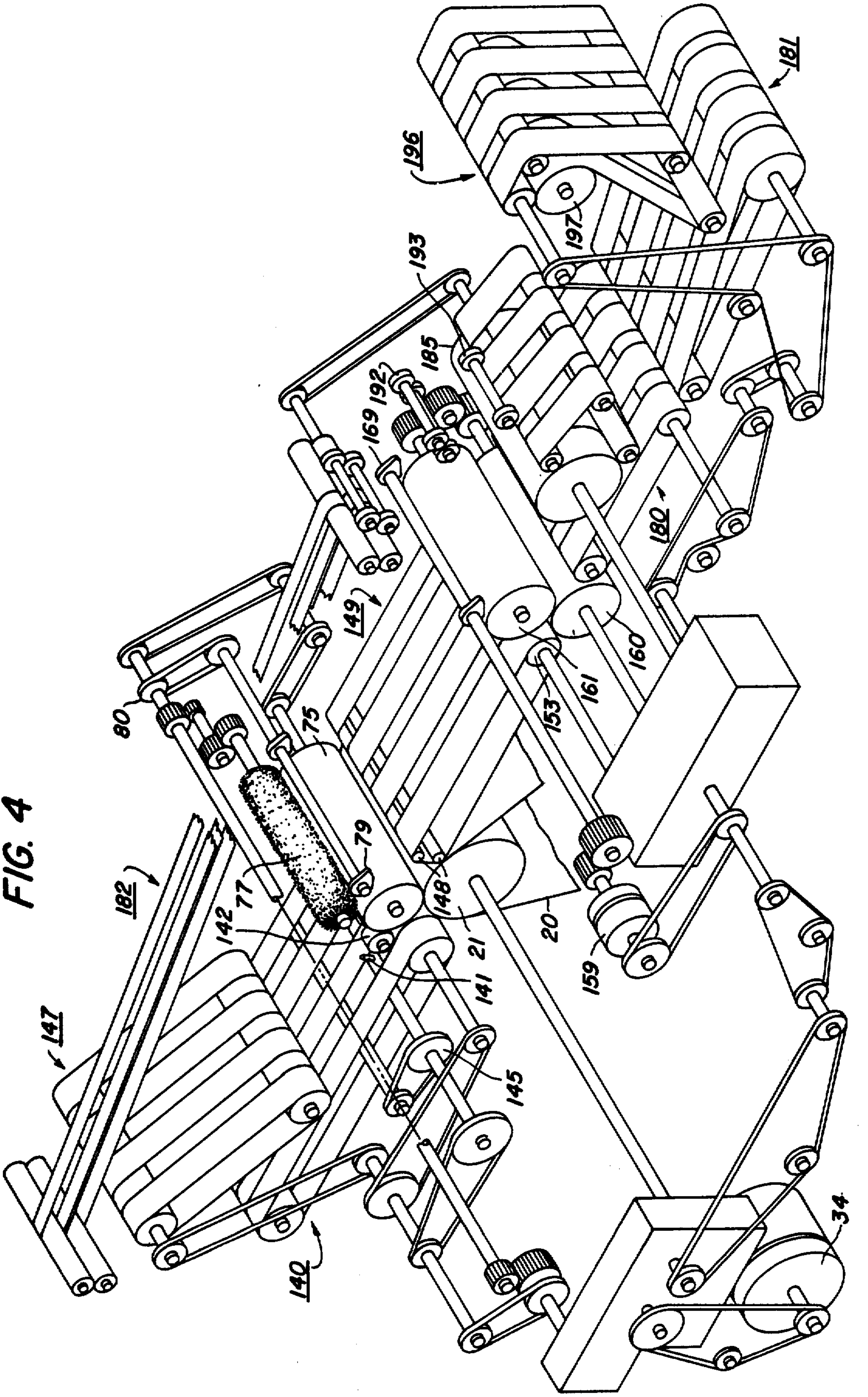
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
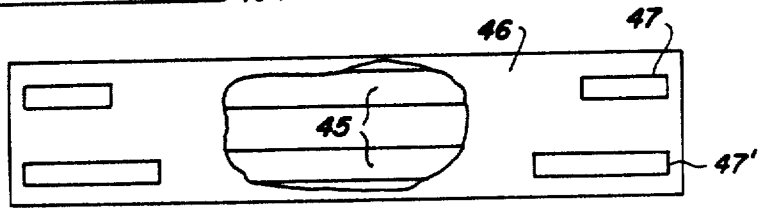
FIG. 5 is an enlarged view showing details of the photoreceptor edge fade-out mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
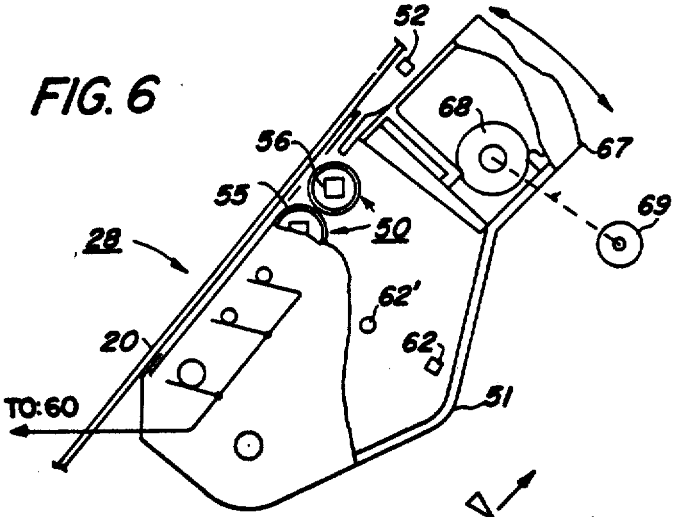
FIG. 6 is an enlarged view showing details of the developing mechanism for the apparatus shown in FIG. 1.
Figure 7:
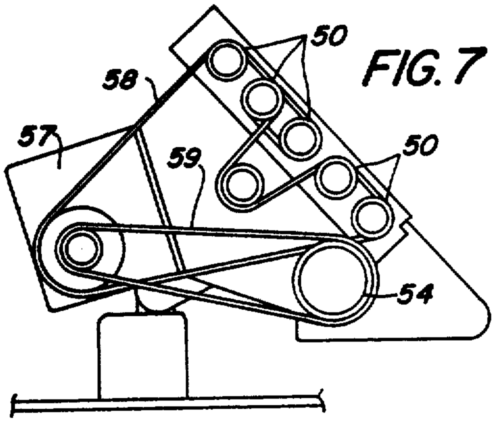
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
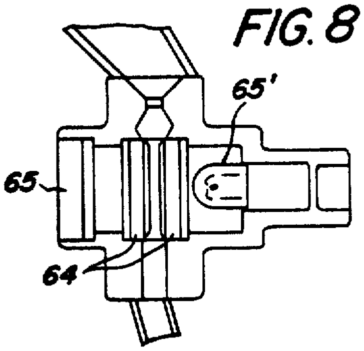
FIG. 8 is an enlarged view showing details of the developability control for the apparatus shown in FIG. 1.
Figure 11:
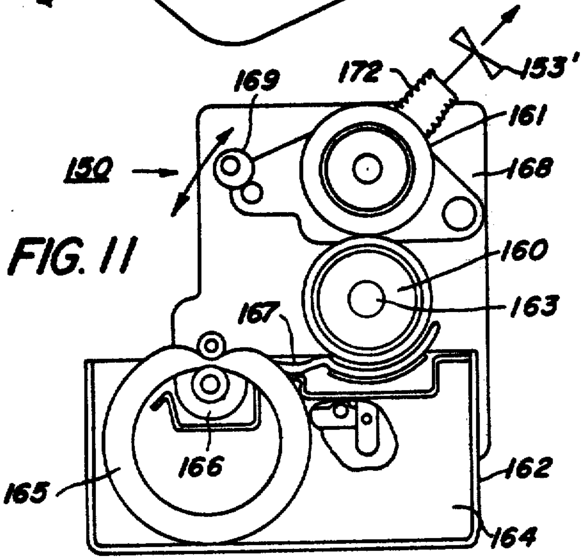
FIG. 11 is an enlarged view showing details of the fuser for the apparatus shown in FIG. 1.

Developing material is returned to the upper portion of developer housing 51 for reuse. A photocell 62 monitors the level of developing material in housing 51 with lamp 62' therefore spaced opposite to the photocell 62. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parralel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plates 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
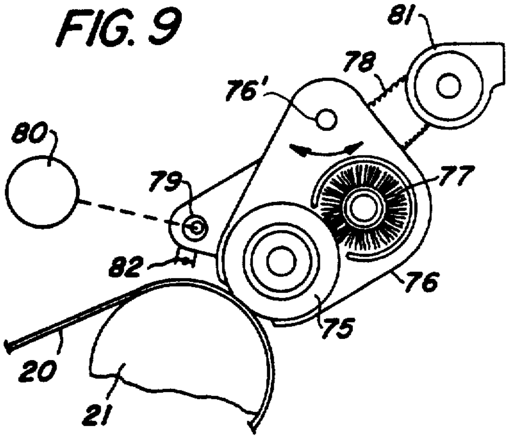
FIG. 9 is an enlarged view showing details of the transfer roll support mechanism for the apparatus shown in FIG. 1.
Figure 12:
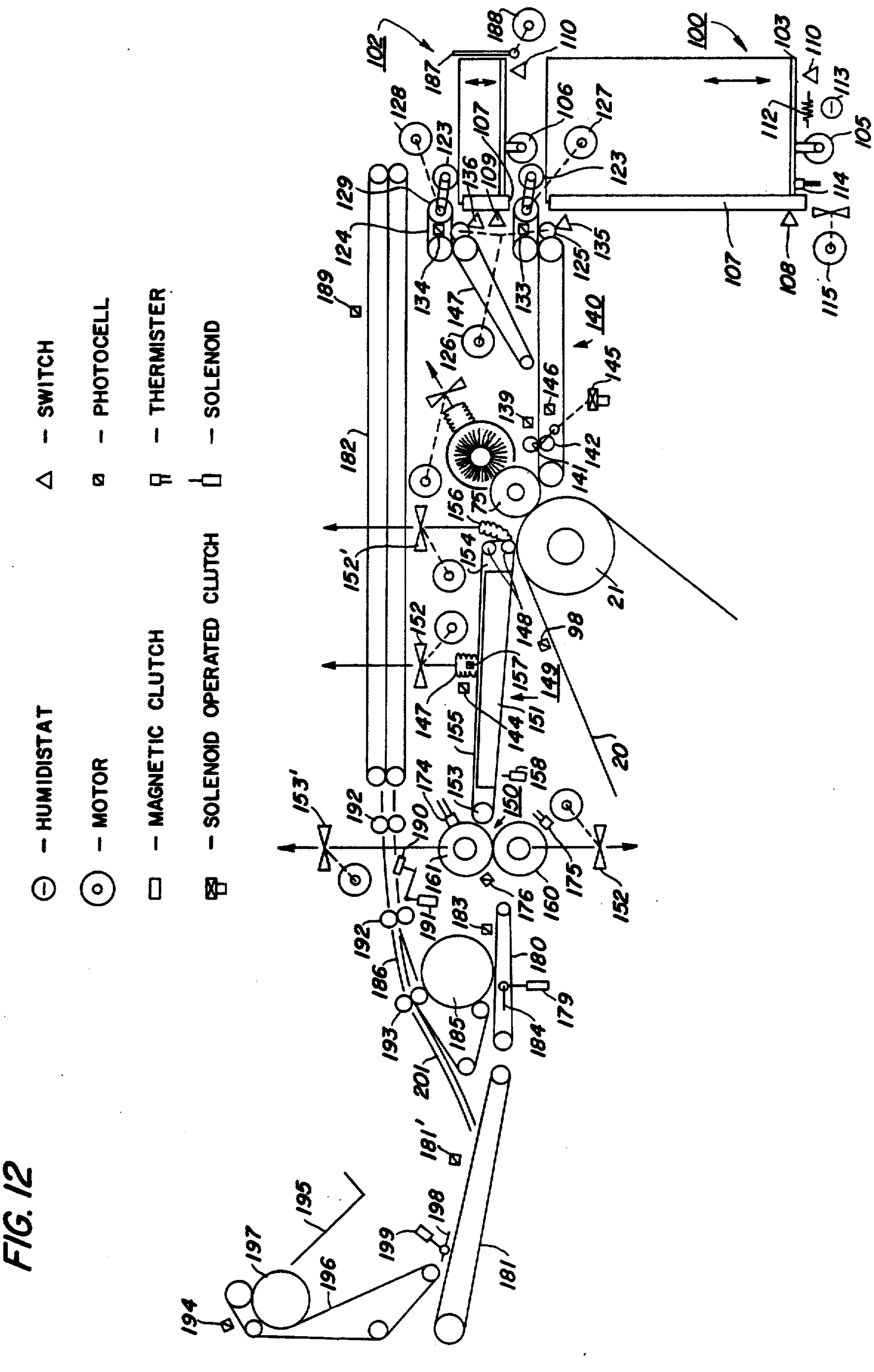
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing 76 opposite belt support roll 21. Housing 76 is pivotally mounted for swinging movement about axis 76' to permit the transfer roll assembly to be moved into and out of operative relationship with belt 20. A transfer roll cleaning brush 77 is rotatably journalled in transfer roll housing 76 with the brush periphery in contact with transfer roll 75. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 2:
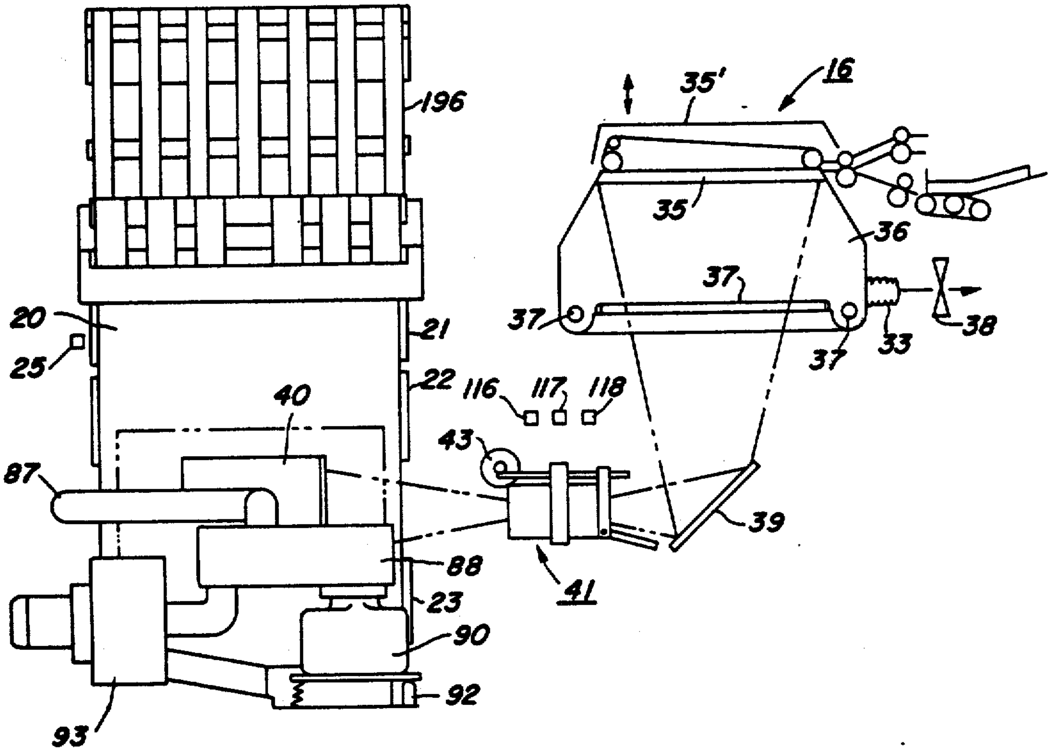
FIG. 2 is a vertical sectional view of the apparatus shown in FIG. 1 along the image plane.
Figure 10:
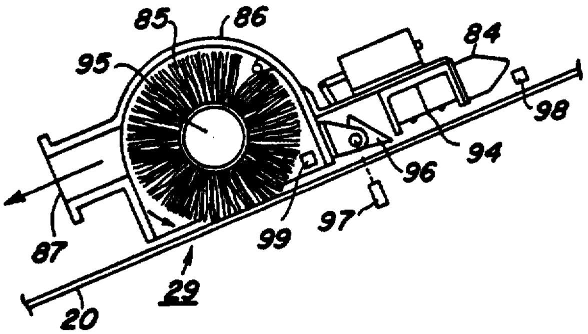
FIG. 10 is an enlarged view showing details of the photoreceptor cleaning mechanism for the apparatus shown in FIG. 1.

Referring to FIGS. 1a, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of pump 93 traps particles that pass through separator 88. The heavier toner particles separated by separator 88 drop into and are collected in one or more collecting bottles 90. Pressure sensor 91 monitors the condition of final filter 89 while a sensor 92 monitors the amount of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis strip jam) wherein the various operating components are, within a prescribed interval, brought to a stop. The interval permits any copy sheet present in fuser 150 to be removed, sheet trap solenoid 158 (seen in FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In this type of jam; power to drive motor 34 is interrupted to bring belt 20 and the other components driven therefrom to an immediate stop.

Figure 3:
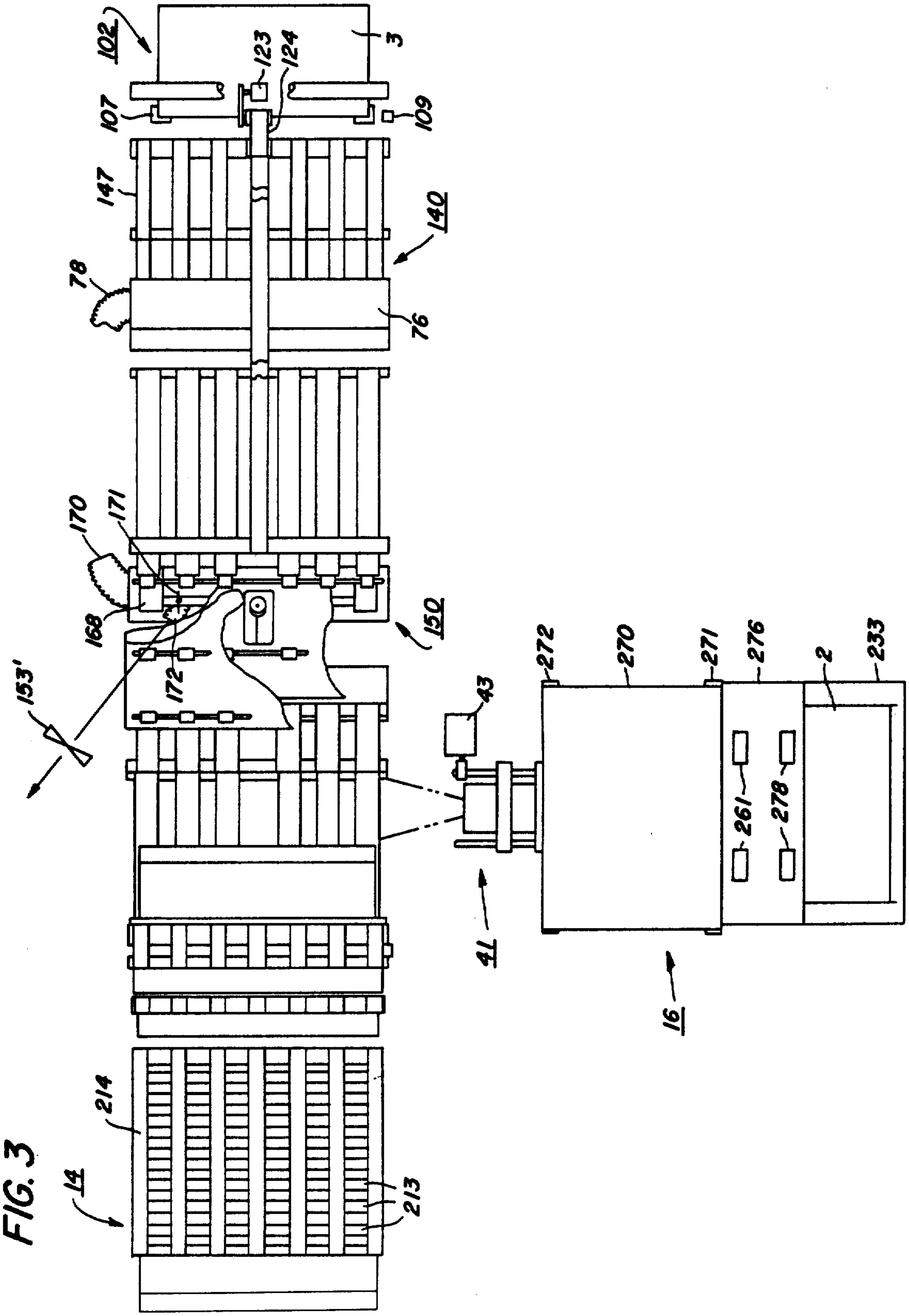
FIG. 3 is a top plane view of the apparatus shown in FIG. 1.

Referring particularly to FIGS. 1a, 3 and 12, copy sheets 3 comprise precut paper sheets supplied from either main or auxiliary paper trays 100, 102. Each paper tray has a platform or base 103 for supporting in stack like fashion a quantity of sheets. The tray platforms 103 are supported for vertical up and down movement with motors 105, 106 being provided to raise and lower the platform. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (seen in FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution. Registration fingers 141 are driven from main motor 34 through electromagnetic clutch 145 (seen in FIG. 4). A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 3, 4, 11 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser housing section 168 is evacuated. For this purpose, a conduit 170 couples housing section 168 with vacuum pump 153. The ends of housing section 168 are separated into vacuum compartments opposite the ends of pressure roll 161 thereunder to cool the roll ends where smaller size copy sheets 3 are being processed. Vacuum valve 171 in conduit 172 (seen in FIG. 3) regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 in fuser housing 162 controls operation of heating rod 163 in response to temperature. Temperature sensor 175 protects against fuser overtemperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended routes sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. Paper stops 187 of tray 102 are supported for oscillating movement. Motor 188 drives stops 187 to oscillate stops 187 back and forth and tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. The sheet trapped in chute 186 by stop 190 is removed by pinch roll pairs 192, 193 and fed out through chute 201 onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
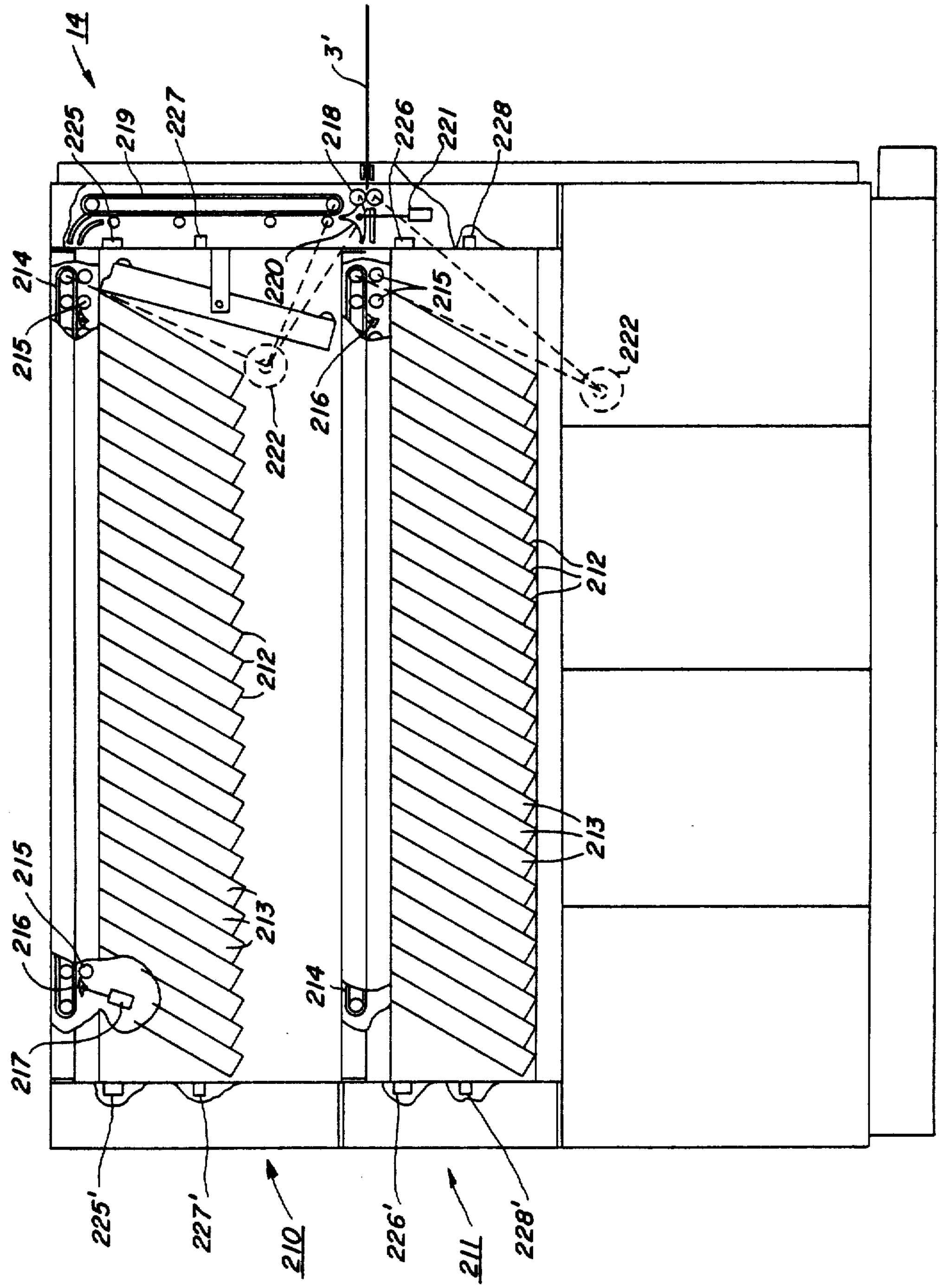
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual deflectors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided to drive the conveyors 214 and 219 of upper bin array 210 and conveyor 214 of lower bin array 211. Roll pair 218 is drivingly coupled to motor 222.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Sensor lamps 227', 228' are disposed opposite sensors 227, 228.

DOCUMENT HANDLER

Figure 14:
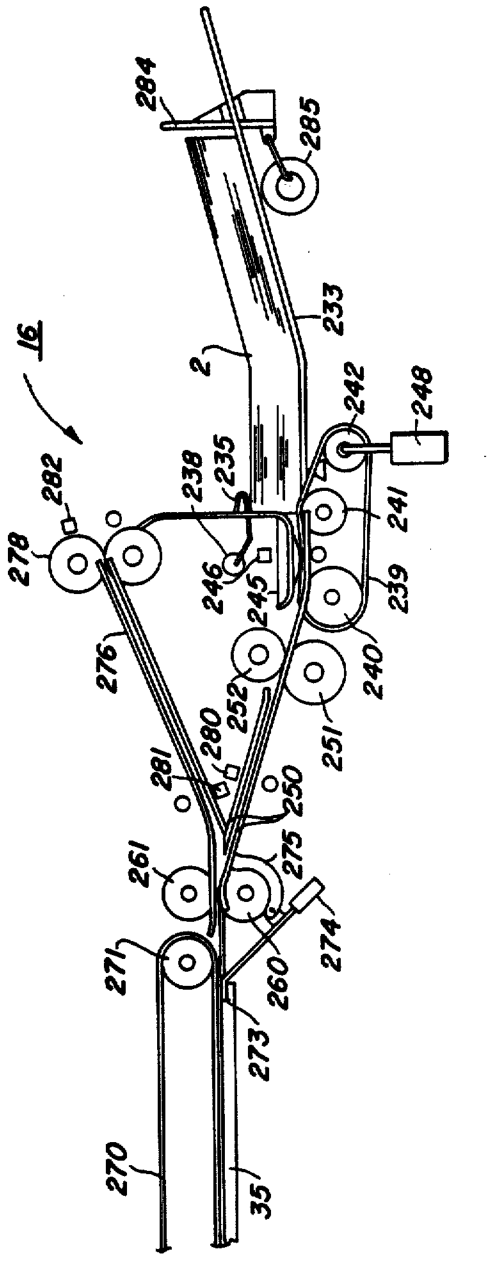
FIG. 14 is a schematic view showing details of the document handler for the apparatus shown in FIG. 1.
Figure 15:
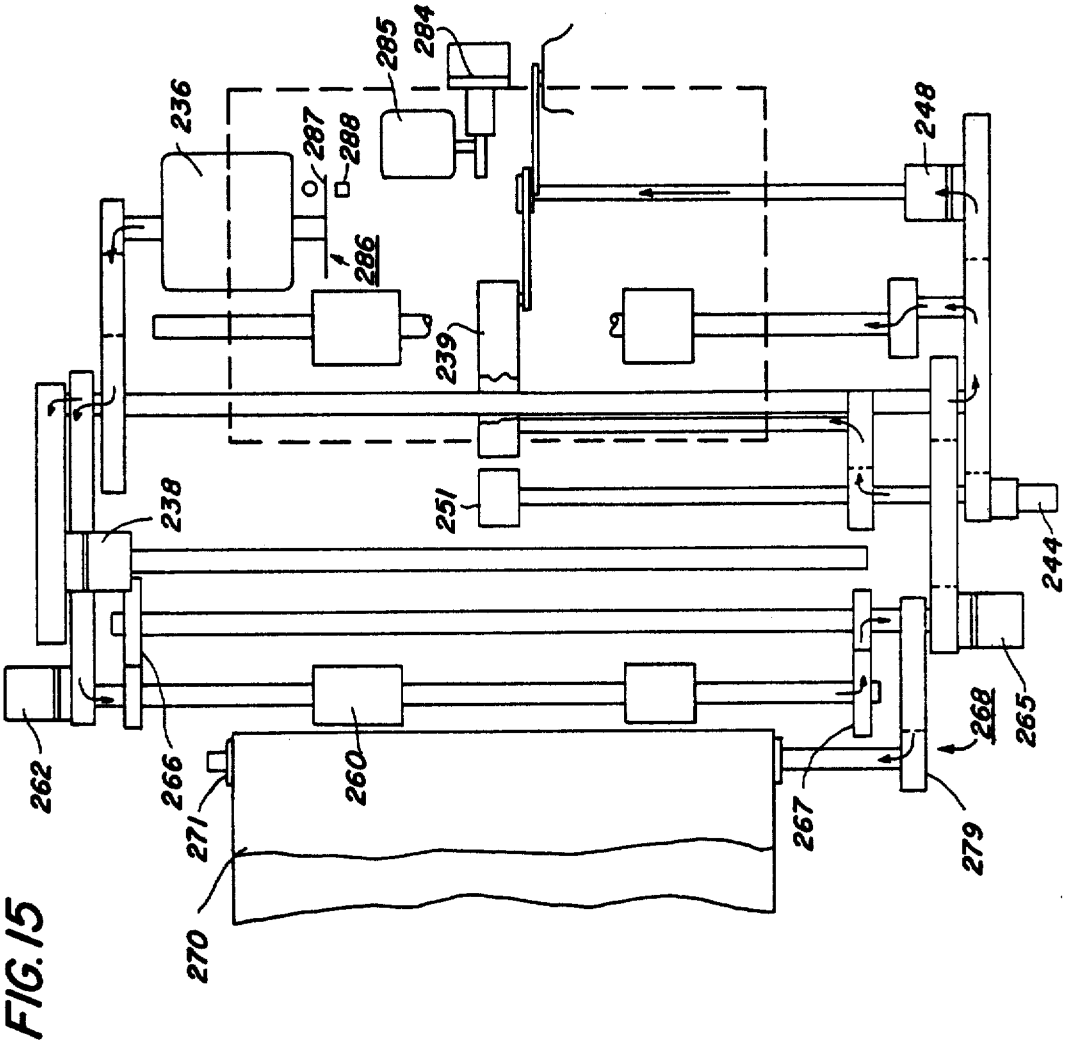
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feed belt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 to raise kicker roll 242 and increase the surface area of feed belt 239 in contact with the documents.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto platen 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276, deflector 275 being raised by solenoid 274 when withdrawing register 273. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

To provide the requisite operational synchronization between host machine 10 and controller 18 as will appear, processor or machine clock 202 is provided. Referring particularly to FIG. 1*a*, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces a pulse like signal output.

CONTROLLER

Figure 16:
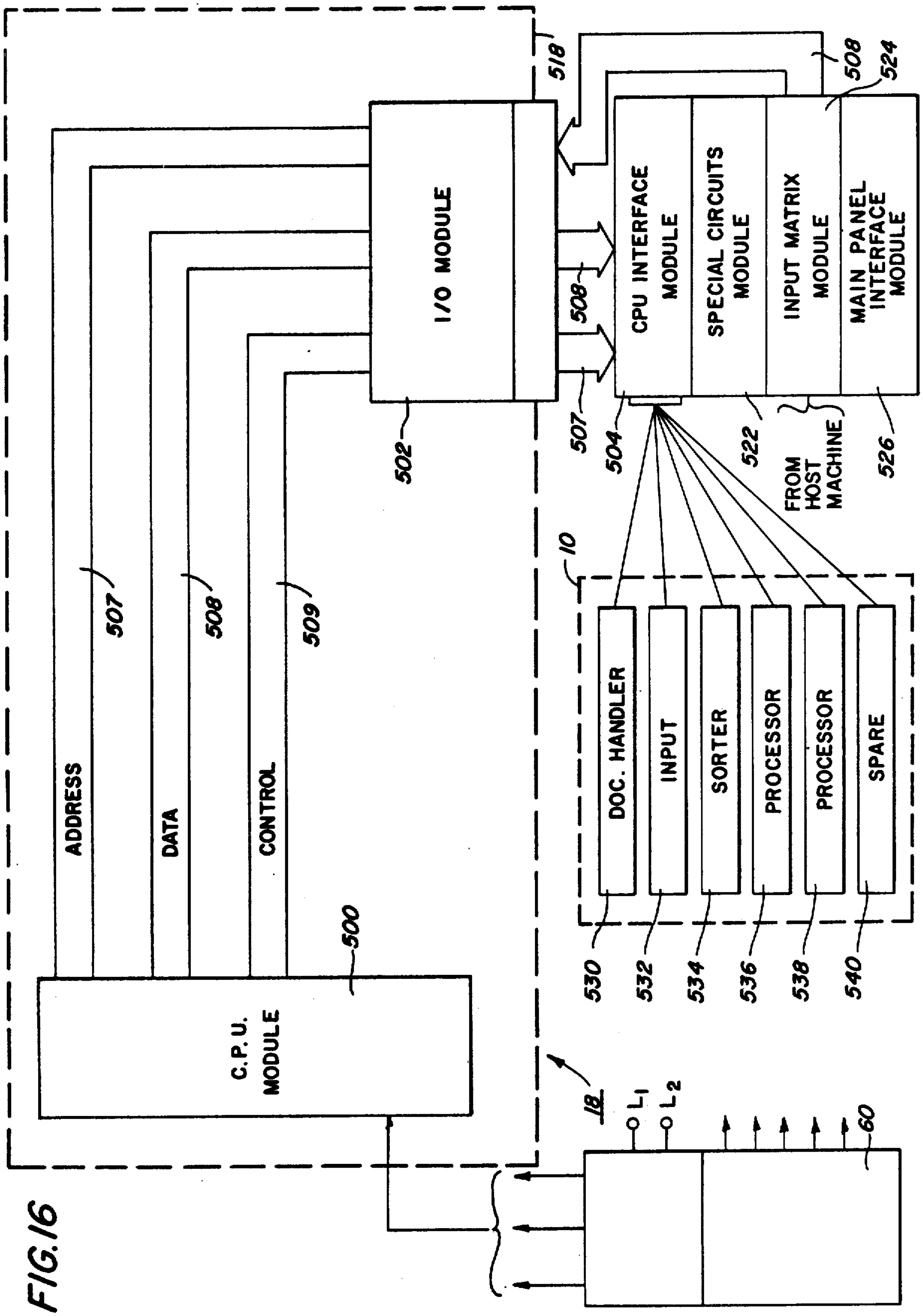
FIG. 16 is a block diagram of the controller for the apparatus shown in FIG. 1.

Referring to FIG. 16 controller 18 includes a Computer Processor Unit (CPU) Module 500, Input/Output (I/O) Module 502, and Interface 504. Address, Data, and Control Buses 507, 508, 509 respectively operatively couple CPU Module 500 and I/O Module 502. CPU Module 500 and I/O Module 502 are disposed within a shield 518 to prevent noise interference.

Interface 504 couples I/O Module 502 with special circuits module 522, input matrix module 524, and main panel interface module 526. Module 504 also couples I/O Module 502 to the operating sections of the machine, namely, document handler section 530, input section 532, sorter section 534 and processor sections 536, 538. A spare section 540, which may be used for monitoring operation of the host machine, or which may be later utilized to control other devices, is provided.

Figure 17:
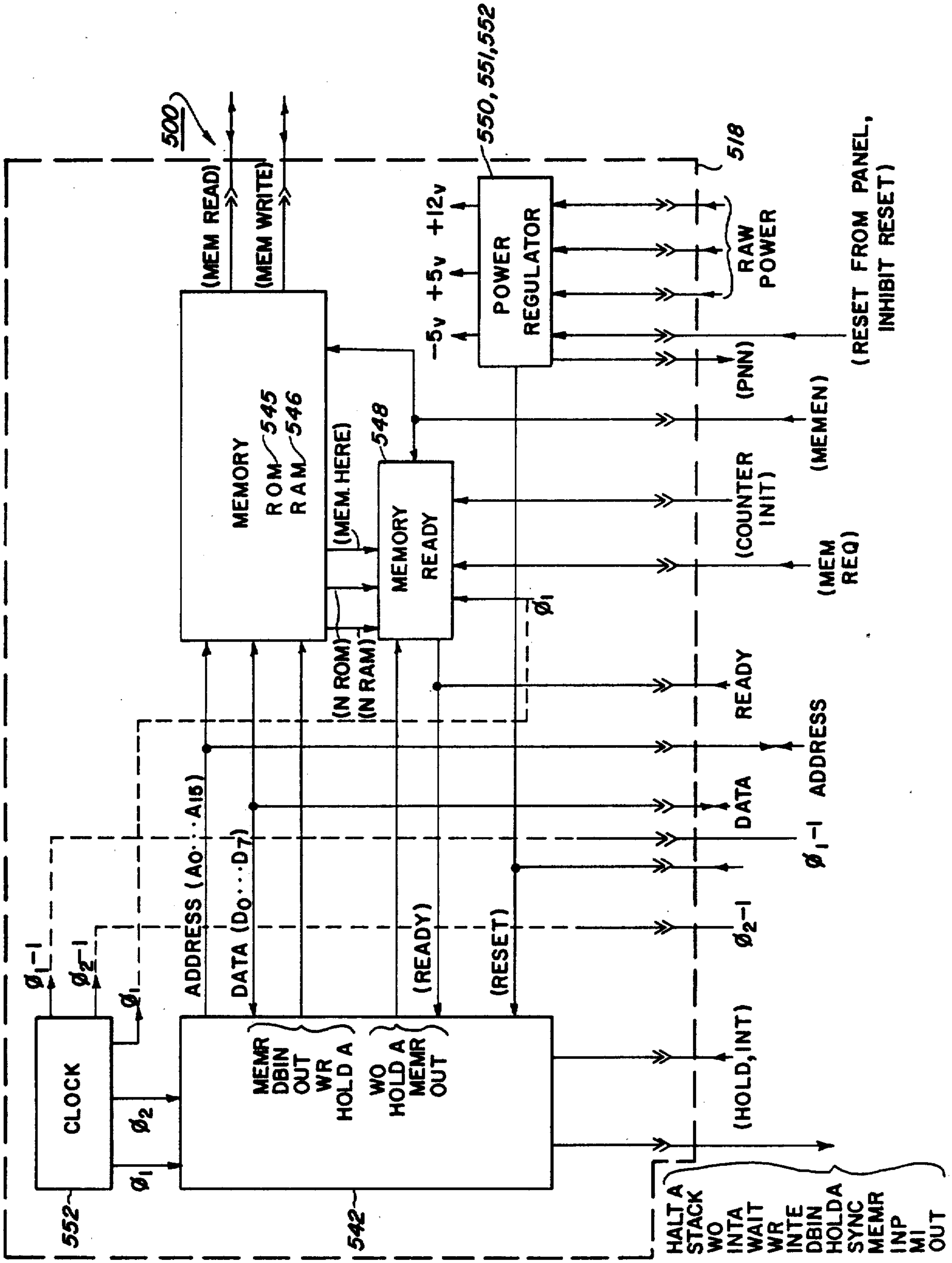
FIG. 17 is a block diagram of the controller CPU.

Referring to FIGS. 17, 18(*a*), CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory Access (DMA) signal (HOLD A) as will appear. While the capacity of memory sections 545, 546 are indicated throughout as being 16K and 2K respectively, other memory sizes may be readily contemplated.

Referring particularly to FIG. 19, clock 552 comprises a suitable clock oscillator 553 feeding a multi-bit (Qa – Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Referring to FIG. 20, the memory bytes in ROM section 545 are implemented by Address signals (Ao – A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total 64K bytes of addressing space. The memory bytes in RAM section 546 are implemented by Address signals (Ao – A 15) through selector circuit 561. Address bit A 10 serves to select the memory bank while the remaining five most significant bits (A 11 – A 15) select the last 2 K bytes out of the 64K bytes of addressing space. RAM memory section 546 includes a 40 bit output buffer (DATA OUT), the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 (FIG. 23*b*) to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Referring to FIGS. 22(*a, b, c*) and 23*b*, power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Reset control from the machine service panel (not shown) is also provided via PNN. An enabling signal (INHIBIT RESET) from Memory Control 638 allows completion of a write cycle in Non Volatile (N.V.) Memory 610 of I/O Module 502.

Referring to FIGS. 18*a*, 20, 21, and the DMA timing chart (FIG. 18*b*) data transfer from RAM section 546 to host machine 10 is effected through Direct Memory Access (DMA), as will appear. To initiate DMA, a signal (HOLD) is generated by Refresh Control 605 (FIG. *b*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23 (*a, b*), I/O module 502 interfaces with CPU module 500 through bi-directional Address and, Data buses 507, 508 respectively, and Control bus 509. I/O module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory Access (DMA) by I/O Module 502 of RAM section 546.

I/O module 502 includes Matrix Input Select 604 (through which inputs from the host machine 10, are received), Refresh Control 605, Nonvolatile (NV) memory 610, Interrupt Control FIG. 23*a*, Watch Dog Timer and Failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA opertion; (e) actuating buffers 634 to enable address bits Ao – A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 (FIG. 23*a*) from data bus 508; and (i) resetting the Watch Dog timer and setting the Fault Failure flag 614. In addition, section 601 includes logic to control and synchronize the READY control line to CPU module 500, the READY line being used to advise module 500 when data placed on the Data Bus by I/O Module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25m sec) a fault flip flop is set and a signal (FAULT) sent to the host machine 10. The signal (FAULT) also raises the HOLD line via Refresh Control 605 to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input Select 604 which controls receipt of data from host machine 10 has capacity to read up to 32 groups of 8 discrete inputs from host machine 10. Lines $A_3$ through $A_7$ of Address bus 507 are routed to host machine 10 via optical isolator 569 and CPU Interface Module 504 to select the desired group of 8 inputs. The selected inputs from machine 10 are received by matrix 604 via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from the memory output buffer (DATA OUT) of RAM memory section 546 to host machine 10 at the predetermined clock rate in line 574. Direct Memory Access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 (through actuation of tri-state buffers 510, 511 as described) to the high impedance state giving I/O module 502 control thereover. I/O module 502 then sequentially accesses the 32 memory words from output buffer (DATA OUT) of RAM section 546 (REFRESH ADDRESS) and transfers the contents to the host machine 10 via data bus 508 and optical isolator 569. CPU Module 500 is dormant during this period.

On capture of the address and data buses 507, 508, a control signal (LOAD) from Refresh Control 605 together with a clock signal (CLOCK) in line 574 are utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of non-volatile memory stored in I/O Module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine base interrupts, herein referred to as Pitch Reset, Machine, and Document Handler interrupts. A fourth clock driven interrupt, the Real Time interrupt, is also provided.

Referring particularly to FIG. 23(*b*) the highest priority interrupt signal, Pitch Reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The third highest priority interrupt signal, Document Handler Clock signal 642, is sent directly from document handler clock 286 via isolation transformer 652 and phase locked loop 653 to flip flop 654. The signal (LOCK) serves to indicate the validity of the signal input to loop 653.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656.

Setting of one or more of the edge trigger flip flops 647, 651, 654, 656 by the interrupt signals 640, 641, 642, 643 generates a signal (INT) via priority chip 659 to processor 542 of CPU Module 500 FIG. 18*a*. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654, or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enabled the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_1$, $\phi_2$ of processor clock 552 (FIG. 19*a*). As described, clock 570 provides a reference clock pulse (in line 574) for synchronizing the output refresh data and is the source of clock pulses (in line 643) for driving Real Time register 621.

CPU interface module 504 interfaces I/O module 502 with the host machine 10 and transmits operating data stored in RAM section 546 to the machine. Referring particularly to FIG. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0 - D7. As best seen in FIG. 25, each data channel DO - D7 has an assigned output function with data channel D0 being used for operating the front panel lamps 830 in the digital display, (see FIG. 32), data channel D1 for special circuits module 522, and remaining data channels D2 - D7 allocated to the host machine operating sections 530, 532, 534, 536, 538 and 540. Portions of data channels D1 - D7 have bits reserved for front panel lamps and digital display.

Since the bit capacity of the data channels D2 - D7 is limited, a bit buffer 703 (FIG. 26) is preferably provided to catch any bit overflow in data channels D2 - D7.

Inasmuch as the machine output sections 530, 532, 534, 536, 538 and 540 are electrically a long distance away, i.e. remote, from CPU interface mdoule 504, and the environment is electrically "noisy", the data stream in channels D2 - D7 is transmitted to remote sections 530, 532, 534, 536, 538 and 540 via a sheilded twisted pair 704. By this arrangement, induced noise appears as a differential input to both lines and is rejected. The associated clock signal for the data is also transmitted over line 704 with the line shield carrying the return signal currents for both data and clock signals.

Data in channel $D_1$ destined for special circuits module 522 is inputted to shift register type storage circuitry 705 for transmittal to module 522. Display data $D_0$-$D_7$ is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (910, FIG. 1*b*) a fuser over temperature as detected by sensor 175, etc. In the event of a bus fault, a reset signal (RESET) is generated automatically in line 709 to CPU module 500 (see FIGS. 17 and 18*a*) until the fault is removed. In the event of a machine fault, a signal is generated in line 710 to actuate a suitable relay (not shown) controlling power to all or a portion of host machine 10. A load disabling signal (LOAD DISBL) is inputted to DATA receiving optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fusher 150, and initiate a shutdown of host machine 10. Circuitry 715 also cycles fuser heater 163 to maintain fuser 150 at proper operating temperatures and signals (FUS-RDYT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a mis strip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operation and the signal inputs from lens position responsive sensors 116, 117, 118. The signal output of circuitry 718 serves to operate lens driven motor 43 as required to place the optical elements of lens 41 in proper position to effect the image reduction programmed by the operator.

Referring to FIG. 28, input matrix module 524 provides analog gates 719 for receiving data from the various host machine sensors and inputs (i.e. sheet sensors 135, 136; pressure sensor 157; etc), and data (SWITCH DATA) from the various switches on Console 800 (FRONT PANEL SWITCHES — FIG. 25) module 524 serving to convert the signal input to a byte oriented output for transmittal to I/O module 502 under control of Input Matrix Select 604 (FIG. 23*b*). The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 to Input Matrix Select 604 of I/O module 502 (FIG. 23*b*). From there, the data is transmitted through Multiplexer 624 and buffers 620 to CPU Module 500.

Referring particularly to FIG. 29, main panel interface module 526 serves as interface between CPU interface module 504 and operator control console 800 for display purposes and as interface between input matrix module 524 and the console switches. As described, data channels D0 - D7 have data bits in each channel associated with the control console digital display or lamps. This data is clocked into buffer circuitry 723 and from there, for digital display, data in channels D1 - D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel DO is clocked to shift register 727 whose output is connected by drivers to the console lamps. Access by input matrix module 524 to the console switches and keyboard (FRONT PANEL SWITCHES) is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Referring to FIG. 31 wherein like numbers refer to like parts, to provide capacity for driving the sorter deflector solenoids 221, a decode matrix arrangement consisting of a Prom encoder 750 controlling buss decoder (BUSS DECODER) 751 return decoder, 752 (DATA OUT) is provided. The output of decoders 751, 752 drive the sorter solenoids 221 of upper and lower bin arrays 210, 211 respectively. Data is inputted to encoder 750 by means of shift register 754.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) button 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 14; and sorter sets or stacks buttons 825, 826 are provided. An on/off service selector 828 is also provided for activation during machine servicing.

Indicators comprise program display lamps 830' and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, and UNLOAD SORTER. Other display information may be envisioned.

OPERATION

As will appear, host machine 10 is conveniently divided into a number of operational states. The machine control program is divided into Background routines and Foreground routines with operational control normally residing in the Background routine or routines appropriate to the particular machine state then in effect. The output buffer (DATA OUT) of RAM memory section 546 is used to transfer/refresh control data to the various remote locations in host machine 10, control data from both Background and Foreground routines being inputted to RAM memory section 546 for subsequent transmittal to host machine 10. Transmittal/refresh of control data presently in output buffer (DATA OUT) of section 546 is effected through Direct Memory Access (DMA) under the aegis of a Machine Clock interrupt routine.

Foreground routine control data which includes a Run Event Table built in response to the particular copy run or runs programmed, is transferred to output buffer (DATA OUT) of RAM section 546 by means of a multiple prioritized interrupt system wherein the Background routine in process is temporarily interrupted while fresh Foreground routine control data is inputted to the RAM output buffer following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STATCHK), (TABLE I) composed of specific sub-programs associated with the principal operating states of host machine 10 is provided. A byte called STATE contains a number indicative of the current operating state of host machine 10. The machine sTATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Referring to FIG. 33, each STATE is normally divided into PROLOGUE, LOOP and EPILOGUE sections. As will be evident from the exemplary program STATCHK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STATCHK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34B:
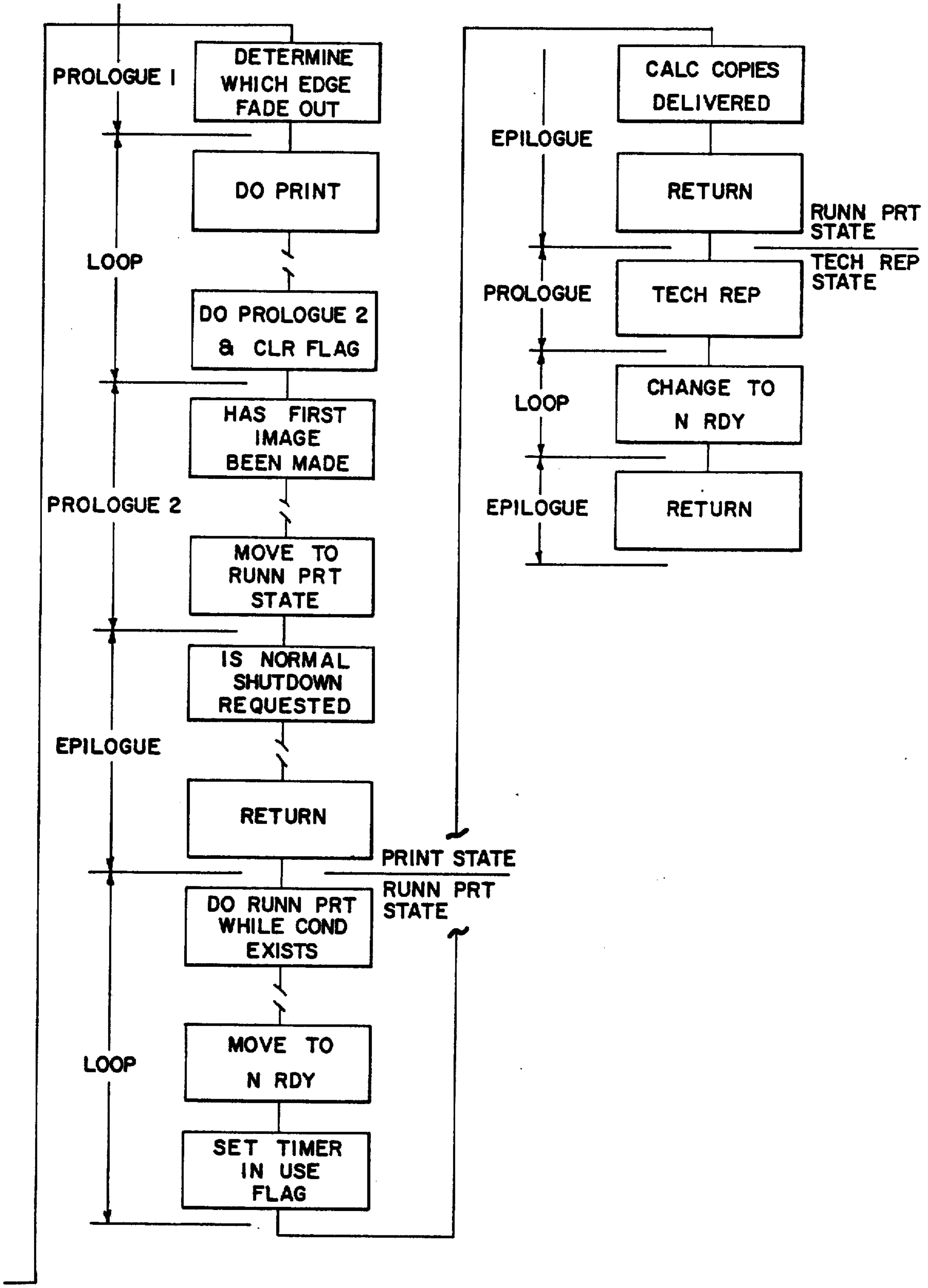

Referring to FIG. 34 (*a,b*) and the exemplary program (STATCHK) in TABLE I, on actuation of the machine POWER-ON button 804 (FIG. 32), the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signalled.

In the System Not Ready STATE (NRDY), background subroutines are entered. These include setting of Ready Flags, control registers, timers, and the like; turning on power supplies, the fuser, etc., initializing the Fault Handler, checking for paper jams (left over form a previous run), door and cover interlocks, fuser temperatures, etc. During this period, the WAIT lamp on console 800 is lit and operation of host machine 10 precluded.

When all ready conditions have been checked and found acceptable, the controller moves to the System Ready State (RDY). The READY lamp on console 800 is lit and final ready checks made. Host machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

Following the copy run, (PRINT), the controller normally enters the System Not Ready state (NRDY) for rechecking of the ready conditions. If all are satisfied, the systemm proceeds to the System Ready State (RDY) unless the machine is turned off by actuation of POWER OFF button 804 or a malfunction inspired shutdown is triggered. The last state (TECH REP) is a machine servicing state wherein certain service routines are made available to the machine/repair personal, i.e. Tech Reps.

A description of the aforemention data transfer system is found in copending application S. N. 677,473, filed Apr. 15, 1976 (Attorney's Docket No. D/75239), incorporated by reference herein.

To identify faults in the diverse host machine components, the master operating program for the machine 10 includes a routine for checking the condition of an array of fault flags. Each flag in the array is associated with and represents a particular machine fault. Signal lamps 851 (PRESS FAULT CODE), 852 (CHECK STATUS) and 853 (CHECK DOORS) are provided on control console 800 for fault identification. A specific identifying code is assigned to each fault to permit the fault to be pin pointed. A display arrangement is provided on console 800 (FIG. 32) using the copy count numerical display 830 to display a coded number. A suitable chart (not shown) is provided to relate the different coded numbers with the proper machine component.

Additionally, a status panel 901, which comprises a schematic of the paper feed path (see FIG. 1a) is provided on the underside of cover 900 for return transport 182, cover 900 being suitably mounted for lifting movement for access to the transport 182 therebelow as well as when viewing the status panel 901. A series of lamps 903, located at strategic points along the paper path schematic, are selectively lit to display the particular place or places in the paper path where a fault exists. Raising of cover 900 to expose the paper path schematic and lamps 903 is in response to lighting of signal lamp 852 (CHECK STATUS) on console 800. To provide a permanent record or history of the faults that occur during the life of host machine 10, a record is kept in non-volatile memory 610 of at least some fault occurrences.

As described earlier, sensors are associated with various of the machine operating comonents to sense the operating status of the component. For example, a series of of sheet jam sensors 133, 134, 139, 144, 176, 183, 179, 194 are disposed at strategic points along the path of copy sheets 3 to detect a sheet jam of other feeding failure (See FIG. 12). Other sensors 280, 281 and 282 monitor document handler 16 and sensors 225, 226, sorter 14 (See FIGS. 14, 13). Conditions within fuser 150 are responded to by detector 174 while other detectors 157 monitor pressures in the machine vacuum system (FIG. 12). Sensors 98, 99 guard against the presence of sheets 3 on belt 20 following transfer (See FIG. 10). Additional sensors 910 monitor the several exterior doors and covers of host machine 10 such as transport cover 900 and door 911 to trigger an alarm should a cover be open or ajar (See FIG. 1b). As will be understood, other sensing and monitoring devices may be provided for various operating components of host machine 10. Those shown and described herein are therefore to be considered exemplary only.

Referring particularly to drawings, FIG. 36 and TABLE II, the routine for scanning the array of fault flags (FLT SCAN) is initiated from time to time as part of the background program of host machine 10. Initially, paper path sensors 133, 134, 139, etc. are polled to determine if a paper jam exists (JAM SCAN) in the sheet transport path. The starting address of the fault array (ADDR OF FLT TBL) and the total number of fault flags to be scanned (FLT CNT) are obtained. The flag counter (B) is set to the total number of fault flags and fault flag counter (E) is set to zero.

Scanning of the fault flag array (SCAN) is then initiated, the first fault flag obtained, and the flag pointer (H) indexed to the next flag. The flag is tested (TEST FLAG) and if set, indicating the existance of a fault, the fault counter (E) is incremented. A query is made as to whether readout of both code and status lamps 851, 852 are required (FLT CDPL) and the particular lamp or lamps (FLT LAMP) determined.

It is understood that the code readout is obtained on numerical display 830 of control console 800 while the lamp display is obtained through the actuation of the prescribed jam lamp 903 on status panel 901 of cover 900.

The flag counter (B) is decremented and the foregoing loop is repeated until the last flag of the array has been checked at which point the flag counter (B) is zero. A query is made if any flags have been set (FLAGS SET), and if so, the fault signal lamp (PRESS FAULT CODE) 851 on console 800 is lit and the fault ready flag reset. If not, the fault code lamp is held off and the fault ready flag set. The number of fault flags set are saved (FLT TOT).

When the machine operator, notified that one or more faults exist by lamp 851 (PRESS FAULT CODE) on console 800, desires to identify the fault, fault display button 850 may be depressed to produce a coded number on copy count numerical display 830. If lamp 852 (CHECK STATUS) is lit, transport cover 900 may be raised to identify, by means of lamps 903, the fault condition in the sheet transport system. If the fault is not in the sheet transport system, identification can be effected only by depressing fault display button 850.

The fault display (FLT DISP) subroutine shown in FIG. 37 and TABLE III, which is entered on depressing of fault display button 850, queries whether or not any faults exist (FLT TOT) and if so, a check is made to determine if the fault code is already display (FLT SHOW). If, not, the next fault is looked for (FLT FIND), the code for that fault (FLT DCTL) obtained, and display requested (DISPL IST).

If the fault code is already displayed and the display button 850 remains depressed, the old display is continued. If there are no faults (FLT TOT = 0), no display is made and the display request flags (DSPL FLT; FLT SHOW, DSPL IST) are cleared.

As long as fault display button 850 is depressed the fault code, identifying the specific fault, appears on console 800. To determine if additional faults beside the one displayed exist, the operator momentarily releases button 850. When re-depressed, scanning of the fault flag array for the next fault (if any) is resumed. If a second fault is found, the code number for that fault is displayed. If no other fault exists, the scanning loop returns to the first fault and the code for that fault is again displayed on console 800.

Where the fault exists in the machine paper path, the code display therefor on console 800 may be fetched either by depressing fault display button 850 or raising transport cover 900.

Referring to the subroutine shown in FIG. 38 and TABLE IV, where the fault consists of a jam or malfunction in the machine paper path, a check is made to determine if fault display button 850 has been actuated (DSPL FLT). If so, display of the fault code is made as described heretofore in connection with FIG. 37. If button 850 has not been depressed a check is made to determine if the fault is a processor jam (PROC JAM). The status of cover 900 is checked (TCVR OPEN) and whether or not a new display is requested by cover 900 (FLT CSHW). With cover 900 open and a display requested, the fault flag is found (FLT CFIND) and the fault code obtained (FLT DCTL). Display of the fault code on numerical display 830 (DSPL IST) is made.

If the malfunction is confined to the area of host machine 10 other than the paper feed path, or if top cover 900 is not opened, no display (under this routine) is made, and the fault flags (FLT C SHW; DSPL IST) are cleared (RESET).

Figure 39B:
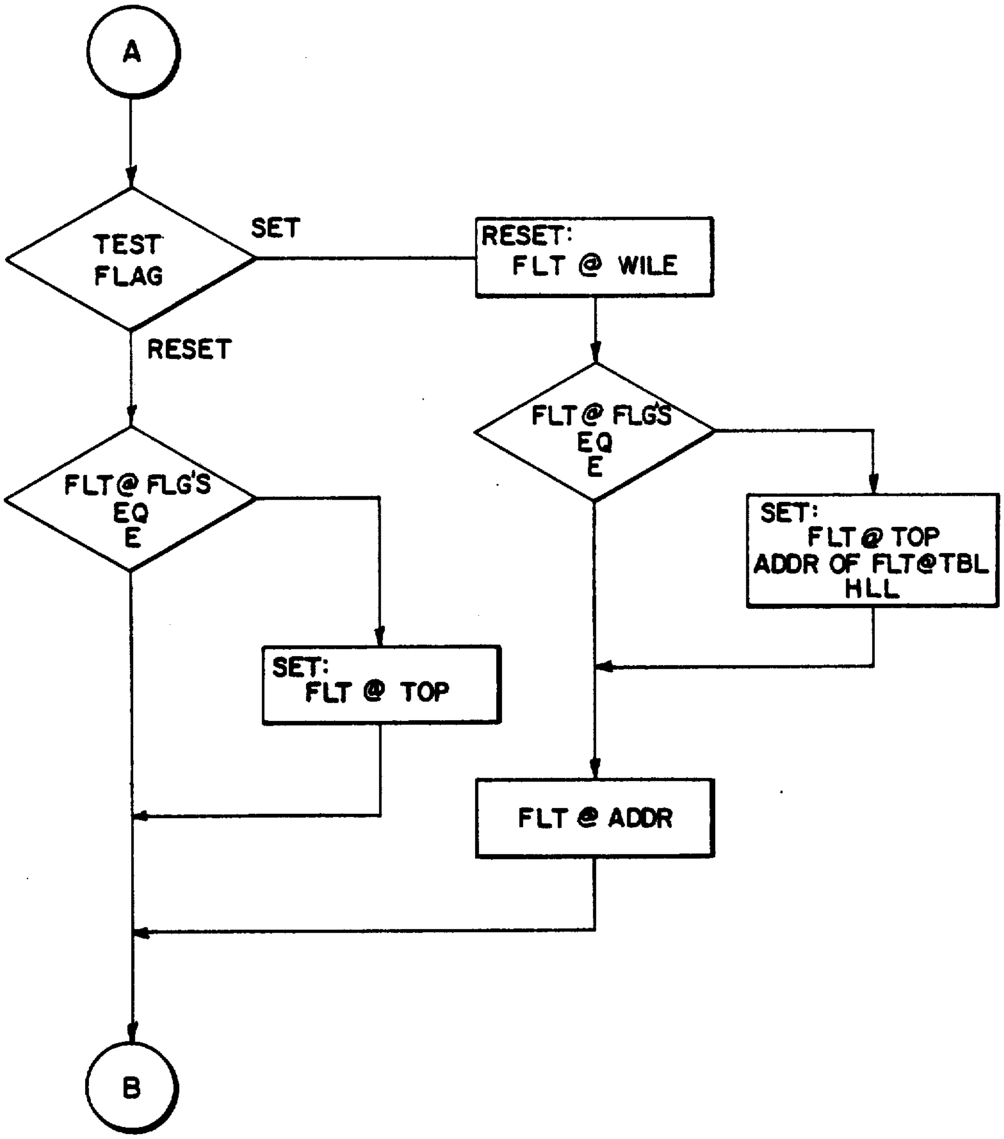

In the subroutine (TABLE V) to determine which fault is to be displayed (FLT FIND), schematically shown in FIG. 39 (a, b), on entry, a fault while loop flag (FLT WILE) is set and the address to begin searching for the next flag (FLT ADDR) obtained. On entering the loop, a check is made to determine if the fault pointer is at the top of the fault table (FLT TOP). If not, the fault number (FLT BCD) is obtained. The fault counter is incremented (INCR A), the fault flag is obtained (GET FLAG), and the flag tested (TEST FLAG). If the flag is set, the loop control flag (FLT WILE) is reset, a check is made for the end of the fault array (FLT FLGS EQ E), and the address of the next flag (FLT ADDR) obtained. In the event the fault flag is not set, a check is made to determine if the flag was the last flag in the table, and the loop repeated until the last flag in the array (FLT FLGS EQ E) has been checked.

After finding the fault flag (FLT FIND), the Fault Code display loop (FLT DCTL) is entered (FIG. 40, TABLE VI). In this subroutine the fault flag pointer (FLT NUM), the base address of the fault table (ADDR OF FLT TBL), and the address of the display (ADDR OF DISPLAY) are fetched and the display word (FC DIGIT) obtained.

As described, on entry into the fault scan routine (FLT SCAN) a check is made to determine of a jam exists in the machine paper path. For this purpose the paper jam sensors 133, 134, 139, 144, 176, 183, 179 and 194 are polled for the presence of a copy sheet 3.

Referring to the schematic routine of FIG. 41 and TABLE VII, the jam switch bytes (JSW BYTE) are tested and a check made to determine if any jam switch bits (JSW BITS) are set. If so, the address of the first jam flag is obtained (ADDR OF JAM FLAG) and the bit counter (B) set. If any bits remain ($B \neq 0$), the bit is obtained (GET BIT) and tested (TEST BIT). If set, the fault flag corresponding thereto is set. The counter (B) is decremented and the address incremented. The loop is repeated until the counter (B) reaches zero and the routine is exited.

As described, on a fault, one of the status lamps 851 (PRESS FAULT CODE), 852 (CHECK STATUS) and 853 (CHECK DOORS) on console 800 is lit. In the lamp selection routine (FLT LAMP) of FIG. 42 and TABLE VIII, a check is made to determine if the status panel flag is set (STATUS PNL FLG). If so, a check is made to determine if the fault is a processor jam (PROC JAM) and if not, the fault panel lamp routine (FLT SPNL) of FIG. 43 is entered. If the jam is a processor jam, the routine is exited.

If the status panel flag (STATUS PNL FLAG) is not set, a doors fault (CHECK DOORS FLAG) is looked for. If a door fault is found, the lamp 853 (CHECK DOORS) is turned on. If no door fault exists the routine is exited.

Where the jam or malfunction lies in the sheet transport path as indicated by lighting of lamp 852 (CHECK STATUS) on console 800, individual lamps 903 on status panel 901 (see FIG. 1) are lit to identify the point where the fault has occurred. The fault panel lamp routine (FLT SPNL) of FIG. 43 and TABLE IX is entered for this purpose. In this routine, checks are made to determine if the jam flags for face up tray 195, fuser 150, sheet register 146, and transport 149 are set. A check is made to determine if duplex copies are programmed (2SDC FLAG) and if so, inverter 184, return transport 182, and auxiliary transport 147, jam checks are made. If duplex copies are not programmed, and the auxiliary tray is programmed (AX FLAG), auxiliary transport 147 is checked (B-X-JAM). A check is made for a jam at belt cleaning station 86 (SOS JAM) and the routine exited.

To provide a permanent record of the number of times various faults occur in host machine 10, a portion of non-volatile memory 610 (FIG. 23b) is set aside for this purpose. Each time a selected fault occurs, i.e. setting of the fuser overtemperture fault flag in response to an overtemperature condition in fuser 150 as responded to by sensor 174, a counter in non-volatile memory 610 set aside for this purpose is incremented by one. In this way, a permanent record of the total number of times the particular fault has occured is kept in non-volatile memory 610 and is available for various purposes such as servicing host machine 10.

In addition to recording the number of times certain faults, occur, non-volatile memory 610 is used to store the number of type of copies made on host machine 10 as will appear. It is understood that the type and number of fault occurrences stored in non-volatile memory 610 may be varied as well as the type of other machine operating information, and that the listing given herein is exemplary only.

As explained heretofore, on completion of a copy run or on detection of a fault, host machine 10 comes to a stop. Stopping of host machine 10 may be through a cycle down procedure wherein the various operating components of machine 10 come to a stop when no longer needed, as at the completion of a copy run, or through an emergency stop wherein the various operating components are brought to a premature stop, as in the case of a fault condition. Conveniently, the routine for updating information stored in non-volatile memory may be entered at that time.

Figure 44B:
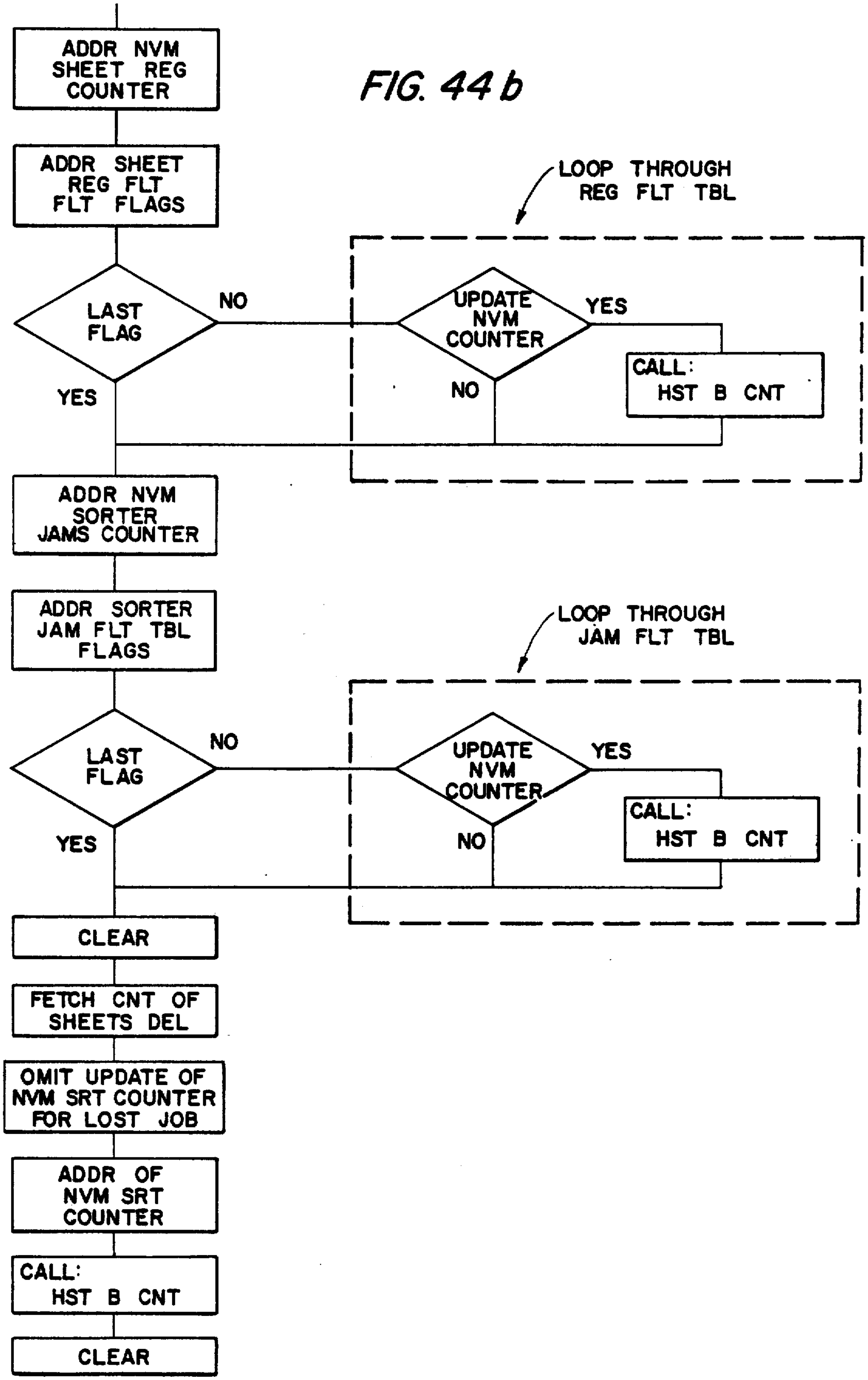
Figure 44C:
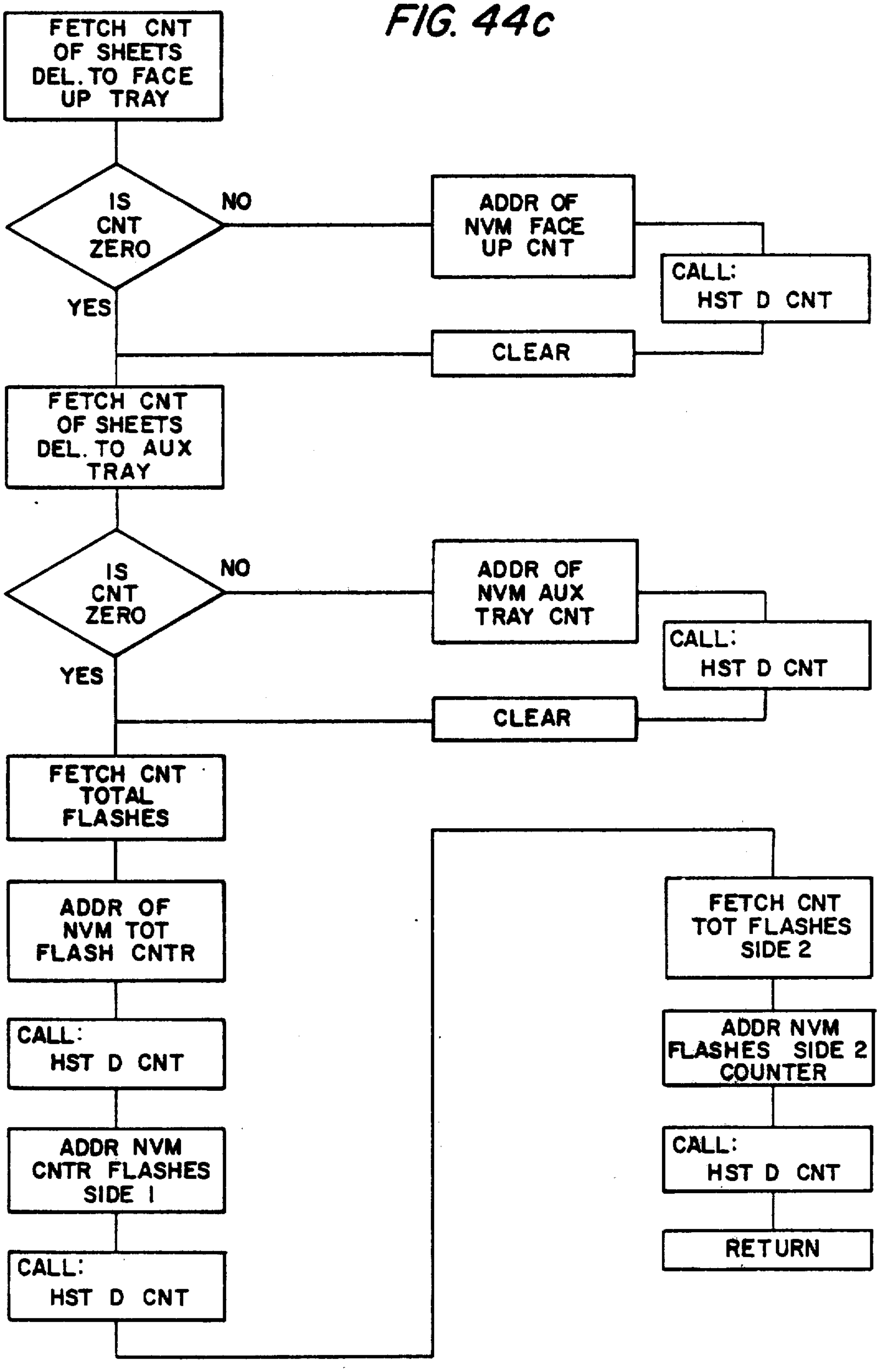

Referring to FIG. 44 (a,b,c) and TABLE X, on entry of the non-volatile memory updating routine (HIST FLE), the address of the non-volatile memory counters for recording paper path jams (NVM PAPER PATH FLT COUNTERS) and the address of the paper path fault flags (PAPER PATH FLT TBL FLAGS) are obtained, and a loop through the paper path fault flags entered. Each paper path fault flag is checked and if set a counter updating subroutine (HST BCNT) is called to update the count on the non-volatile memory counter for that fault. The loop is exited when the last paper path fault flag has been checked and the non-volatile memory counter therefor updated (as appropriate).

In a similar manner, the non-volatile memory counters for reset and error faults, fuser and cleaning (SOS) station faults, sheet registration faults, and sorter faults are updated as appropriate.

Following updating of the non-volatile memory fault counters, counters associated with the copy production of host machine 10 are updated (HST DCNT). For this, the non-volatile memory counters recording the number of sheets delivered to sorter 14, to face up tray 195, and to auxiliary tray 102 (when making duplex copies) are updated, followed by updating of the counters recording the number of times flash lamps 37 are operated, both as an absolute total and as a function of simplex (side 1) or duplex (side 2) copying. Following this the routine is exited.

In the fault counter updating routine (HSTBCNT — FIG. 45 and TABLE XI), the address of the counter is fetched (FETCH NVM COUNTER LS NIBBLE), updated, and stored. A check is made for overflow out of the counter LS Nibble, and the counter loaded to the new count.

In the non-volatile memory digit counter updating routine (HST DCNT — TABLE XII), the current count of the counter digit breakdowns (i.e. units, tens, hundreds, etc) are fetched, starting with the units digit and updated. An overflow check is made with provision for carrying the overflow over into the succeeding digit grouping. The non-volatile memory counters are then loaded with the new number and the routine exited.

It is understood that the non-volatile memory fault (HST BCNT) and digit (HST DCNT) counters may be updated in different sequences and at different times from that described and that fault and machine operating conditions other than or in addition to those described in non-volatile memory 610 may be recorded.

TABLE I

STATE CHECKER ROUTINE (STATCHK)

```
                      INITIALIZATION STATE BACKGROUND- PROLOG
001D6              INIT:    EQU
                      INITIALIZATION STATE BACKGROUND- WHILE: LOOP
001D6    3A08FE             WHILE:    XBYT,STATE:,EQ,0     DO INIT LOOP WHILE COND EXISTS
001D9    FE00
001DB    C2EE01
001DE    CDF305             CALL      SELFTEST             CALL CONTROLLER SELF TEST SUBR
001E1    78                 IF:       XBYT,B,EQ,0          DID CONTROLLER PASS SELF TEST
001E2    FE00
001E4    C2EB01
001E7    2108FE             INCBYT    STATE:               YES, MOVE TO NOT-READY STATE
001EA    34
                            ENDIF
001EB    C3D601             ENDWHILE
                      INITIALIZATION STATE BACKGROUND- EPILOG
001EE    2184F7             LXI       H,RDYFLGS:           H&L=ADDR OF FIRST RDY FLAG
001F1    060A               MVI       B,RDYFNUM:           B=NUMBER OF RDY FLAGS
001F3    1680               MVI       D,X'80'              D-REG TO SET FLAGS
001F5    78                 WHILE:    XBYT,B,NE,0          DO LOOP = TO # IN B-REG
001F6    FE00
001F8    CA0102
001FB    72                 MOV       M,D                  SET FLAG
001FC    23                 INX       H                    H&L=ADDR OF NEXT FLAG
001FD    05                 DCR       B                    DECR LOOP COUNTER
001FE    C3F501             ENDWHILE
                            LOOP TO SET ALL RDY FLAGS
00201    3E80               SFLG      2SD*ENAB
00203    325FF4
00206    3E80               SFLG      PROG*RDY             SET PROG ROUTINE READY
00208    3287F7
00208    3E80               SFLG      DSPL*SEL             INIT PROG TO DISPLAY QTY SELECT
0020D    3234F4
00210    2106FE             LXI       H,DIVD10:            H&L= ADDR OF 100 MSEC CNTR
00213    360A               MVI       M,10                 PRESET TO 10
00215    2120F8             LXI       H,TMRBASE:           H&L=ADDR OF 1ST 10 MSEC TIMER
00218    AF                 XRA       A                    A=0 (SET 'Z' CONDITION CODE)
00219    C                  ADI       TIMCNT1:+TIMCNT2:  A=TOTAL # OF TIMERS (10 & 100)
00218    1601               MVI       D,1                  SET ALL TIMERS TO TERMINAL CNT
0021D    CA2602             WHILE     CC,Z,C               WHILE # TIMERS .NE. 0...
00220    72                 MOV       M,D                  HALT THE PRESENT TIMER
00221    23                 INX       H                    MOVE TO NEXT TIMER LOC
00222    3D                 DCR       A                    DECRM LOOP CNTR (# OF TIMERS)
00223    C31D02             ENDWHILE
00226    2121F7             LXI       H,FLT*TBL            INITIALIZE WHERE FLT HANDLER
00229    2279F8             SHLD      FLT*ADDR             STARTS TO LOOK FOR FAULTS
0022C    3E80               SFLG      FLT*TOP              USED TO INITIALIZE FAULT VALUE
0022E    325EF4
00231    21CB01             LXI       H,EV*STBY:           H&L= ADDR OF STBY EVENT TABLE
00234    2250F8             SHLD      EV*PTR:              SAVE FOR MACH CLK ROUTINE
00237    2EF0               MVI       A,X'F0'              LOAD 'RESET INTERRUPTS' DATA
00239    3200E6             STA       RSINTFF:             RESET ALL INTERRUPT FLIP-FLOPS
0023C    FB                 EI                             ENABLE INTERRUPT SYSTEM
0023D    21DCFF             SOBIT     PFO$OFF              TURN OFF PITCH FADE-OUT LAMP
0024D    3E20
00242    F3
00243    B6
00244    77
00245    FB
00246    2131FF             SOBIT     24V$SPL              TURN ON 24 VOLT SUPPLY
00249    3E20
0024B    F3
0024C    B6
0024D    77
0024E    FB
```

```
0024F   3E47            STIM      ILK*TIME,7000        SET BLOWER START-UP DELAY
00251   322FF8
00254   C9              RET                            RETURN TO STATE CHECKER
                SYSTEM NOT-READY STATE BACKGROUND- PROLOG
0032C   DC5C03  NRDY: CALL      NRDY:SSL               DO SLW-SCAN BKGD AT LEAST ONCE
                SYSTEM NOT-READY STATE BACKGROUND- WHILE: LOOP
00255   3A08FE  NRDY:  WHILE:  XBYT,STATE:,EQ,1        DO NRDY LOOP WHILE COND EXISTS
00258   FE01
0025A   C28002
0025D   CD2C06          CALL      STBYBKG:             CALL COMMON STBY BKGND SUBRIS
00260   CD4B06          CALL      DELAY
00263   CD0000          CALL      FLT*DISP             DISPLAY FAULT CODE
00266   CD0000          CALL      RED*BGND             CONTROL LENS IN NRDY: STATE
00269   CD0000          CALL      SOS*SUS              SOS JAM DETECTION
0026C   CD0000          CALL      BLK*NRDY             BLINK THE WAIT LAMP
0026F   CD205           CALL      RDYTEST:             CALL READY CONDITION TEST SUBR
00272   3A09F4          IF:       FLG,ALL*RDY,T        ARE ALL READY CONDITONS OK
00275   07
00276   D27D02
00279   2108FE          INCBYT    STATE:               YES, MOVE TO RDY STATE
0027C   34
                        ENDIF
0027D   C35502          ENDWHILE
                SYSTEM NOT-READY STATE BACKGROUND.  EPILOG
00280   21E9FF          COBIT     WAIT$                TURN OFF WAIT LAMP
00283   3EFE
00285   FE
00286   A6
00287   77
00288   FB
00289   C9              RET                            RETURN TO STATE CHECKER
                SYSTEM READY STATE BACKGROUND- PROLOG
0028A   21E7FF  RDY: SOBIT      READY$                 TURN ON READY LAMP
0028D   3E01
0028F   F3
00290   B6
00291   77
00292   FB
00293   AF              CFLG      STRT:PRT             DISALLOW PRINT UNTIL SWSK CALLS
00294   324EF4
                SYSTEM READY STATE BACKGROUND. WHILE: LOOP
00297   3A08FE          WHILE:    XBYT,STATE:,EQ,2     DO RDY LOOP WHILE COND EXISTS
0029A   FE02
0029C   C2C602
0029F   CD2C06          CALL      STBYBKG:             CALL COMMON STBY BKGND SUBRIS
002A2   CD4B06          CALL      DELAY
002A5   CD0000          CALL      SFT*CALC             CALC SHIFTED IMAGE VALUES
002A8   CDD205          CALL      RDYTEST:             CALL READY CONDITION TEST SUBR
002AB   2108FE          LXI       H,STATE:             H&L= ADDR OF STATE:
002AE   3A09F4          IF:       FLG,ALL*RDY,F        ARE ALL READY CONDITIONS OK
002B1   07
002B2   DABA02
002B5   3601            MVI       M,1                  NO, LOAD 1 INTO STATE: (NRDY)
002B7   C3C302          ELSE:                          ALL READY CONDITIONS MET
002BA   3A4EF4          IF:       FLG,STRT:PRT,T       HAS 'START PRINT' BEEN PUSHED
002BD   07
002BE   D2C302
002C1   3603            MVI       M,3                  YES, LOAD 3 INTO STATE: (PRINT)
                        ENDIF
                        ENDIF
002C3   C39702          ENDWHILE
                SYSTEM READY STATE BACKGROUND- EPILOG
002C6   21E7FF          COBIT     READY$               TURN OFF READY LAMP
002C9   3EFE
002CB   F3
002CC   A6
002CD   77
002CE   FB
002CF   C9              RET                            RETURN TO STATE CHECKER
                PRINT STATE BACKGROUND- PROLOG 1
002D0   AF      PRINT:  XRA     A                      CLR A-REG FOR USE AS CN3R
002D1   47              MOV       B,A                  CLR B-REG (0'S INTO SHIFTREG)
002D2   2100F8          LXI       H,SHIFTREG           H&L= START ADDR OF SHIFTREG
```

```
002D5   FE20        WHILE:     XBYT,A,LT,32        WHILE STILL IN SR...(CLR SR)
002D7   D2E002
002DA   70          MOV        M,B                 CLR PRESENT SR LOCATION
002DB   23          INX        H                   MOVE TO NEXT SR LOCATION
002DC   3C          INR        A                   INCRM LOOP CNTR
002DD   C3D502      ENDWHILE
002E0   3E80        SFLG       910*DONE            ALLOW FIRST PITCH RESET
002E2   3260F4
002E5   3E80        SFLG       SRSK*FLG            SIGNAL NEW SR VALUE REQ'D
002E7   321CF4
002EA   AF          XRA        A
002EB   3207FE      STA        CYCUPCT:            INIT CYCLE-UP CNTR TO 0
002EE   3205FE      STA        SR*VALU:            INIT 'NEW SR VALUE' TO 0
002F1   3E03        MVI        A,3
002F3   320AFE      STA        NOIMGCT:            INIT 'NO IMAGE CNTR' TO 3
002F6   CD0000      CALL       SRSK                SHIFT REG SCHEDULER (INIT SR#0)
002F9   CD0000      CALL       TBLD*PRT            BUILD NEW PITCH TABLE
002FC   3E51        STIM       SYS:TIMR,800        INIT 'OVER-RUN EVENT' TIMER
002FE   3221F8
00301   21F5FF      SOBIT      PRNT$RLY            TURN ON PRINT RELAY (PRINT)
00304   3E08
00306   F3
00307   B6
00308   77
00309   FB
0030A   21DCFF      COBIT      PFO$OFF             TURN ON FADE-OUT LAMP
0030D   3EDF
0030F   F3
00310   A6
00311   77
00312   FB
00313   AF          CFLG       NORM*DN:            CLR NORMAL SHUTDOWN REQUEST
00314   3210F4
00317   AF          CFLG       SK1*DLY             CLR SIDE 1 DELAY FLAG
00318   3216F4
0031B   AF          CFLG       TIME*DN:            CLR TIMED SHUTDOWN REQUEST FLAG
0031C   324BF7
0031F   AF          CFLG       IMGMADE:            CLR 1st IMAGE MADE FLAG
00320   320FF4
00323   AF          CFLG       CYCL*DN:            CLR CYCLE-DOWN REQUEST FLAG
00324   3249F7
00327   AF          CFLG       IMED*DN:            CLR IMMED SHUTDOWN REQUEST FLAG
00328   324AF7
0032B   AF          CFLG       SD1*TIMO            CLR SIDE 1 TIME OUT FLAG
0032C   3207F4
0032F   AF          CFLG       PROC*JAM            CLEAR IN CASE THERE WAS A JAM
00339   CD0000      CALL       PAP*SIZE CHECK PAPER WIDTH FOR FUSER
0033C   CD0000      CALL       PROG*UP             PROG INITIALIZATION SUBR
0033F   CD0000      CALL       CLBK*SPR            COLOR BKGRD HI BIAS AT SRT PRT
00342   CD0000      CALL       SET*UP              INITIALIZE ITEMS FOR PAPER PATH
00345   CD0000      CALL       FDR*PRT             CHECK FEEDER SELECTION
                    CALL TO EDGE*FB MUST BE AFTER CALL TO PAP*SIZE
00348   CD0000      CALL       EDGE*FO             DETERMINE WHICH EDGE FADE OUT
                PRINT STATE BACKGROUND- WHILE: LOOP
0034B   3A08FE      WHILE:     XBYT,STATE:,EQ,3    DO PRINT WHILE COND EXISTS
0034E   FE03
00350   C27404
00353   3A07FE      IF:        XBYT,CYCUPCT:,EQ,3  IS CYCLE-UP CNTR= 3
00356   FE03
00358   C26303
0035B   3E80        SFLG       PRT*PRO2            YES, SET 'PRINT PROLOG 2' FLAG
0035D   3220F4
00360   C37D03      ORIF:      XBYT,A,EQ,4         NO, IS CYCLE-UP CNTR= 4
00363   FE04
00365   C27D03
00368   3A20F4      ANDIF:     FLG,PRT*PRO2,T      YES, AND IS PROLOG 2 FLAG SET
0036B   07
0036C   D27D03
0036F   AF          CFLG       PRT*PRO2            YES, DO PROLOG 2 AND CLR FLAG
00370   3220F4
                PRINT STATE BACKGROUND- PROLOG 2
00373   3A0FF4      IF:        FLG,IMGMADE:,T      HAS 1ST IMAGE BEEN MADE
00376   07
00377   D27D03
```

```
0037A  CD0000    CALL     PROG*UP          YES,CALL PROG INITIALIZATION
                 ENDIF
                 ENDIF
0037D  CD0000    CALL     SRSK             SHIFT REG SCHEDULER SUBR
00380  CD0000    CALL     PRT*SWS          PRINT SWITCH SCAN SUBR
00389  CD4B06    CALL     DELAY
0038C  CD0000    CALL     READY*CK         CONTROL READY LAMP IN PRINT
0038F  CD0000    CALL     DSPL*CTL         CONTROL DIGITAL DISPLAY
00392  CD0000    CALL     RLTIM*DO         COMPLETE PROG PITCH EVENTS
00395  CD0000    CALL     FUS*RDUT         TEST FUSER FOR UNDER-TEMP
00398  CD0000    CALL     OIL*MSFD         STOP OIL IF MISFEED
0039B  CD0000    CALL     SOS*JMDT         SOS PRT JAM CHECK
003A1  CD0000    CALL     MANL*DN          CHECK MANUAL DN SW
003A4  CD0000    CALL     NM*ELV*P         MONITOR MAIN TRAY IN PRINT
003A7  CD0000    CALL     TON*DIS          TONER DISPENSE ROUTINE
003AA  CD0000    CALL     DVLMB*JM         DVL OPERATION IF MISFEED
003AD  CD0000    CALL     SETJ6TOG         CHECK JAM6 FOR EXIT OF COPY
003B0  CD0000    CALL     FDR*BK*R         RESET FEEDER HARDWARE
003B3  CD0000    CALL     FDR*BKF1         1ST SHEET FAULT DETECT (FDR)
003B6  CD0000
003B9  2108FE    LXI      H,STATE:         H&L= ADDR OF STATE: BYTE
003BC  3A4AF7    IF:      FLG,IMED*DN:,T   IS IMMED SHUTDOWN REQUESTED
003BF  07
003C0  D2C703
003C3  34        INR      M                YES, MOVE TO RUNNPRT: STATE
003C4  C34B04    ELSE:                     IMMED SHUTDOWN NOT REQUESTED
003C7  3A0AFE    LDA      NOIMGCT:         PREPARE TO TEST 'NO IMAGE CNTR'
003CA  47        MOV      B,A              B= <NO IMAGE CNTR>
003CB  3A49F7    IF:      FLG,CYCL*DN:,T   IS CYCLE-DOWN REQUESTED
003CE  07
003CF  D2F803
003D2  3A0FF4    IF:      FLG,IMGMADE:,F   YES, HAS 1ST IMAGE BEEN MADE
003D5  07
003D6  DADD03
003D9  34        INR      M                NO, MOVE TO RUNNPRT: STATE
003DA  C3F503    ORIF:    FLG,SD1*TIMEO,T  IS PROC MAKING SIDE 1'S - DUPLEX
003DD  3A07F4
003E0  07
003E1  D2EE03
003E4  78        IF:      XBYT,B,GE,16     YES, WERE THERE>15 NO IMAGES
003E5  FE10
003E7  DAEB03
003EA  34        INR      M                YES, MOVE TO RUNNPRT: STATE
                 ENDIF
003EB  C3F503    ORIF:    XBYT,B,GE,13     WERE THERE>12 NO IMAGES
003EE  78
003EF  FE0D
003F1  DAF503
003F4  34        INR      M                YES, MOVE TO RUNNPRT: STATE
                 ENDIF
003F5  C34B04    ORIF:    FLG,NORM*DN:,T   IS A NORMAL SHUTDOWN REQUESTED
003F8  3A10F4
003FB  07
003FC  D20A04
003FF  3A0FF4    ANDIF:   FLG,IMGMADE:,F   YES, AND ARE 0 IMAGES FLASHED
00402  07
00403  DA0A04
00406  34        INR      M                YES, MOVE TO RUNNPRT: STATE
00407  C34B04    ORIF:    FLG,SD1*TIMO,T   IS PROC MAKING SIDE 1'S- DUPLEX
0040A  3A07F4
0040D  07
0040E  D22C04
00411  3A39F4    IF:      FLG,ADH*MUTF,F   YES, IS ADH IN MULT FEED MODE
00414  07
00415  DA2204
00418  78        IF:      XBYT,B,GE,36     NO, WERE THERE>35 NO IMAGES
00419  FE24
00418  DA1F04
0041E  34        INR      M                YES, MOVE TO RUNNPRT: STATE
                 ENDIF
0041F  C32904    ELSE:
00422  78        IF:      XBYT,B,GE,16     WERE THERE > 15 NO IMAGES
00423  FE10
00425  DA2904
```

```
00428  34         INR      M                YES, MOVE TO RUNNPRT: STATE
                  ENDIF
                  ENDIF
00429  C34B04     ORIF:    FLG,ADH*MUTF,F   IS ADH NOT IN MULTIPLE FEED
0042C  3A39F4
0042F  07
00430  DA4404
00433  3A38F4     ANDIF:   FLG,ADH*SINF,F   YES, AND IS IT NOT IN SINGLE
00436  07
00437  DA4404
0043A  78         IF:      XBYT,B,GE,21     NO, WERE THERE>20 NO IMAGES
0043B  FE15
0043D  DA4104
00440  34         INR      M                YES, MOVE TO RUNNPRT: STATE
                  ENDIF
00441  C34B04     ELSE:                     ADH IS SELECTED
00444  78         IF:      XBYT,B,GE,13     WERE THERE>12 NO IMAGES
00445  FE0D
00447  DA4B04
0044A  34         INR      M                YES, MOVE TO RUNNPRT: STATE
                  ENDIF
                  ENDIF
                  PRINT STATE BACKGROUND-EPILOG
0044B  3A10F4     IF:      FLG,NORM*DN:,F   IS NORMAL SHUTDOWN REQUESTED
0044E  07
0044F  DA6304
00452  3A49F7     ANDIF:   FLG,CYCL*DN:,F   NO, IS CYCLE-DOWN REQUESTED
00455  07
00456  DA6304
00459  3A16F4     ANDIF:   FLG,SD1*DLY,F    NO, IS PROC DEAD CYCLING
0045C  07
0045D  DA6304
00460  C37104     ELSE:                     1 OR BOTH COND'S REQUESTED
00463  3E02       MVI      A,2              LOAD 2 INTO CYCLE-UP CNTR TO
00465  3207FE     STA      CYCUPCT:         FORCE THE CYCLE-UP MODE AGAIN
00468  21DAFF     COBIT    ILLM$SPL         ILLM SPL OFF DURING DEAD CYCLE
0046B  3EF7
0046D  F3
0046E  A6
0046F  77
00470  FB
                  ENDIF
00471  C34B03     ENDWHILE
00474  21F5FF     COBIT    PRNT$RLY         TURN OFF PRINT RELAY
00477  3EF7
00479  F3
0047A  A6
0047B  77
0047C  FB
0047D  AF         CFLG     TBLD*FIN         SIGNAL NEW PITCH TABLE REQ'D
0047E  325DF4
00481  21CB01     LXI      H,EV*STBY:       H&L= ADDR STBY EVENT TABLE
00484  2250F8     SHLD     EV*PTR:          SAVE FOR MACH CLK ROUTINE
00487  21DCFF     COBIT    PFO$OFF          TURN OFF FADE-OUT LAMP
0048A  3EDF
0048C  F3
0048D  A6
0048E  77
0048F  FB
00490  21EEFF     COBIT    EFO$11           CLEAR 11 IN EDGE FADE-OUT LAMP
00493  3EF7
00495  F3
00496  A6
00497  77
00498  FB
00499  21D9FF     COBIT    EFO$12$5         CLEAR 12.5 IN EDGE FADE-OUT
0049C  3EF7
0049E  F3
0049F  A6
004A0  77
004A1  FB
004A2  CD0000     CALL     FUSNTRDY         TURN OFF FUSER STUFF
004A5  CD0000     CALL     SOS*STBY         CLEAR SOS ENABLE
```

```
004A8    21EEFF        COBIT     DTCK$EDG
004AB    3EBF
004AD    F3
004AE    A6
004AF    77
004B0    FB
004B1    21F6FF        COBIT     XER$CURR             TURN OFF TRANSFER CIRCUIT
004B4    3EBF
004B6    F3
004B7    A6
004B8    77
004B9    FB
004BA    21F0FF        COBIT     XER$LOAD             RELEASE TRANSFER ROLL
004BD    3EDF
004BF    F3
004C0    A6
004C1    77
004C2    FB
004C3    21F3FF        COBIT     AX$WT                TURN OFF AUXILIARY TRAY WAIT
004C6    3EFD
004C8    F3
004C9    A6
00004CA  77
004CB    FB
004CC    21F4FF        COBIT     MN$WT                TURN OFF MAIN TRAY WAIT
004CF    3EFD
004D1    F3
004D2    A6
004D3    77
004D4    FB
004D5    21FBFF        COBIT     AXFD$INT             TURN OFF AUXILIARY FEEDER
004D8    3EFD
004DA    F3
004DB    A6
004DC    77
004DD    FB
004DE    21FAFF        COBIT     MNFD$INT             TURN OF MAIN FEEDER
004E1    3EFD
004E3    F3
004E4    A6
004E5    77
004E6    FB
004E7    21DAFF        COBIT     ILLM$SPL             TURN OFF ILLUMINATION LAMP SUPPLY
004EA    3EF7
004EC    F3
004ED    A6
004EE    77
004Ef    FB
004F0    CD0000        CALL      DVL*NRDY             TURNS OFF DVL IF JAM
004F3    C9            RET                            RETURN TO STATE CHECKER
                  SYSTEM RUNNING, NOT PRINT STATE BACKGROUND- WHILE: LOOP
004F4    3A08FE   RUNNPRT  WHILE:  XBYT,STATE:,EQ,4   DO RUNNPRT WHILE COND EXISTS
004F7    FE04
004F9    C28805
004FC    CD0000        CALL      READY*CK             CONTROL READY LAMP IN RUNNPRT:
004FF    CD0000        CALL      DSPL*CTL             CONTROL DIGITAL DISPLAY
00502    CD0000        CALL      RLTIM*DO             COMPLETE PROG PITCH EVENTS
00505    CD0000        CALL      ILK*CK
00508    CD0000        CALL      RILK*CK
00508    CD0000        CALL      FUS*RDUT             TEST FUSER FOR UNDER-TEMP
0050E    CD0000        CALL      MANL*DN              CHECK MANUAL DN SW
00511    CD0000        CALL      MN*ELV*S             MONITORS MAIN TRAY IN SDBY
00514    CD4B06        CALL      DELAY
00517    CD0000        CALL      SETJ6TOG             CHECK JAM6 SW FOR EXIT OF COPY
0051A    3A58F4        IF:       FLG,SRT*SETF,T       IS SRT SELECTED (SETS MADE)
0051D    07
0051E    D23205
00521    3A6EF4        ANDIF:    FLG,SRT*COPY,F       YES, AND ARE SRT COPIES ,NE.O
00524    07
00525    DA3205
00528    3A6CF4        ANDIF:    FLG,SRT*JAM,F        YES, AND IS SRT JAM-FREE
0052B    07
0052C    DA3205
```

```
                        ALL TESTS PASSED- STAY IN RUNNPRT: STATE
0052F    C38505             ORIF:     FLG,SRT*STKF,T        IS SRT SELECTED (STKS MODE)
00532    3A59F4
00535    07
00536    D24A05
00539    3A6EF4             ANDIF:    FLG,SRT*COPY,F        YES, AND ARE SRT COPIES ,NE.0
0053C    07
0053D    DA4A05
00540    3A6CF4             ANDIF:    FLG,SRT*JAM,F         YES, AND IS SRT JAM-FREE
00543    07
00544    DA4A05
                        ALL TESTS PASSED- STAY IN RUNNPRT: STATE
00547    C38505             ORIF:     FLG,SD1*TIMO,T        ARE SIDE 1 COPIES GOING TO AUX
0054A    3A07F4
0054D    07
0054E    D25C05
00551    3AF1FF             ANDIF:    OBIT,RET$MOT,T        YES, AND IS RETURN PATH MOTOR ON
00554    E608
0556     CA5C05
                        ALL TESTS PASSED- STAY IN RUNNPRT: STATE
00559    C38505             ORIF:     FLG,SYS:TIME,T        HAS TIMER BEEN INITIATED (PLL
0055C    3A1FF4
0055F    07
00560    D27305
                                                            UNLOCKED LAST TIME THRU)
00563    3A21F8             IF:       TIM,SYS:TIMR,L        YES, IS TIMER TIMED OUT
00566    D601
00568    C27005
0056B    3E01               MVI       A,1                   YES, LOAD 1 INTO STATE: FORCING
0056D    3208FE             STA       STATE:                MOVE TO NRDY STATE
                            ENDIF
00570    C38505             ORIF:     XBYT,RIS#BYT,AND,PLL,NZ TIMER NOT USED: IS PLL LOCKED
00573    3A0036
00576    E610
00578    CA8505
00578    3E1F               STIM      SYS:TIMR,300          NO, SET TIMER TO 300 MSEC
0057D    3221F8
00580    3E80               SFLG      SYS:TIMF              SET 'TIMER IN USE' FLAG
00582    321FF4
                            ENDIF
00585    C3F404             ENDWHILE
                        SYSTEM RUNNING, NOT PRINT STATE BACKGROUND-EPILOG
00588    CD0000             CALL      DEL*CK                CALC COPIES DELIVERED INFO
00588    21F3FF             COBIT     FUS$TRAP              INSURE FUSER TRAP SOL OFF
0058E    3EDF
00590    F3
00591    A6
00592    77
00593    FB
00594    C9                 RET                             RETURN TO STATE CHECKER
                        TECH REP STATE BACKGROUND- WHILE: LOOP
00595    3A08FE         TECHREP: WHILE XBYT,STATE:,EQ,5     DO TECHREP WHILE COND EXISTS
00598    FE05
0059A    C2AB05
0059D    CD0000             CALL      ILK*CK
005A0    CD0000             CALL      NRILK*CK
005A3    3E01               MVI       A,1                   LOAD 1 INTO STATE: TO FORCE A
005A5    3208FE             STA       STATE:                CHANGE TO NRDY STATE
005A8    C39505             ENDWHILE
005AB    C9                 RET                             RETURN TO STATE CHECKER
```

TABLE II

SCAN FAULT FLAGS / LOOP

```
01008    3A4CF7         FLT*SCAN  IF:  FLG,PROC*JAM,F       CHECK FOR PROCESSOR JAM
01008    07
0100C    DA1210
0100F    CDCB10             CALL      JAM*SCAN              LOOK FOR PAPER ON SWITCHES
                            ENDIF
01012    2121F7             LXI       H,FLT*TBL             GET STARTING ADDR OF FLAG ARRAY
01015    3A0210             LDA       FLT*CNT               GET NO. OF FLAGS
```

```
01018   47        MOV       B,A
01019   1E00      MVI       E,O                  ZERO FAULT COUNTER
01018   53        MOV       D,E                  ZERO CASE COUNTER
0101C   78        WHILE:    VBYT,B,NZ            SCAN FLAGS
01010   FE00
0101F   CA3810
01022   14        INR       D                    INCREMENT COUNTER
01023   7E        MOV       A,M                  GET FLAG
01024   23        INX       H                    POINT TO NEXT FLAG
01025   07        RLC
01026   D23410    IF:       CC,C,S               TEST FLAG
01029   1C        INR       E                    FLAG IS SET, COUNT IT
0102A   3A0110    IF:       XBYT,FLT*CDPL,GE,D   ARE BOTH CODE AND LAMPS REQD
0102D   BA
0102E   DA3410
01031   CD0000    CALL      FLT*LAMP             DETERMINE WHICH LAMPS
                  ENDIF
                  ENDIF
01034   05        DCR       B                    DECREMENT FLAG COUNT
01035   C31C10    ENDWHILE
01038   7B        IF:       VBYT,E,NZ            ARE ANY FLAGS SET
01039   FE00
01038   CA4810
01038   2181FF    SOBIT     PRES$FCD             PRESS FAULT CODE LAMP ON
01041   3E01
01043   F3
01044   B6
01045   77
01046   FB
01047   AF        CFLG      FLT*RDY              RESET FLAG, INDICATE FAULT
01048   328BF7
0104B   C35C10    ELSE:                          NO FLAGS SET
0104E   21F1FF    COBIT     PRES$FCD             PRESS FAULT CODE LAMP - OFF
01051   3EFE
01053   F3
01054   A6
01055   77
01056   FB
01057   3E80      SFLG      FLT*RDY              SET FLAG, NO FAULT PRESENT
01059   328BF7
                  ENDIF
0105C   7B        MOV       A,E                  YES
0105D   321DF8    STA       FLT*TOT              SAVE NO. OF FLAGS SET
01060   C9        RET
```

TABLE III

```
                  DISPLAY FAULT CODE / LOOP - NOT READY
02B09   3A32F4    FLT*DISP  IF:  FLG,DSPL*FLT,T   DISPLAY FLT CODE WAS PUSHED
02B0C   07
02B0D   D24C2B
02B10   3A22FE    IF:       VBYT,FLT*TOT,NZ      FAULTS EXIST
02B13   FE00
02B15   CA3928
02B18   2E6A      ANDIF:    IBIT,FAULT#CD,T      BUTTON STILL PUSHED
02B1A   CD0000
02B1D   D2392B
02B20   3A0EF4    IF:       FLG,FLT*SHOW,F       CHECK IF CODE ALREADY DISPLAYED
02B23   07
02B24   DA362B
02B27   CD952B    CALL      FLT*FIND             LOOK FOR NEXT FAULT IN TABLE
02B2A   CD0A2C    CALL      FLT*DCTL             GET FAULT CODE,PREP FOR DISPLAY
02B2D   AF        CFLG      DSPL*1ST             REQUEST DISPLAY OF FAULT CODE
02B2E   3231F4
02B31   3E80      SFLG      FLT*SHOW             FAULT CODE READY FOR DISPLAY
02B33   320EF4
                  ENDIF
02B36   C34C2B    ELSE:
02B39   3A6FF4    IF:       FLG,FLT*CSHW,F
02B3C   07
02B3D   DA4C2B
02B40   AF        CFLG      DSPL*1ST             CALL FOR OLD DISPLAY
02B41   3231F4
```

```
02B44   AF            CFLG      DSPL*FLT          DO NOT DISPLAY FAULT CODE
02B45   3232F4
02B48   AF            CFLG      FLT*SHOW
02B49   320EF4
                      ENDIF
                      ENDIF
                      ENDIF
02B4C   C9            RET
```

TABLE IV

FAULT DISPLAY - TOP COVER CONTROL / LOOP -NOT READY

```
02B4D   3A0EF4   FLT*COVR  IF: FLG,FLT*SHOW,F     CHECK IF DISP FAULT CODE PUSHED
02B50   07
02B51   DA942B
02B54   3A7CF7        IF:       FLG,PROC*JAM,T    CHECK FOR PROCESSOR JAM
02B57   07
02B58   D2812B
02B58   2EF9          ANDIF:    IBIT,TCVR#OPN,T   CHECK IF TOP COVER IS OPEN
02B5D   CD0000
02B60   D2812B
02B63   3A6FF4        IF:       FLG,FLT*CSHW,F    CHECK IF DISPLAY REQ BY COVER
02B66   07
02B67   DA7E2B
02B6A   CD8B2B        CALL:     FLT*CFND          FIND WHICH FLAG IS SET
02B6D   CD0A2C        CALL:     FLT*DCTL          GET FAULT CODE
02B70   3F80          SFLG      FLT*CSHW
02B72   326FF4
02B75   3E80          SFLG      DSPL*FLT          REQUEST DISPLAY OF FAULT CODE
02B77   3232F4
02B74   AF            CFLG      DSPL*1ST
02B7B   3231F4
                      ENDIF
02B7E   C3942B        ELSE:
02B81   3A7FF4        IF:       FLG,FLT*CSHW,T    CHECK IF DISPLAY NOT REQUIRED
02B84   07
02B85   D2942B
02B88   AF            CFLG      FLT*CSHW          CLEAR FLAGS
02B89   326FF4
02B8C   AF            CFLG      DSPL*1ST
02B8D   3231F4
02B90   AF            CFLG      DSPL*FLT
02B91   3232F4
                      ENDIF
                      ENDIF
                      ENDIF
02B94   C9            RET
```

TABLE V

DETERMINE WHICH FAULT IS TO BE DISPLAYED / SUBR

```
02B95   3E80    FLT*FIND SFLG   FLT*WILE          SET WHILE: LOOP CONTROL FLAG
02B97   3205F4
02B9A   2A79F8        LHLD      FLT*ADDR          GET ADDRESS OF FLAG
02B9D   3A05F4        WHILE:    FLG,FLT*WILE,T
02BA0   07
02BA1   02EA2B
02BA4   3A5EF4        IF:       FLG,FLT*TOP,T     CHECK IF AT TOP OF TABLE
02BA7   07
02BA8   D2B32B
02BAB   AF            CFLG      FLT*TOP
02BAC   325EF4
02BAF   AF            XRA       A
02BB0   C3B62B        ELSE:
02BB3   3A34FE        LDA       FLT*NUM           GET FAULT POINTER
                      ENDIF
02BB6   30            INR       A                 INCREMENT FAULT CODE
02BB7   3234FE        STA       FLT*NUM           STORE IT
```

```
02BBA   5F          MOV       E,A
02BBB   7E          MOV       AM,                   GET FLAG
02BBC   23          INX       H                     INCREMENT FLAG ADDRESS
02BBD   07          RLC
02BBE   D2D92B      IF:       CC,C,S                TEST FLAG
02BC1   AF          CFLG      FLT*WILE              RESET LOOP CONTROL FLAG
02BC2   3205F4
02BC5   7B          IF:       XBYT,E,EQ,FLT*FLGS    CHECK FOR END OF FAULT ARRAY
02BC6   FE50
02BC8   C2D32B
02BCB   3E80        SFLG      FLT*TOP
02BCD   325EF4
02BD0   2121F7      LXI       H,FLT*TBL             GET STARTING ADDR OF ARRAY
                    ENDIF
02BD3   2279F8      SHLD      FLT*ADDR              SAVE IT
02BD6   C3E72B      ELSE:
02BD9   7B          IF:       XBYT,E,EQ,FLT*FLGS    CHECK FOR END OF TABLE
02BDA   FF50
02BDC   C2E72B
02BDF   3F80        SFLG      FLT*TOP
02BE1   325FF4
02BE4   2121F7      LXI       H,FLT*TBL             POINT TO TOP OF ARRAY
                    ENDIF
                    ENDIF
02BE7   C39D2B      ENDWHILE
02BEA   C9          RET
```

TABLE VI

GET DISPLAY DATA FROM TABLE / SUBR

```
017D1   3AD017   FLT*DCTL LDA  FLT*NUM              GET FLAG NO., USE AS POINTER
017D4   3D          DCR       A                     DECREMENT
017D5   07          RLC                             DOUBLE RESULTANT POINTER
017D6   1600        MVI       D,O                   SET UP INDEX
017D8   5F          MOV       E,A
017D9   218818      LXI       H,FLT*DTBL            GET BASE ADDR OF DATA TABLE
017DC   19          DAD       D                     ADD INDEX
017DD   7E          MOV       A,M                   GET LSD
017DE   3276F8      STA       FLT*DSPL              STORE IN DISPLAY WORD (LSD)
017B1   23          INX       H
017B2   7E          MOV       A,M                   GET MSD
017B3   1176F8      LXI       D,FLT*DSPL
017B6               INX       D
017B7   12          STAX      D                     STORE IN DISPLAY WORD (MSU)
017B8   3E07        MVI       A,7                   USE 100'S, 10'S, 1'S DIGITS
017EA   3278F8      STA       FC*DIGIT              SAVE DIGIT BLANKING BITS
017BD   C9          RET
```

TABLE VII

LOOK FOR PAPER ON JAM SWITCHES - STANDBY / SUBR

```
02D30   2ED7     JAM*SCAN RIBYT  JSW*BYTE           TEST PAPER PATH JAM SWITCHES
02D32   CD0000
02D35   3233FE      STA       JSW*BITS              SAVE CONTENTS OF BYTE
02D38   FE00        IF:       VBYT,A,NZ             CHECK IF ANY BITS ARE SET
02D3A   CA5A2D
02D3D   2121F7      LXI       H,FLT*TRL             GET ADDR OF 1ST JAM FLAG
02D40   0607        MVI       B,7                   SCAN 7 BITS
02D42   78          WHILE:    VBYT,B,NZ             CHECK IF MORE BITS TO SCAN
02D43   FF00
02D45   CA5A2D
02D48   3A33FE      LDA       JSW*BITS
02D4B   0F          RRC                             GET BIT
02D4C   3233FE      STA       JSW*BITS
02D4F   D2552D      IF:       CC,C,S                TEST BIT
02D52   3E80        MVI       A,X'80'               LOAD MASK
02D54   77          MOV       M,A                   SET FLAG
                    ENDIF
02D55   05          DCR       B                     DECREMENT BIT COUNT
```

```
02D56   23                INX       H                 INCREMENT ADDR
02D57   C3422D            ENDWHILE
                          ENDIF
02D5A   C9                RET
```

TABLE VIII

TURN ON LAMPS ASSOCIATED WITH FAULT CODES / SUBR

```
02C20   E5      FLT*LAMP  PUSH      H                 SAVE H AND L REGISTERS
02C2A   7A                IF:       XBYT,D,LE,10      CHECK IF STATUS PANEL FLAG SET
02C2B   FE0A
02C2D   DA332C
02C30   C23D2C
02C33   3A7CF7            ANDIF:    FLG,PROC*JAM,T    CHECK FOR PROCESSOR JAM
02C36   07
02C37   D23D2C
02C3A   CD4E2C            CALL      FLT*SPNL
                          ENDIF
02C3D   7A                IF:       XBYT,D,GE,22      LOOK FOR CHECK DOORS FAULT
02C3E   FE16
02C40   DA4C2C
02C43   213FFF            SOBIT     C$DOORS           TURN ON CHECK DOORS LAMP
02C46   3E01
02C48   F3
02C49   B6
02C4A   77
02C4B   FB
                          ENDIF
02C4C   E1                POP       H                 GET H AND L REGISTERS
02C4D   C9                RET
```

TABLE IX

TURN ON STATUS PANEL LAMPS / SUBR

```
01817   21BAFF  FLT*SPNL  SOBIT     C$STATUS          CHECK STATUS PANEL
0181A   3E01
0181C   F3
0181D   B6
0181E   77
0181F   FB
01820   210000            SOBIT     FACE$JAM          FACE UP
01823   3E00
01825   F3
01826   B6
01827   77
01828   FB
01829   21B2FF            SOBIT     FUS$JAM           FUSER
0182C   3E20
0123E   F3
0182F   B6
01830   77
01831   FB
01832   21F7FF            SOBIT     REG$JAM           REGISTRATION
01835   3E20
01837   F3
01838   B6
01839   77
0183A   FB
0183B   21B4FF            SOBIT     C$X$JAM           C TRANSPORT
0183E   3E20
01840   F3
01841   B6
01842   77
01843   FB
01844   3A13F4            IF:       FLG,2SD*FLAG,T    CHECK FOR 2 SIDED COPY
01847   07
01848   D26718
0184B   21EBFF            SOBIT     INVT$JAM          INVERTER
0184E   3E20
01850   F3
```

```
01851   B6
01852   77
01853   FB
01854   3A14F4      IF:       FLG,SIDE*1,T
01857   07
01858   D26418
0185B   21B0FF      SOBIT     RETX$JAM          RETURN TRANSPORT
0185E   3E20
01860   F3          SOBIT     B$X$JAM           B TRANSPORT
01861   B6
01862   77
01863   FB
                    ENDIF
01864   C37718      ELSE:
01867   3A15F4      IF:       FLG,AX*FLAG,F     CHECK FOR AUX TRAY SELECT
0186A   07
0185B   DA/718
0186E   21E8FF      SOBIT     B$X$JAM           B TRANSPORT
01871   3E20
01873   F3
01874   B6
01875   77
01876   FB
                    ENDIF
                    ENDIF
01877   3A2CF7      IF:       FLG,SOS*JAM,T     CHECK FOR SOS JAM
0187A   07
0187B   D28718
0187E   21F4FF      SOBIT     SOS$JAM           SOS
01881   3E20
01883   F3
01884   B6
01885   77
01886   FB
                    ENDIF
01887   C9          RET
```

TABLE X

HISTORY FILE

```
00019   2110E2   HIST*FLE  LXI  H,NV*TAB1        LOAD MEM POINTER WITH BEGINING
                                    PATH JAM COUNTERS
0001C   1121F7      LXI       D,FLT*TAB1        LOAD POINTER WITH BEGINING OF PAPER
                                    PATH FAULT TABLE
0001F   3F2A        MVI       A,FLT*TB1F        LOAD ACCUM WITH LSBYTE OF THE END
                                    OF THE PAPER PATH FAULT TABLE
00021   BB          WHILE:    XBYT,A,GE,E       LOOP UNTIL THROUGH FAULT TABLE
00022   DA2D00
00025   CD0000      CALL      HST*BCNT          CALL ROUTINE TO UPDATE A COUNTER
                                    NUMEM DEPENDING ON D7 BIT OF MEMORY
00028   3E2A        MVI       A,FLT*B1F         PREPARE FOR END OF TABLE TEST
0002A   C32100      ENDWHILE
0002D   2124E2      LXI       H,NV*TAB2         LOAD POINTER WITH START OF
                                    RESET AND COUNT ERROR COUNTERS
00030   114FF7      LXI       D,FLT*TAB2        LOAD POINTER WITH START OF
                                    RESET AND COUNT ERROR FAULT TABLE
00033   3F52        MVI       A,FLT*TB2F        LOAD ACCUM WITH END OF 2ND FAULT
00035   BB          WHILE:    XBUT,A,GE,F       LOOP UNTIL THROUGH 2ND FAULT TABLE
00036   DA4100
00039   CD0000      CALL      HST*BCNT
0003C   3E52        MVI       A,FLT*TB2F
0003E   C33500      ENDWHILE
00041   2140E2      LXI       H,NV*TAR4         LOAD PNT WITH STRT OF FUSER UNDER TEMP
                                    AND CLEAN SOS COUNTERS
00044   1148F7      LXI       D,FLT*TAB4        LOAD PNTR WITH STRT OF FUS UNDER TEMP
                                    AND CLN SOS FAULT TABLE
00047   3F48        MVI       A,FLT*TB4F        SET UP END OF FAULT TABLE
00049   BB          WHILE:    XBYT,A,GE,F       LOOP UNTIL THROUGH FAULT TABLE
0004A   DA5500
0004D   CD0000      CALL      HST*BCNT
00050   3F48        MVI       A,FLT*TB4F
00052   C34900      ENDWHILE
```

```
00055  2142E2    LXI       H,NV*TAB5       START PRINTER AT BEG OF FEEDER
00058  1158F6    LXI       D,FLT*TAB5      STRT PNTR AT BEG OF FEEDER FLT
0005B  3F5A      MVI       A,FLT*TB5F      SET UP END OF FEEDER FLT TABLE
0005D  BR        WHILE:    XBYT,A,GE,F     LOOP UNTIL THROUGH FAULT TABLE
0005E  DA6900
00061  CD0000    CALL      HST*BCNT
00064  0F5A      MVI       A,FLT*185F
00064  C35D00    ENDWHILE
00069  3A74F4    IF:       FLG,SRT*SF1,T   COUNT SORTER JAMS IF SELECTED
0006C  07
0006D  07
00070  115BF6    LXI       D,FLT*TAB6      SET PNT TO STRT OF SRT JAM FLAG
00073  3F5C      MVI       A,FLT*TB6F
00075  BB        WHILE:    XBYT,A,GE,F
00076  DA8100
00079  CD0000    CALL      HST*BCNT
0007C  3F5C      MVI       A,FLT*TB6F
0007E  C37500    ENDWHILE
                 ENDIF
00081  AF        XRA       A               CLEAR ACCUM FOR ZERO TEST
00082  2AB3F8    1HLD      SDFL*HST        FETCH BCD CNT OF SHEETS DELIVERED
00085  B5        ORA       1
00086  B4        ORA       H               DO NOT UPDATE NVCOUNTER OF NO. SHEETS
00087  CA9300    IF:       CC,Z,C          DELIVERED TO SRT DURING LAST JOB
0008A  114CE2    LXI       D,NV*CNT1       SET POINTER TO SORTER NV COUNTER
0008D  CD0901    CALL      HST*DCNT        CALL ROUTINE TO UPDATE 6 DIGIT
00090  22B3F8    SHLD      SDFL*HST        CLEAR BCD CNT OF SHEETS DELIVERED
                 ENDIF
00093  2Ab5F8    LHLD      FDFL*HST        BCD COUNT OF SHEETS DEL TO FACE UP TRAY
00096  B5        ORA       L
00097  B4        ORA       H
00098  CAA400    IF:       CC,Z,C          CHECK FOR ZERO COUNT IN LAST JOB
0009B  1152E2    LXI       D,NV*CNT2       SET POINTER TO FACEUP NV COUNTER
0009E  CD0901    CALL      HST*DCNT        UPDATE NVCOUNTER WITH CURRENT COUNT
000A1  22B5F8    SHLD      FDEL*HST        CLEAR FACEUP COUNT FROM LAST JOB
                 ENDIF
000A4  2AB7F8    LHLD      ADFL*HST        BCD COUNT OF AUX TRAY DELIVERED
000A7  B4        ORA       H
000A8  B5        ORA       L
000A9  CAB500    IF:       CC,Z,C          SKIP UPDATE IF COUNT IS ZERO
000AC  1158E2    LXI       D,NV*CNT3       SET POINTER TO AUX TRAY NV COUNTER
000AF  CD0901    CALL      HST*DCNT        UPDATE NV COUNTER WITH CURRENT COUNT
000B2  22B7F8    SHLD      ADEL*HST        CLEAR CURRENT AUX TRAY COUNT
                 ENDIF
000B5  2A89F8    LHLD      TFLH*HST        BCD COUNT OF TOTAL FLASHES
000B8  B4        ORA       H
000B9  B5        ORA       L
000BA  CACF00    IF:       CC,Z,C
000BD  115EE2    LXI       D,NV*CNT4       NVCOUNTER OF TOTAL FLASHES
000C0  CD0901    CALL      HST*DCNT
000C3  2AB9F8    LHLD      TFLH*HST
000C6  1170E2    LXI       D,NV*CNTF       NVCOUNTER OF TOTAL FLASHES ON D
000C9  CD0901    CALL      HST*DCNT
000CC  22B9F8    SHLD      TFLH*HST
                 ENDIF
000CF  2ABBF8    LHLD      2FLH*HST        BCD CNTR OF TOTAL SIDE 2 FLSH
000D2  B4        ORA       H
000D3  B5        ORA       L
000D4  CAE000    IF:       CC,Z,C          UPDATE NVCNTR IF CURRENT CNT NO
000D7  1164E2    LXI       D,NV*CNT5
000DA  CD0901    CALL      HST*DCNT
000DD  22BBF8    SHLD      2FLH*HST
                 ENDIF
000E0  C9        RET
```

TABLE XI

HISTORY - B COUNTER ROUTINE

```
00000  1A    HST*BCNT 1 DAX   D      FETCH FLAG TO ACCUM
00001  07             RLC            SET/CLEAR CARRY BIT
00002  7E             MOV     A,M    FETCH LSNIBBLE OF COUNTER
00003  CF00           ACI     0      UPDATE WITH CARRY
00005  77             MOV     M,A    STORE UPDATED NIBBLE
```

```
00006   BE          CMP     M           CHECK FOR OVERFLOW
00007   23          INX     H           MOVE POINTER TO MSNIBBLE
00008   CA1600      IF:     CC,Z,C      IF OVERFLOW OUT OF LSNIBBLE
0000B   34          INR     M           INCREMENT MSNIBBLE
0000C   AF          XRA     A
0000D   BF          CMP     M           TEST MSNIBBLE FOR ZERO
0000E   C21600      IF:     CC,Z,S      IF ZERO THE COUNTER OVERFLOWED
00011   2F          CMA
00012   77          MOV     M,A         LOAD MSNIBBLE WITH 'F'
00013   2B          DCX     H
00014   77          MOV     M,A         LOAD LSNIBBLE WITH 'F'
00015   23          INX     H           RESTORE NV POINTER
                    ENDIF
                    ENDIF
00016   23          INX     H           MOV POINTER TO LSNIBBLE OF NEXT FLAG
00017   13          INX     D           MOV POINTER TO NEXT FLAG
00018   C9          RET
```

TABLE XII

HISTORY - D COUNTER ROUTINE

```
00109   EB      HST*DCNT XCHG               SWAP CURRENT CNT AND POINTER TO
0010A   7B          MOV     A,F             LOAD UNIT/TENS DIGITS OF CURRENT
0010B   86          ADD     M
0010C   27          DAA
0010D   77          MOV     M,A             UPDATE UNITS DIGITS(LSNIB) OF NV
0010E   D21201      IF:     CC,C,S          CHECK FOR OVERFLOW
00111   14          INR     D               INC HUND/THOU DIGIT IF OVERFLOW
                    ENDIF
00112   AF          XRA     M               MASK OF UPDATED CURRENT TENS DIGIT
00113   CD4101      CALL    HST*DCTS        UPDATE TENS DIGIT AND SET OVERFLOW
00116   CA1A01      IF:     CC,Z,C
00119   37          STC                     INDICATE OVERFLOW BY SETTING CA
                    ENDIF
0011A   7A          MOV     A,D             FETCH CURRENT HUND/THOU DIGIT
0011B   23          INX     H               MOVE POINTER TO HUNDREDS NIBBLE
0011C   8E          ADC     M               UPDATE WITH CURRENT+OVERFLOW
0011D   27          DAA
0011E   77          MOV     M,A             STORE UPDATE
0011F   D22401      IF:     CC,C,S          CHECK FOR OVERFLOW
00122   EF01        XRI     1               COMPLEMENT DO BIT TO SET OVERFLOW
                    ENDIF
00124   AF          XRA     M               MASKOFF 1000'S NIB/SET OVERFLOW
00125   CD4101      CALL    HST*DCTS        UPDATE THOU DIGIT AND SET OVERFLOW
00128   CD4101      CALL    HST*DCTS        UPDATE 10K DIGIT WITH OVERFLOW
0012B   CD4101      CALL    HST*DCTS        UPDATE 100K DITIT WITH OVERFLOW
0012E   CA3E01      IF:     CC,Z,C          CHECK FOR OVERFLOW FROM 100K DIGIT
00131   2F          CMA
00132   77          MOV     M,A             LOAD 100K DIGIT WITH 'F'
00133   2B          DCX     H
00134   77          MOV     M,A             LOAD 10K DIGIT WITH 'F'
00135   2B          DCX     H
00136   77          MOV     M,A             LOAD 1K DIGIT WITH 'F'
00137   2B          DCX     H
00138   77          MOV     M,A             LOAD 100 DIGIT WITH 'F'
00139   2B          DCX     H
0013A   77          MOV     M,A             LOAD 10 DIGIT WITH 'F'
0013B   2B          DCX     H
0013C   77          MOV     M,A             LOAD UNIT DIGIT WITH 'F'
0013D   AF          XRA     A               CLEAR ACCUM TO CLEAR REG PAIR
                    ENDIF
0013E   67          MOV     H,A             SET UP REGISTER PAIR TO CLEAR C
0013F   7F          MOV     L,A
00140   C9          RET
```

Figure 46B:
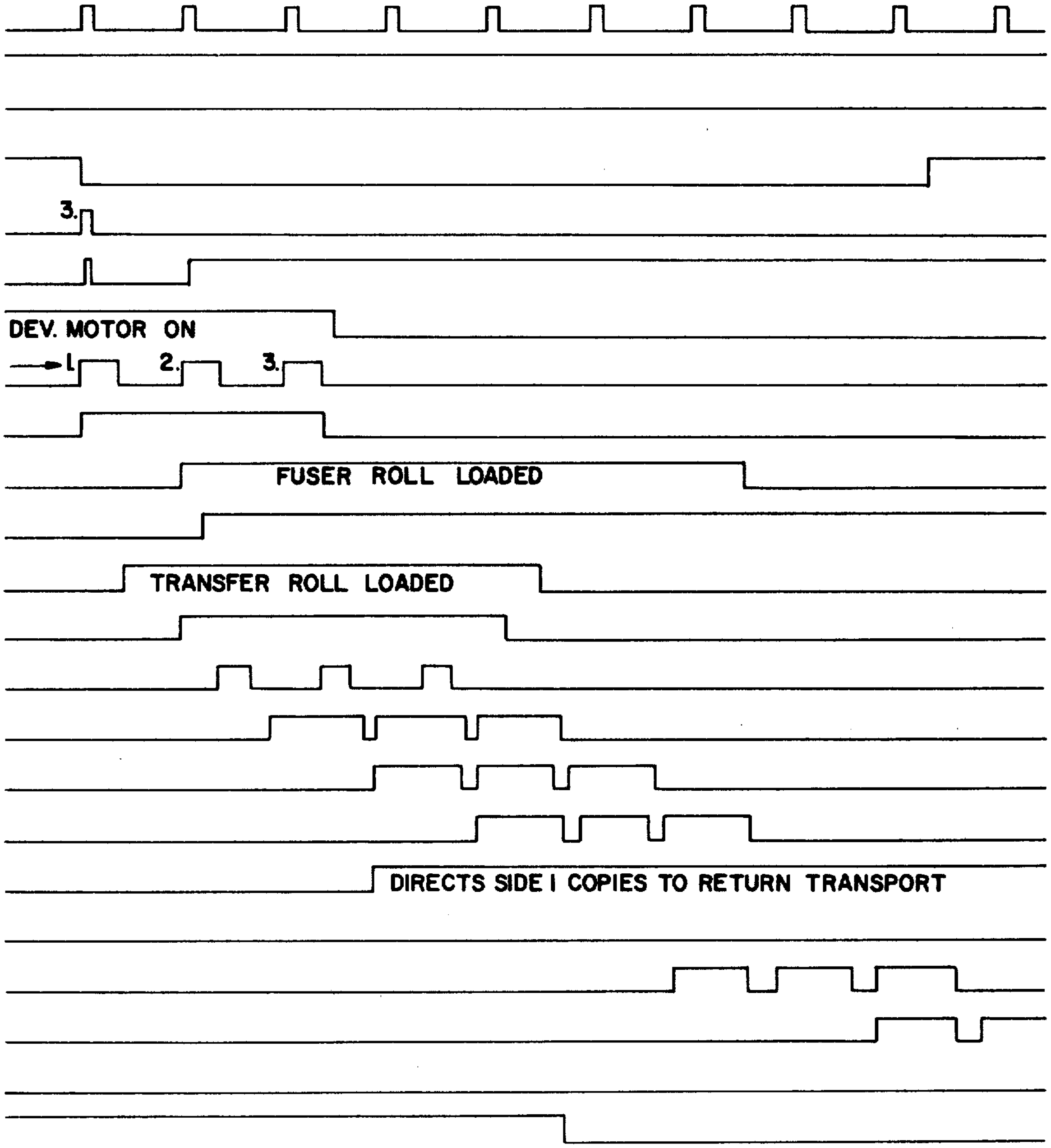
Figure 46C:
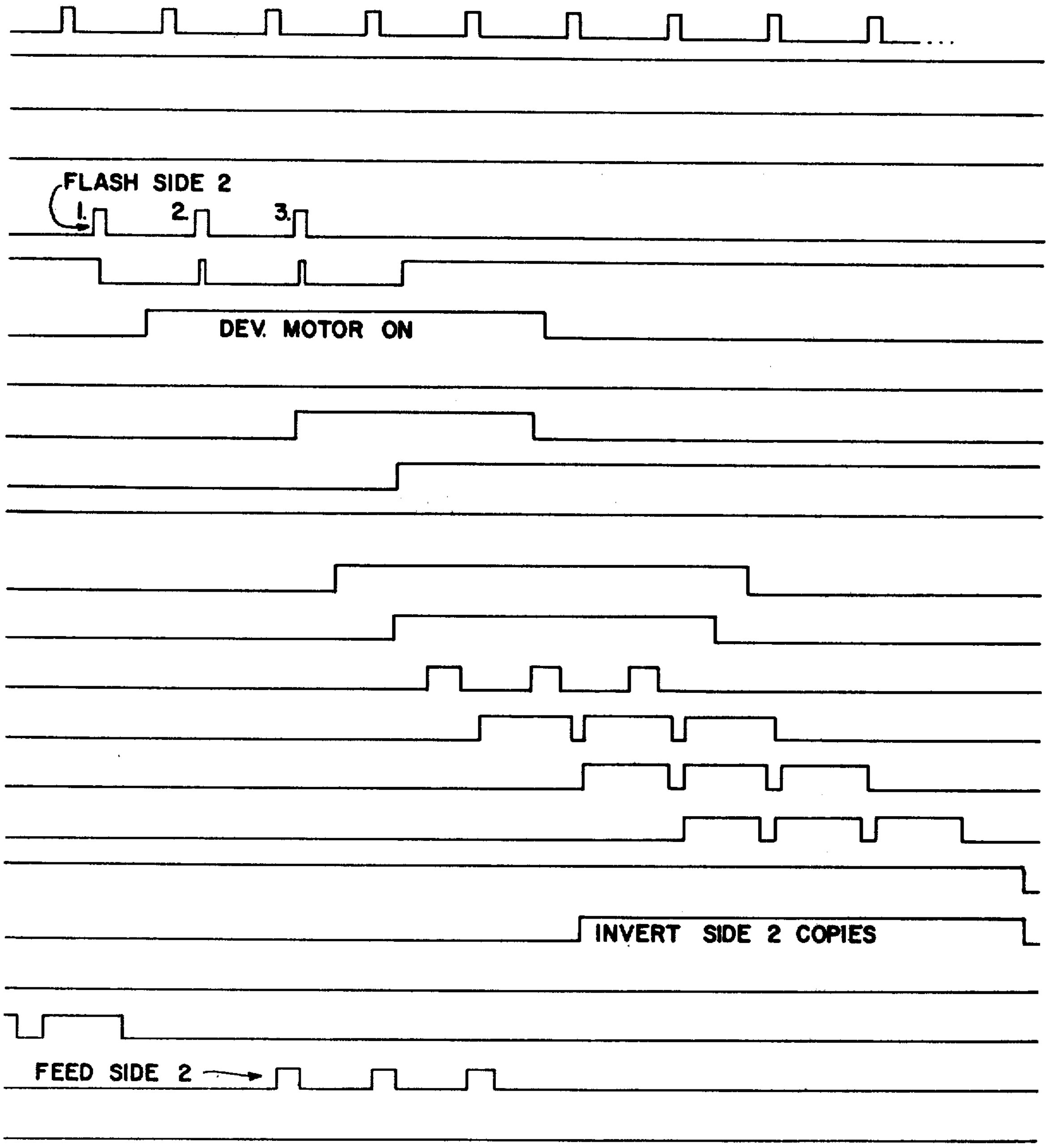

Referring particularly to the timing chart shown in FIG 46 (a,b,c), an exemplary copy run wherein three copies of each of two simplex or one-sided originals in duplex mode is made. Referring to FIG. 32, the appropriate buttons of copy selector 808 are depressed for the number of copies desired, i.e. 3 and document handler button 822, sorter select button 825 and two sided (duples) button 811 depressed. The originals, in this case, two (duplex) or one-sided originals are loaded into tray 233 of document handler 16 (FIG. 14) and the Print button 805 depressed. On depression of button 805, the host machine 10 enters the PRINT state and the Run Event Table (FIG. 35) for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed as more fully described in the aforementioned copending application Ser. No. 677,473.

During the run, the first original is advanced onto platen 35 by document handler 16 where, as seen in FIG. 46 (a,b,c), three exposures (FLASH SIDE 1,2,3) are made producing three latent electrostatic images on belt 20 in succession. As described earlier, the images are developed at developing station 28 and transferred to individual copy sheets fed forward (SHEET FEED 1,2,3)from main paper tray 100. The sheets bearing the images are carried from the transfer roll/belt nip by vacuum transport 155 to fuser 150 where the images are fixed. Following fusing, the copy sheets are routed by deflector 184 to return transport 182 (DIRECTS SIDE 1 COPIES TO RETURN TRANSPORT) and carried to auxiliary tray 102. The image bearing sheets entering tray 102 are aligned by edge patter 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose (INVERT SIDE 2 COPIES). Abutment of the leading edge of the copy sheet with stop 190 causes the sheet trailing edge to be guided into discharge chute 201, effectively inverting the sheet now bearing images on both sides. The inverted sheet is fed onto transport 181 and into sorter 14 where the sheets are placed in successive ones of the first three trays 212 of either the upper of lower arrays 210, 211 respectively depending on the disposition of deflector 220.

Other copy run programs, both simplex and duplex with and without sorter 14 and document handler 16 may be envisioned.

While the invention has been described with reference to the structure disclosed, it is not confined to the details set forth, but is intended to cover such modifications or changes as may come within the scope of the following claims.

What is claimed is:

1. In a reproduction system having a plurality of copy processing components cooperable to produce copies and a controller for operating said components in accordance with a program to produce copies, said program incorporating a fault flag array, each flag comprising said fault flag array being associated with an individual fault, and plural fault sensors for detecting faults during operation of said copy processing components, each of said fault sensors being associated with a predetermined one of said fault flags in said fault flag array, each of said fault sensors setting the fault flag associated therewith in response to detection of a fault by said sensor, the improvement comprising:

means to initiate scanning of said array of fault flags;

means for generating a preset fault signal for each fault flag set; and display means responsive to said preset fault signals to identify the fault represented by any fault flag in said array that has been set.

2. The reproduction system according to claim 1 including means to selectively actuate said display means.

3. In a reproduction system having a plurality of copy processing components cooperable to produce copies and a controller for operating said components in accordance with a program to produce copies, said program incorporating a fault flag array, each flag comprising said fault flag array being associated with an individual fault, and plural fault sensors for detecting faults during operation of said copy processing components, each of said fault sensors being associated with a predetermined one of said fault flags in said fault flag array, each of said fault sensors setting the fault flag associated therewith in response to detection of a fault by said sensor, the improvement comprising:

means for scanning said array of fault flags;

display means for identifying the faults represented by said fault flags;

control means for periodically actuating said scanning means to scan said fault flag array; and flag detection means responsive to detection of a set fault flag by said scanning means to actuate said display means and identify the fault represented by said set flag.

4. The reproduction system according to claim 3 in which said reproduction system includes means forming a processing path for said copies, said fault sensors including processing path sensors disposed at preset points along said processing path to detect faults in said processing path, said fault flag array including processing path fault flags associated with said processing path sensors, said display means including a map representative of said processing path, said map having lamps correlated with the position of said processing path sensors along said processing path, said flag detection means responding to setting of at least one of said processing path fault flags to actuate the lamp associated with said fault flag whereby to identify the location of the fault in said processing path on said map.

5. In a reproduction system having a plurality of copy processing components cooperable to produce copies and a controller for operating said components in accordance with a program to produce copies, said program incorporating a fault flag array, each flag comprising said fault flag array being associated with an individual fault, and plural fault sensors for detecting faults during operation of said copy processing components, each of said fault sensors being associated with a predetermined one of said fault flags in said fault flag array, each of said fault sensors setting the fault flag associated therewith in response to detection of a fault by said sensor, the improvement comprising:

means for scanning said array of fault flags;

control means for actuating said scanning means to initiate scanning of said fault flag array;

means providing individual numerical codes representative of individual ones of said faults;

means to display said numerical codes; and means responsive to detection of a set fault flag by said scanning means to actuate said display means and display the numerical code represented by said set fault flag.

6. The reproduction system according to claim 3 in which said scanning means is adopted following actuation of said display means and identification of said fault to resume scanning of said fault flag array.

7. In a reproduction system having at least one processing path for copies and a plurality of cooperating copy processing components for processing copies along said path, a controller for operating said components in accordance with a program to produce copies, said program incorporating a fault flag array, each flag comprising said fault flag array being associated with an individual fault, and plural fault sensors for detecting faults during operation of said copy processing components, each of said fault sensors being associated with a predetermined one of said fault flags in said fault flag array, each of said fault sensors setting the fault flag associated therewith in response to detection of a fault, by said sensor the improvement comprising:

means for scanning said array of fault flags;

display means for identifying the fault represented by any fault flag in said array that has been set;

control means for actuating said scanning means to scan said fault flag array, display actuating means responsive to detection of a set fault flag by said scanning means to actuate said display means and identify the fault, represented by said set fault flag at least one fault sensor disposed at a preset point along said processing path to detect a fault in said processing path, said fault sensor being associated with one of said fault flags, said fault sensor setting said one flag in response to a fault in said processing path;

said display means including a map representative of said processing path, a lamp on said map representing said fault sensor;

said display actuating means responding to setting of said one fault flag to actuate said lamp and identify said processing path fault on said map; and cover means for accessing said processing path;

said map being disposed on said cover.

8. The reproduction system according to claim 7 including means responsive to raising of said cover to actuate said lamp.

* * * * *